US011268476B2

(12) United States Patent
Mook et al.

(10) Patent No.: US 11,268,476 B2
(45) Date of Patent: Mar. 8, 2022

(54) ENERGY CONVERSION APPARATUS

(71) Applicant: General Electric Company, Schenectady, NY (US)

(72) Inventors: Joshua Tyler Mook, Cincinnati, OH (US); Michael Thomas Gansler, Mason, OH (US); Scott Douglas Waun, Loveland, OH (US); Kevin Michael VandeVoorde, Cincinnati, OH (US); Aigbedion Akwara, Cincinnati, OH (US); Michael Robert Notarnicola, Cincinnati, OH (US); Jason Joseph Bellardi, Fairfield, OH (US); Mohammed El Hacin Sennoun, West Chester, OH (US); Mary Kathryn Thompson, Fairfield Township, OH (US); Mohamed Osama, Garching (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/878,875

(22) Filed: May 20, 2020

(65) Prior Publication Data

US 2020/0370446 A1 Nov. 26, 2020

Related U.S. Application Data

(60) Provisional application No. 62/850,623, filed on May 21, 2019, provisional application No. 62/850,599, (Continued)

(51) Int. Cl.
*F02G 1/055* (2006.01)
*F02G 1/04* (2006.01)
(Continued)

(52) U.S. Cl.
CPC ............... *F02G 1/055* (2013.01); *F02G 1/04* (2013.01); *F02G 1/044* (2013.01); *F02G 1/047* (2013.01);
(Continued)

(58) Field of Classification Search
CPC .... F02G 1/044; F02G 1/0445; F02G 2242/44; F02G 2244/12; F02G 2244/50
(Continued)

(56) References Cited

U.S. PATENT DOCUMENTS 3,015,475 A 1/1962 Meijer et al.
3,027,717 A 4/1962 Conklin et al.
(Continued)

FOREIGN PATENT DOCUMENTS

DE 3444995 A1 6/1985
DE 3629443 A1 7/1987
(Continued)

OTHER PUBLICATIONS

United States Non Final Office Action Corresponding to U.S. Appl. No. 16/878,760 dated Jul. 22, 2020.
(Continued)

*Primary Examiner* — Mark A Laurenzi
*Assistant Examiner* — Mickey H France
(74) *Attorney, Agent, or Firm* — Dority & Manning. P.A.

(57) ABSTRACT

An energy conversion apparatus may include an engine assembly, such as a monolithic engine assembly, that includes a first heater body and a first engine body. The first heater body may define a first portion of a first monolithic body or at least a portion of a first monolithic body-segment. The first engine body may define a second portion of the first monolithic body or at least a portion of a second monolithic body-segment operably coupled or operably couplable to the first heater body. The engine assembly may include a second
(Continued)

heater body and/or a second engine body. The second heater body may define a portion of a second monolithic body or a third monolithic body-segment. The second engine body may define a portion of the second monolithic body or a fourth monolithic body-segment operably coupled or operably couplable to the second heater body and/or the first engine body.

48 Claims, 41 Drawing Sheets

Related U.S. Application Data filed on May 21, 2019, provisional application No. 62/850,692, filed on May 21, 2019, provisional application No. 62/850,678, filed on May 21, 2019, provisional application No. 62/850,701, filed on May 21, 2019.

(51) Int. Cl.
| | |
|---|---|
| F28D 9/04 | (2006.01) |
| F28F 7/02 | (2006.01) |
| F28F 13/00 | (2006.01) |
| F28F 13/14 | (2006.01) |
| F02G 1/053 | (2006.01) |
| F02G 1/057 | (2006.01) |
| F02G 1/047 | (2006.01) |
| F02G 1/05 | (2006.01) |
| F02G 1/044 | (2006.01) |
| F02G 1/043 | (2006.01) |
| F28D 21/00 | (2006.01) |

(52) U.S. Cl.
CPC ............... *F02G 1/05* (2013.01); *F02G 1/053* (2013.01); *F02G 1/057* (2013.01); *F28D 9/04* (2013.01); *F28F 7/02* (2013.01); *F28F 13/003* (2013.01); *F28F 13/14* (2013.01); *F02G 1/0435* (2013.01); *F02G 2243/00* (2013.01); *F02G 2244/50* (2013.01); *F02G 2244/52* (2013.01); *F02G 2250/00* (2013.01); *F02G 2254/10* (2013.01); *F02G 2258/10* (2013.01); *F02G 2270/80* (2013.01); *F02G 2280/10* (2013.01); *F28D 2021/0026* (2013.01); *F28F 2210/10* (2013.01); *F28F 2250/04* (2013.01)

(58) Field of Classification Search
USPC .................................... 60/508–515, 516–531
See application file for complete search history.

(56) References Cited

U.S. PATENT DOCUMENTS

| | | | | |
|---|---|---|---|---|
| 3,296,808 | A | | 1/1967 | Malik |
| 3,552,120 | A | | 1/1971 | Beale |
| 3,777,718 | A | | 12/1973 | Pattas |
| 3,782,457 | A | | 1/1974 | Troy |
| 3,928,974 | A | * | 12/1975 | Benson ................. F25B 9/14 60/650 |
| 4,026,114 | A | | 5/1977 | Belaire |
| 4,030,297 | A | | 6/1977 | Kantz et al. |
| 4,077,216 | A | | 3/1978 | Cooke-Yarborough |
| 4,102,632 | A | | 7/1978 | Hastings |
| RE30,176 | E | * | 12/1979 | Beale ................... F02G 1/0435 60/520 |
| 4,183,214 | A | | 1/1980 | Beale et al. |
| 4,199,945 | A | | 4/1980 | Finkelstein |
| 4,255,929 | A | * | 3/1981 | Frosch .................. F02G 1/044 60/517 |
| 4,277,942 | A | | 7/1981 | Egnell et al. |
| 4,345,426 | A | | 8/1982 | Egnell et al. |
| 4,371,500 | A | * | 2/1983 | Papineau ................. C01B 3/045 422/115 |
| 4,387,568 | A | | 6/1983 | Dineen |
| 4,395,880 | A | * | 8/1983 | Berchowitz ............. F02G 1/044 60/518 |
| 4,413,474 | A | * | 11/1983 | Moscrip .................. F02G 1/044 60/517 |
| 4,429,539 | A | * | 2/1984 | Leach ................... F02G 1/0445 60/520 |
| 4,498,298 | A | * | 2/1985 | Morgan ................. F02G 1/0435 60/517 |
| 4,545,738 | A | | 10/1985 | Young |
| 4,611,655 | A | | 9/1986 | Molignoni |
| 4,638,633 | A | * | 1/1987 | Otters ................... F02G 1/0435 60/517 |
| 4,644,851 | A | | 2/1987 | Young |
| 4,717,405 | A | | 1/1988 | Budliger |
| 4,722,188 | A | * | 2/1988 | Otters ................... F02G 1/0435 60/517 |
| 4,723,410 | A | * | 2/1988 | Otters ................... F02G 1/0435 60/517 |
| 4,723,411 | A | | 2/1988 | Darooka et al. |
| 4,819,432 | A | * | 4/1989 | Schneider ................. F02G 1/04 60/519 |
| 4,883,117 | A | | 11/1989 | Dobbs et al. |
| 5,005,349 | A | | 4/1991 | Momose et al. |
| 5,172,784 | A | | 12/1992 | Varela, Jr. |
| 5,294,410 | A | | 3/1994 | White |
| 5,456,076 | A | * | 10/1995 | Zornes ................... F01B 1/12 60/525 |
| 5,675,974 | A | | 10/1997 | Heikrodt et al. |
| 5,934,076 | A | * | 8/1999 | Coney ................... F02G 1/044 60/617 |
| 6,283,712 | B1 | | 9/2001 | Dziech et al. |
| 6,293,101 | B1 | | 9/2001 | Comad |
| 6,390,185 | B1 | | 5/2002 | Proeschel |
| 6,656,409 | B1 | | 12/2003 | Keicher et al. |
| 7,134,279 | B2 | | 11/2006 | White et al. |
| 7,171,811 | B1 | | 2/2007 | Berchowitz et al. |
| 8,359,744 | B2 | | 1/2013 | Hislop et al. |
| 8,720,198 | B2 | | 5/2014 | Wood |
| 8,721,981 | B2 | | 5/2014 | Freund et al. |
| 8,820,068 | B2 | | 9/2014 | Dadd |
| 9,689,344 | B1 | | 6/2017 | Gedeon |
| 9,992,917 | B2 | | 6/2018 | Yanke et al. |
| 10,359,603 | B1 | * | 7/2019 | Reardon .................. G02B 5/10 |
| 2002/0152750 | A1 | * | 10/2002 | Asai ........................ F02G 1/043 60/520 |
| 2002/0162316 | A1 | * | 11/2002 | Conde ...................... F01B 21/02 60/39.6 |
| 2003/0163990 | A1 | | 9/2003 | Maceda et al. |
| 2003/0230440 | A1 | | 12/2003 | Kamen et al. |
| 2004/0079087 | A1 | | 4/2004 | Chandran et al. |
| 2004/0128994 | A1 | * | 7/2004 | Gimsa ..................... F02G 1/044 60/517 |
| 2005/0072148 | A1 | * | 4/2005 | Francois ................ F02G 1/0435 60/516 |
| 2005/0250062 | A1 | | 11/2005 | Kornbluth et al. |
| 2005/0268606 | A1 | * | 12/2005 | Wood ...................... F02G 1/057 60/520 |
| 2006/0179833 | A1 | | 8/2006 | Qiu et al. |
| 2008/0122408 | A1 | | 5/2008 | Keiter et al. |
| 2008/0250788 | A1 | * | 10/2008 | Nuel ........................ F03G 6/068 60/641.14 |
| 2008/0314356 | A1 | * | 12/2008 | Kamen .................... F02G 1/043 123/197.3 |
| 2009/0025388 | A1 | | 1/2009 | Silver et al. |
| 2010/0281861 | A1 | * | 11/2010 | Emigh .................... F16C 29/00 60/525 |
| 2011/0000182 | A1 | * | 1/2011 | Lasker ..................... F28F 3/086 60/39.24 |
| 2011/0011079 | A1 | * | 1/2011 | Kamen .................... F02B 75/18 60/520 |
| 2011/0095542 | A1 | * | 4/2011 | Berchowitz ............. F02G 1/044 290/1 A |
| 2011/0226284 | A1 | | 9/2011 | Taylor et al. |

(56) References Cited

U.S. PATENT DOCUMENTS

| | | | |
|---|---|---|---|
| 2011/0302902 A1 | 12/2011 | Kelly et al. | |
| 2012/0260648 A1* | 10/2012 | Yang | F01B 9/02 60/525 |
| 2012/0260668 A1 | 10/2012 | Rogers et al. | |
| 2013/0042607 A1 | 2/2013 | Berchowitz | |
| 2013/0067906 A1* | 3/2013 | Macarez | F02G 1/055 60/517 |
| 2013/0192221 A1* | 8/2013 | Osborne | F02G 1/043 60/518 |
| 2013/0233526 A1 | 9/2013 | Hislop | |
| 2014/0000235 A1* | 1/2014 | Kamen | F28F 13/06 60/39.6 |
| 2014/0305099 A1* | 10/2014 | Hyde | F01N 3/00 60/272 |
| 2014/0305407 A1* | 10/2014 | Hyde | F02B 45/00 123/445 |
| 2015/0023778 A1 | 1/2015 | Berg et al. | |
| 2015/0040751 A1* | 2/2015 | Langenfeld | F28D 7/024 92/168 |
| 2015/0052887 A1* | 2/2015 | Dadd | F02G 1/045 60/523 |
| 2015/0184614 A1* | 7/2015 | Langenfeld | F16J 15/52 60/517 |
| 2016/0017843 A1* | 1/2016 | Whittaker | F02G 1/055 60/522 |
| 2016/0146153 A1* | 5/2016 | Hesselink | F02B 71/04 290/2 |
| 2017/0010046 A1 | 1/2017 | Hofbauer | |
| 2017/0030651 A1 | 2/2017 | Rock, Jr. et al. | |
| 2017/0059163 A1 | 3/2017 | Ott et al. | |
| 2017/0122258 A1 | 5/2017 | Bellomi et al. | |
| 2017/0133244 A1 | 5/2017 | Knyazik et al. | |
| 2017/0234543 A1 | 8/2017 | Plante et al. | |
| 2017/0276358 A1 | 9/2017 | Berry et al. | |
| 2018/0209283 A1* | 7/2018 | Kottilingam | F01D 5/005 |
| 2018/0231254 A1 | 8/2018 | Maurer et al. | |
| 2018/0274780 A1 | 9/2018 | Kim et al. | |
| 2018/0281064 A1 | 10/2018 | Takahashi et al. | |
| 2018/0283319 A1 | 10/2018 | Yates et al. | |
| 2019/0056101 A1* | 2/2019 | Weigold | F22B 1/1853 |
| 2019/0063842 A1 | 2/2019 | Lopes | |
| 2019/0090386 A1* | 3/2019 | Shioga | H01L 23/427 |
| 2019/0203660 A1* | 7/2019 | Hesselink | F02G 1/0435 |
| 2020/0149494 A1* | 5/2020 | Brown | F02G 1/043 |
| 2020/0224739 A1* | 7/2020 | Kawecki | F16D 65/125 |
| 2020/0240358 A1* | 7/2020 | Dann | F02G 1/043 |
| 2021/0108858 A1* | 4/2021 | Keolian | F28F 1/44 |

FOREIGN PATENT DOCUMENTS

| | | |
|---|---|---|
| EP | 1091089 A3 | 12/2003 |
| EP | 3301287 A1 | 4/2018 |
| JP | H01240757 A | 9/1989 |
| JP | H05264181 A | 10/1993 |
| JP | H06308825 A | 11/1994 |
| JP | H07279757 A | 10/1995 |
| JP | H08105353 A | 4/1996 |
| JP | 2590364 B2 | 3/1997 |
| JP | 2006/138591 A | 6/2006 |
| WO | WO92/18346 A1 | 10/1992 |
| WO | WO02/057612 A1 | 7/2002 |
| WO | WO2006/008540 A1 | 1/2006 |
| WO | WO2006/023872 A2 | 3/2006 |
| WO | WO2009/099343 A1 | 8/2009 |
| WO | WO2011/003038 A2 | 1/2011 |
| WO | WO2012/066311 A2 | 5/2012 |
| WO | WO2018/023142 A1 | 2/2018 |

OTHER PUBLICATIONS

United States Non Final Office Action Corresponding to U.S. Appl. No. 16/878,787 dated Jul. 21, 2020.

United States Non Final Office Action Corresponding to U.S. Appl. No. 16/878,797 dated Jul. 15, 2020.

Adamski, Ventilation Systems with Longitudinal Counterflow Spiral Recuperators, Department of Heat Engineering, AIVC.org, Technical University, Bialystok, Poland, 6 Pages. https://www.aivc.org/sites/default/files/members_area/media/pdf/Conf/2004/2004015_Adamski.pdf.

Adamski, Heat Transfer Correlations and NTU Number for the Longitudinal Flow Spiral Recuperators, Applied Thermal Engineering, ScienceDirect, Volume 29, Issues 2-3, Feb. 2009, pp. 591-596. (Abstract Only) https://www.sciencedirect.com/science/article/pii/S135943110801634.

Adamski, Ventilation System with Spiral Recuperator, Energy and Buildings, ScienceDirect, vol. 42, Issue 5, May 2010, pp. 674-677. (Abstract Only) https://www.sciencedirect.com/science/article/pii/S0378778809002898.

American Stirling Company, Regenerators, 10 Pages. https://www.stirlingengine.com/regenerators/.

Antoine et al., The ACTE Spiral Recuperator for Gas Turbine Engines, GT2002-30405, ASME Turbo Expo 2002: Power for Land, Sea, and Air, Conference International Gas Turbine Institute Jun. 3-6, 2002, vol. 1, pp. 1025-1031. (Abstract Only) https://proceedings.asmedigitalcollection.asme.org/proceeding.aspx?articleid=1574940.

Bin-Nun et al., Low Cost and High Performance Screen Laminate Regenerator Matrix, ScienceDirect, FLIR Systems, MA, vol. 44, Issues 6-8, Jun.-Aug. 2004, pp. 439-444. https://www.sciencedirect.com/science/article/abs/pii/S0011227504000700.

Bright Hub Engineering, Oil Piston Cooling, Oct. 19, 2009, 6 Pages. https://www.brighthubengineering.com/marine-engines-machinery/52783-how-are-marine-pistons-cooled-with-oil/.

Cai et al., An optimal design approach for the annular involute-profile cross wavy primary surface recuperator in microturbine and an application case study, Energy, Science Direct, Volume 153, Issue 15, Jun. 2018, pp. 80-89. (Abstract Only) https://www.sciencedirect.com/science/article/abs/pii/S0360544218306066.

Conner, 3D Printed Stirling Engine, Solar Heat Engines, Simulate, Analyze, Design, Build, and Test Solar-Powered Engines, Oct. 29, 2012, 12 Pages. http://www.solarheatengines.com/2012/10/29/3d-printed-stirling-engine.

Conner, A Regenerator for the 3D Printed PE 2 Stirling Engine, Solar Heat Engines, Simulate, Analyze, Design, Build, and Test Solar-Powered Engines, Dec. 18, 2012, 9 Pages. http://www.solarheatengines.com/2012/12/18/a-regenerator-for-the-3d-printed-pe-2-stirling-engine/.

Cordova et al., High Effectiveness, Low Pressure Drop Recuperator for High Speed and Power Oil-Free Turbogenerator, GT2015-43718, ASME Turbo Expo 2015 Turbine Technical Conference and Exposition Jun. 15-19, 2015, vol. 8 Microturbines, Turbochargers and Small Turbomachines; Steam Turbines, Canada, 10 pages. (Abstract Only). https://proceedings.asmedigitalcollection.asme.org/proceeding.aspx?articleid=2428685.

Deetlefs, Design, Simulation, Manufacture and Testing of a Free-Piston Stirling Engine, Thesis, Department of Mechatronic Engineering Stellenbosch University, Scholar Sun, South Africa, Dec. 2014, 138 Pages. https://scholar.sun.ac.za/bitstream/handle/10019.1/95922/deetlefs_design_2014.pdf?sequence=3&i.

Defense Visual Information Distributed Service (DVIDS), Mod II Automotive Stirling Engine, NASA C-1986-3704, Washington, DC, 2 Pages. https://www.dvidshub.net/image/853635/mod-ii-automotive-stirling-engine.

Defense Visual Information Distributed Service (DVIDS), Mod II Automotive Stirling Engine, NASA C-1986-3705, Washington, DC, 2 Pages. https://www.dvidshub.net/image/750295/mod-ii-automotive-stirling-engine.

Defense Visual Information Distributed Service (DVIDS), Mod II Automotive Stirling Engine, NASA C-1986-3706, Washington, DC, 2 pages. https://www.dvidshub.net/image/844058/mod-ii-automotive-stirling-engine.

Defense Visual Information Distributed Service (DVIDS), Mod II Automotive Stirling Engine, NASA C-1986-3707, Washington, DC, 2 pages. https://www.dvidshub.net/image/835929/mod-ii-automotive-stirling-engine.

(56) References Cited

OTHER PUBLICATIONS

Defense Visual Information Distributed Service (DVIDS), Mod II Automotive Stirling Engine, NASA C-1986-3708, Washington, DC, 2 pages. https://www.dvidshub.net/image/836353/mod-ii-automotive-stirling-engine.

Defense Visual Information Distributed Service (DVIDS), Mod II Automotive Stirling Engine, NASA C-1986-3709, Washington, DC, 2 pages https://www.dvidshub.net/image/831862/mod-ii-automotive-stirling-engine.

Defense Visual Information Distributed Service (DVIDS), Mod II Automotive Stirling Engine, NASA C-1986-3710, Washington, DC, 2 pages https://www.dvidshub.net/image/758633/mod-ii-automotive-stirling-engine.

Defense Visual Information Distributed Service (DVIDS), Mod II Automotive Stirling Engine, NASA C-1986-3711, Washington, DC, 2 pages https://www.dvidshub.net/image/755174/mod-ii-automotive-stirling-engine.

Defense Visual Information Distributed Service (DVIDS), Mod II Automotive Stirling Engine, NASA C-1986-3712, Washington, DC, 2 pages https://www.dvidshub.net/image/832968/mod-ii-automotive-stirling-engine.

Defense Visual Information Distributed Service (DVIDS), Mod II Automotive Stirling Engine, NASA C-1986-3713, Washington, DC, 2 pages https://www.dvidshub.net/image/838183/mod-ii-automotive-stirling-engine.

Defense Visual Information Distributed Service (DVIDS), Mod II Automotive Stirling Engine, NASA C-1986-3714, Washington, DC, 2 pages https://www.dvidshub.net/image/752721/mod-ii-automotive-stirling-engine.

Defense Visual Information Distributed Service (DVIDS), Mod II Automotive Stirling Engine, NASA C-1986-3715, Washington, DC, 2 pages https://www.dvidshub.net/image/853040/mod-ii-automotive-stirling-engine.

Defense Visual Information Distributed Service (DVIDS), Mod II Automotive Stirling Engine, NASA C-1986-3716, Washington, DC, 2 pages https://www.dvidshub.net/image/754701/mod-ii-automotive-stirling-engine.

Defense Visual Information Distributed Service (DVIDS), Mod II Automotive Stirling Engine, NASA C-1986-3717, Washington, DC, 2 pages https://www.dvidshub.net/image/838670/mod-ii-automotive-stirling-engine.

Defense Visual Information Distributed Service (DVIDS), Mod II Automotive Stirling Engine, NASA C-1986-3718, Washington, DC, 2 pages https://www.dvidshub.net/image/841231/mod-ii-automotive-stirling-engine.

Defense Visual Information Distributed Service (DVIDS), Mod II Automotive Stirling Engine, NASA C-1986-3719, Washington, DC, 2 pages https://www.dvidshub.net/image/856096/mod-ii-automotive-stirling-engine.

Defense Visual Information Distributed Service (DVIDS), Mod II Automotive Stirling Engine, NASA C-1986-3720, Washington, DC, 2 pages https://www.dvidshub.net/image/842778/mod-ii-automotive-stirling-engine.

Defense Visual Information Distributed Service (DVIDS), Mod II Automotive Stirling Engine, NASA C-1986-3721, Washington, DC, 2 pages. https://www.dvidshub.net/image/836739/mod-ii-automotive-stirling-engine.

Defense Visual Information Distributed Service (DVIDS), Mod II Automotive Stirling Engine, NASA C-1986-3722, Washington, DC, 2 pages https://www.dvidshub.net/image/829783/mod-ii-automotive-stirling-engine.

Defense Visual Information Distributed Service (DVIDS), Mod II Automotive Stirling Engine, NASA C-1986-3724, Washington, DC, 2 pages https://www.dvidshub.net/image/841262/mod-ii-automotive-stirling-engine.

Defense Visual Information Distributed Service (DVIDS), Mod II Automotive Stirling Engine, NASA C-1986-3725, Washington, DC, 2 pages https://www.dvidshub.net/image/759360/mod-ii-automotive-stirling-engine.

Defense Visual Information Distributed Service (DVIDS), Mod II Automotive Stirling Engine, NASA C-1986-3726, Washington, DC, 2 pages https://www.dvidshub.net/image/840688/mod-ii-automotive-stirling-engine.

Defense Visual Information Distributed Service (DVIDS), Mod II Automotive Stirling Engine, NASA C-1986-3727, Washington, DC, 2 pages https://www.dvidshub.net/image/859381/mod-ii-automotive-stirling-engine.

Defense Visual Information Distributed Service (DVIDS), Mod II Automotive Stirling Engine, NASA C-1986-3729, Washington, DC, 2 pages https://www.dvidshub.net/image/834290/mod-ii-automotive-stirling-engine.

Defense Visual Information Distributed Service (DVIDS), Mod II Automotive Stirling Engine, NASA C-1986-3731, Washington, DC, 2 pages https://www.dvidshub.net/image/860486/mod-ii-automotive-stirling-engine.

Defense Visual Information Distributed Service (DVIDS), Mod II Automotive Stirling Engine, NASA C-1986-3732, Washington, DC, 2 pages https://www.dvidshub.net/image/749381/mod-ii-automotive-stirling-engine.

Devitt, Restriction and Compensation of Gas Bearings—Bently Bearings by Newway, Aston, PA, 5 Pages. https://bentlybearings.com/restriction-and-compensation/.

Direct Industry, Micro-Turbine Hear Recuperator/ for Exhaust Gas. For Gas Turbines/ Stainless Steel (Web Link Only) http://www.directindustry.com/prod/acte/product-158841-1644809.html Driscoll et al., Role of Swirl in Flame Stabilization, AIAA-2011-108, 49$^{th}$ AIAA Aerospace Sciences Meeting including the New Horizons Forum and Aerospace Exposition, Orlando Florida, Jan. 4-7, 2011, 11 Pages.

Dudareva et al., Thermal Protection of Internal Combustion Engines Pistols, Science Direct, Procedia Engineering, vol. 206, 2017, pp. 1382-1387. https://www.sciencedirect.com/science/article/pii/S1877705817353341.

Electropaedia, Battery and Energy Technologies, Energy Conversion and Heat Engines, Woodbank Communications Ltd., Chester, United Kingdom, 2005, 11 Pages. https://www.mpoweruk.com/heat_engines.htm.

Elizondo-Luna, Investigation of Porous Metals as Improved Efficiency Regenerators, The University of Sheffield, Doctor of Philosophy Thesis, Mar. 2016, 261 Pages. http://etheses.whiterose.ac.uk/13111/1/Thesis%20Elizondo-Luna.pdf.

Enerlyt Stirling Engine, Enerlyt, Glowing-Isothermal-Mechanical-Stirling-Arranged-Motor, Enerlyt Technik GmbH, Potsdam, 2012, 13 Pages. http://www.enerlyt.de.english/pdf/en_motorbeschreibung_040413.pdf.

Engine Basics, Ball Type, Rochester Image, 1 Page. http://www.enginebasics.com/Engine%20Basics%20Root%20Folder/Images/Fuel%20Injector3.jpg.

Ernst et al., Automotive Stirling Engine Development Program, NASA-CR-174972, DOE/NASA/0032-26, MTI-85ASE476SA8, Semiannual Technical Progress Report for Period Jan. 1-Jun. 30, 1985, Lewis Research Center, Published Feb. 1986, 114 Pages. https://ntrs.nasa.gov/archive/nasa/casi.ntrs.nasa.gov/19870010704.pdf.

Ernst et al., Automotive Stirling Engine Development Program, NASA-CR-175045, DOE/NASA-0032-27, MTI-86ASE507SA9, NASA, Automotive Stirling Engine Developmental Program, Semiannual Technical Progress Report for Jul. 1-Dec. 1985, Lewis Research Center, Published in May 1986, 66 Pages. https://ntrs.nasa.gov/archive/nasa/casi.ntrs.nasa.gov/19860021107.pdf.

Fargo et al., Setting the Bar on Efficient Electrical Power Generation, ADI Thermal Power Corporation, 11 Pages. http://www.adisolarthermal.com/stirling/Technology.html.

Farrell, et al., Automotive Stirling Engine Development Program, NASA-CR-180839, DOE/NASA-0032-30, MTI-87ASE555SA11, NASA, Semiannual Technical Progress Report for Period Jul. 1-Dec. 31, 1986, Lewis Research Center, Published Feb. 1988, 66 Pages. https://ntrs.nasa.gov/archive/nasa/casi.ntrs.nasa.gov/19900002338.pdf.

Fluent, 22.8.2 The Pressure-Swirl Atomizer Model, Fluent 6.3 User's Guide, 6 pages. https://www.sharcnet.ca/Software/Fluent6/html/ug/node825.htm.

(56) References Cited

OTHER PUBLICATIONS

Folsom et al., Combustion Modification—An Economic Alternative for Boiler NOx Control, GER-4192, GE Power Systems, Apr. 2001, 24 Pages. https://www.ge.com/content/dam/gepower-pgdp/global/en_US/documents/technical/ger/ger-4192-combustion-mod-economic-alternative-boiler-nox-control.pdf.
Fouzi, Chapter 6: Piston and Piston Rings, DJA3032 Internal Combustion Engine, Politeknik Malaysia, 201, 5 Pages. https://www.slideshare.net/mechanical86/dja3032-chapter-6.
Free-Piston Engine Range Extender Technology, Sir Joseph Swan Centre for Energy Research, 2016. (Video) https://www.youtube.com/watch?v=u4b0_6byuFU.
Fung et al., External Characteristics of Unsteady Spray Atomization from a Nasal Spray Device, Journal of Pharmaceutical Sciences, ScienceDirect, vol. 102, Issue 3, Mar. 2013, pp. 1024-1035. (Abstract Only) https://www.sciencedirect.com/science/article/pii/S002235491531193X.
Garcia-Santamaria et al., A German Inverse Woodpile Structure with a Large Photonic Band Gap, Advanced Materials Communication, Wiley InterScience, 2007, Adv. Mater. 0000, 00, pp. 1-5. http://colloids.matse.illinois.edu/articles/garcia_advmat_2007.pdf.
General Electric—GE Power, Breaking the Power Plant Efficiency Record, 2016, 4 Pages. https://www.ge.com/power/about/insights/articles/2016/04/power-plant-efficiency-record.
Georgescu, Rotary Engine, 2007. (Video Only). https://www.youtube.com/watch?v=ckuQugFH68o.
Gibson, et al., Cellular Solids Structure and Properties, Cambridge University Press, $2^{nd}$ Edition, 1997. (Web Link Only) https://doi.org/1031017/CBO9781139878326.
Giphy, Engine Piston GIF, 1 Page. https://giphy.com/gifs/engine-hybrid-piston-10YyqVUCHx2HC.
Green Car Congress, New Toroidal Internal Combustion Engine Promises 20:1 Power-to-Weight-Ratio Energy, Technologies, Issues and Polices for Sustainable Mobility, Apr. 2006, 2 Pages. https://www.greencarcongress.com/2006/04/new_toroidal_in.html.
HiETA Technologies LTD, HiETA Celebrates Growth with New Website, Video and Brochure, United Kingdom, Sep. 5, 2018, 5 Pages. https://www.hieta.biz/hieta-celebrates-growth-with-new-website-video-and-brochure/.
Hoegel et al., Theoretical Investigation of the Performance of an Alpha Stirling Engine for Low Temperature Applications, Conference: ISEC $15^{th}$ International Stirling Engine Conference, ResearchGate, New Zealand, Jan. 2012, 10 Pages. https://www.researchgate.net/publication/256706755_Theoretical_investigation_of_the_performance_of_an_Alpha_Stirling_engine_for_low_temperature_applications.
Honeywell Aerospace, Ultra Long-Life, Flight Qualified Technology for High Speed Imaging and Sensing Infra-Red Detectors, Stirling Cycle Ciyocoolers, Auxiliary Power and Thermal, Honeywell Aerospace, 3 Page. https://aerospace.honeywell.com/en/products/auxiliary-power-and-thermal/stirling-cycle-cryocoolers.
Howden, Reciprocating Compressor C series—animation, Jun. 2017. (Video Only). https://www.youtube.com/watch?v=owNOdUBL37U&feature=youtu.be.
http://www.hybrid-engine-hope.com/media/pagini/95_007ld30dba777dl6e9a770de27060e6.gif (Web Link Only).
Huang, Toroidal Engine Ver:2.0, 2017. (Video Only). https://www.youtube.com/watch?v=n5L0Zc6Ic8Y&feature=youtu.be.
Integrated Publishing, Throttle Body Injection System, Construction Training Manuals, Construction Mechanic Basic, 2 Pages. http://constructionmanuals.tpub.com/14264/css/Throttle-Body-Injection-System-145.htm.
Ishikawa et al., Development of High Efficiency Gas Turbine Combined Cycle Power Plant, Power Systems Headquarters, Mitsubishi Heavy Industries, Ltd., Technical Review, vol. 45, No. 1, Mar. 2008, pp. 15-17. http://courses.me.metu.edu.tr/courses/me476/downloads/476s08ProjectPt4GtTemp.pdf.
Kannan et al., Exploration of Combustion Efficiency Using Preformed Vortex Patterns: A Study on IC Engine, Lambert Academy Publishing, Dec. 19, 2016. (Abstract; Paperback Purchase Only) https://www.amazon.com/Exploration-Combustion-Efficiency-Preformed-Patterns/dp/3330023627.
Kitazaki et al., Development of Zero Emission Generating System Stirling Engine, Yanmar Technical Review, Jan. 27, 2017, 7 Pages. https://www.yanmar.com/ph/technology/technical_review/2017/0127_5.html.
Kulkarni et al., Liquid Sheet Breakup in Gas-Centered Swirl Coaxial Atomizers, Journal of Fluids Engineering, ResearchGate, vol. 132, No. 1, Jan. 2010, 9 Pages. https://www.researchgate.net/publication/245357304_Liquid_Sheet_Breakup_in_Gas-Centered_Swirl_Coaxial_Atomizers.
Linne et al., Ballistic Imaging of the Liquid Core for a Steady Jet in Crossflow, OSA Publishing, Applied Optics, vol. 44, Issue 31, 2005, p. 6627-6634. (Abstract Only) http://proxy.osapublishing.org.oa/ViewMedia.cfm?uri=ao-44-31-6627&seq-0&guid=173840e8-e788-546e-369a-b27a62f3465a&html=true.
Martini, Stirling Engine Design Manual, NASA-CR-168088, Second Edition, Jan. 1983, 410 Pages. https://ntrs.nasa.gov/archive/nasa/casi.ntrs.nasa.gov/19830022057.pdf.
McDonald, Recuperator Considerations for Future Higher Efficiency Microtubines, Applied Thermal Engineering, ScienceDirect, vol. 23, Issue 12, Aug. 2003, pp. 1463-1487. (Abstract Only) https://www.sciencedirect.com/science/article/pii/S135943110300838.
Microgen Engine Corporation. Technology. (Web Link Only) https://www.microgen-engine.com/technology/technology/.
Microtubines and Micro Gas Turbines, An Introduction and Technical Guide, UK, 11 Pages. http://www.gasturbineworld.co.uk/microturbineguide.html.
Min et al., High temperature heat exchanger studies for applications to gas turbines, Heat and Mass Transfer, SpringerLink, 2009, vol. 46, p. 175. (Abstract Only) https://link.springer.com/article/10.1007/s00231-009-0560-3.
Module Two: Air Flow and Fluid Dynamics, Fluid Mechanics: Properties and Behaviors of Fluids in Motion, 15 Pages. https://media.lanecc.edu/users/driscolln/RT112/Air_Flow_Fluidics/Air_Flow_Fluidics7.html.
Morring, Jr., Flight Tests for Vortex Rocket Combustion, Vortex Rocket Combustion is Vetted, Aviation Week & Space Technology, Nov. 5, 2012, 4 Pages. http://aviationweek.com/awin/flight-tests-vortex-rocket-combustion.
Murphy, IAV Sees Huge Potential With 3D-Printed Pistons, Wards Auto, Apr. 12, 2018, 6 Pgs. https:www.wardsauto.com/engines/iav-sees-huge-potential-3d-printed-pistons.
Nguyen et al., Effect of solid heat conduction on heat transfer performance of a spiral heat exchanger, Applied Thermal Engineering, ScienceDirect, vol. 76, Feb. 5, 2015, pp. 500-409. (Abstract Only) https://www.sciencedirect.com/science/article/pii/S1359431114010199.
Ni et al., Improved Simple Analytical Model and Experimental Study of a 100 W B-Type Stirling Engine, Applied Energy, vol. 169, 2016, pp. 768-787. https://www.researchgate.net/publication/296632477_Improved_Simple_Analytical_Model_and_experimental_study_of_a_100W_b-type_Stirling_engine/figures?lo=.
Nightingale et al., Automotive Stirling Engine Development Program, NASA-CR-174873, DOE/NASA/0032-25, MTI-85ASE445SA7, NASA, Topical Semiannual Technical Progress Report for Period Jul. 1—Dec. 31, 1984, Lewis Research Center, Published Nov. 1985, 88 Pages. https://ntrs.nasa.gov/archive/nasa/casi.ntrs.nasa.gov/19870020790.pdf.
Nightingale, Automotive Stirling Engine, Mod II Design Report, NASA CR-175106, DOE/NASA/0032-28, MT186ASE58SRI, New York, 1986, 54 Pages. https://ntrs.nasa.gov/archive/nasa/casi.ntrs.nasa.gov/19880002196.pdf.
O'Dell, SuperTruck Program Scores Big, Head into Second 5-Year Phase, Trucking.com, 2016, 7 Pages. https://www.trucks.com/2016/10/31/supertruck-program-5-year-phase/.
Ohio University, Chapter 2A Alpha Stirling Engines, Stirling Engine Configurations, Mar. 30, 2013, 5 Pages. https://www.ohio.edu/mechanical/stirling/engines/engines.html.
Owczarek, On the Design of Lubricant Free Piston Compressors, Nonlinear Solid Mechanics, Faculty of Engineering Technology, Thesis, University of Twente, Enschede, Sep. 17, 2010. (Abstract

(56) References Cited

OTHER PUBLICATIONS

Only) https://research.utwente.nl/en/publications/on-the-design-of-lubricant-free-piston-compressors.

Owkes et al., Turbulent Liquid Jet in Cross-Flow Atomization in YouTube Video, Published May 11, 2013. (Video Link Only) https://www.youtube.com/watch?v=Uciwt79T4ck.

Panesar et al., Strategies for Functionally Graded Lattice Structures Derived Using Topology Optimisation for Additive Manufacturing, ScienceDirect, Additive Manufacturing, vol. 19, Jan. 2018, pp. 81-94. https://doi.org/10.1016/j.addma.2017.11.008.

Park et al., Thermal/Fluid Characteristics of Isotropic Plain-Weave Screen Laminates as Heat Exchange Surfaces, AIAA 2002-0208, 2002, pp. 1-9 https://wolfweb.unr.edu/~rawirtz/Papers/AIAA2002-0208.pdf.

Penswick et al., Duplex Stirling Machines, Sunpower Incorporated 19$^{th}$ Annual Intersociety Energy Conversion Engineering Conference, QP051082-A, vol. 3, No. CONF-840804, United States, 1984, 7 Pages. https://www.ohio.edu/mechanical/stirling/engines/Duplex-Stirling-Machines.pdf.

Pneumatic Round Body Cylinder—SRG_SRG Series, Parker, Richland MI, 3 Pages. http://ph.parker.com/us/en/pneumatic-round-body-cylinder-srg-srgm-series.

Prabhakaran et al., Effect of temperature on Atomization in Gas Centered Coaxial Injection Systems, Bombay: Indian Institute of Technology, 2009, 8 Pages. https://pdfs.semanticscholar.org/6fb6/98e68d2111ef54ad72d40a9fa106f8b63991.pdf.

Proeschel, Proe 90™ Recuperator for Microturbine Applications, ASME Proceedings, GT2002-30406, Vehicular and Small Turbomachines, ASME Turbo Expo 2002: Power for Land, Sea, and Air Jun. 3-6, 2002, Amsterdam, The Netherlands, vol. 1, pp. 1033-1044. (Abstract Only) http://proceedings.asmedigitalcollection.asme.org/proceeding.aspx?articleID=1574944.

Qiu et al., Advanced Stirling Power Generation System for CHP Application, ARPA, Temple University, Philadelphia, 5 Pages. https://arpa-e.energy.gov/sites/default/files/Temple_GENSETS_Kickoff.pdf.

Ranieri et al., Efficiency Reduction in Stirling Engines Resulting from Sinusoidal Motions, Energies, vol. 11, No. 11: 2887, 2018, 14 Pages. https://doi.org/10.3390/en11112887.

Renewable Energy, Double-Acting Stirling Engine, Stirling Engine, 1 Page. (Abstract Only) https://sites.google.com/a/emich.edu/cae546816t5/history/types/double—acting-stirling-engine.

Rodriguez Perez, Cellular Nanocomposites: A New Type of Light Weight Advanced Materials with Improved Properties, CellMat Technologies S.L. Transfer Center and Applied Technologies, Valladolid, 35 Pages. http://crono.ubu.es/innovationh2020/pdf/cellmat.pdf.

Schonek, How big are power line losses?, Energy Management/Energy Efficiency, Schneider Electric, Mar. 25, 2013, 2 Pages. https://blog.schneider-electric.com/energy-management-energy-efficiency/2013/03/25/how-big-are-power-line-losses/.

Schwartz, The Natural Gas Heat Pump and Air Conditioner, 2014 Building Technologies Office Peer Review, ThermoLift, Inc., U.S. Department of Energy, Energy Efficiency & Renewable Energy, DE-FOA-0000823, 27 Pages (Refer to p. 7) https://www.energy.gov/sites/prod/files/2014/11/f19/BTO%202014%20Peer%20Review%20Presentation%20-%20ThermoLift%204.4.14.pdf.

Shepard, Bubble Size Effect on Effervescent Atomization, ResearchGate, University of Minnesota Dissertation Thesis, Jun. 2011, 164 Pages. https://www.researchgate.net/publication/295855028_Bubble_Size_Effect_on_Effervescent_Atomization.

Shih et al., Thermal Design and Model Analysis of the Swiss-roll Recuperator for an Innovative Micro Gas Turbine, Applied Thermal Engineering, ScienceDirect, vol. 29, Issues 8-9, Jun. 2009, pp. 1493-1499. (Abstract Only) https://www.sciencedirect.com/science/article/pii/S1359431108002895.

Shimizu, Next Prius Will Have Engine Thermal Efficiency of 40%, XTECH, Solar Plant Business, Nikkei Business Publications, May 22, 2015, 2 Pages. https://tech.nikkeibp.co.jp/dm/english/NEWS_EN/20150522/419560/.

Stirling Engines, Regenerators, What They Are and How They Work, American Stirling Company, 7 Pages. https://www.stirlingengine.com/regenerators/.

Stirling Engines, Solar Cell Central, 3 Pages. http://solarcellcentral.com/stirling_page.html.

Technology, Microgen Engine Corporation, 2016, 4 Pages. https://www.microgen-engine.com/technology/technology.

Tecpro, Spray Engineering Info, Australia, 7 Pages. https://www.tecpro.com.au/technical-info/spray-engineering.

ThermoLift, Technology—Background, The Thermodynamic Process Behind ThermoLift, ThermoLift, Inc., 3 Pages. http://www.tm-lift.com/background/.

Thimsen, Stirling Engine Assessment, 1007317, Electronic Power Research Institute (EPRI ), Palo Alto, California, 2002, 170 Pages. https://www.engr.colostate.edu/~marchese/mech337-10/epri.pdf.

Thomassen, Free Floating Piston Film (mpeg).mpg, Mar. 5, 2010. (Video Only) https://www.youtube.com/watch?v=bHFUi0F0PgA.

Toptica Photonics, 2-Photon Polymerization, FemtoFiber Technology for Two-Photon Polymerization, 2 Pages. https://www.toptica.com/applications/ultrafast-studies/2-photon-polymerization.

Toyota Motor Corporation, Inline 4 Cylinder 2.5L Injection Gasoline Engine/New Transaxle, Global Website, Dec. 6, 2016, 2 Pages. https://global.toyota/en/download/14447877/.

Treece et al., Microtubine Recuperator Manufacturing and Operating Experience, GT2002-30404, ASME Proceedings, Vehicular and Small Tuthomachines, ASME Turbo Expo 2002: Power for Land, Sea, and Air Jun. 3-6, 2002, Amsterdam, The Netherlands, vol. 1, pp. 1017-1023. (Abstract Only) http://proceedings.asmedigitalcollection.asme.org/proceeding.aspx?articleID=1574937.

Tri Clamp, Tri Clamp Information and Sizing Guide, TriClamp Co., 3 Pages. https://triclamp.co/pages/tri-clamp-information-and-sizing-guide.

Tuncer et al., Structure-Property Relationship in Titanium Foams, Anadolu University, Turkey, Feb. 2011, 35 Pages. https://ocw.mit.edu/courses/materials-science-and-engineering/3-054-cellular-solids-structure-properties-and-applications-spring-2015/lecture-notes/MIT3_054S15_L13_Cellular.pdf.

Urieli, Chapter 5B—Regenerator Simple Analysis, Stirling Cycle Machine Analysis, Ohio Edu, Jan. 17, 2010, 5 Pages. https://www.ohio.edu/mechanical/stirling/simple/regen_simple.html.

Vodhanel, Characterization of Performance of a 3D Printed Stirling Engine Through Analysis and Test, Cleveland State University Engaged Scholarship@CSU, ETD Archive, 2016, 91 Pages. https://engagedscholarship.csuohio.edu/cgi/viewcontent.cgi?referer=https://www.google.com/&httpsredir=1&article=1944&context=etdarchive.

Wikipedia, Heat Engine, 8 Pages. https://en.wikipedia.org/wiki/Heat_engine.

Wikipedia, Regenerative Heat Exchanger, 3 Pages. https://en.wikipedia.org/wiki/Regenerative_heat_exchanger.

Wikipedia, Spray Nozzle, 11 Pages. https://en.wikipedia.org/wiki/Spray_nozzle.

Wikipedia, Stirling Engine, 2019, 24 Pages. https://en.wikipedia.org/wiki/Stirling_engine.

Wirtz et al., High Performance Woven Mesh Heat Exchangers, Mechanical Engineering Department, University of Nevada, Reno, 2002, 8 Pages. https://apps.dtic.mil/dtic/tr/fulltext/u2/a408219.pdf.

Wirtz et al., Thermal/Fluid Characteristics of 3-D Woven Mesh Structures as Heat Exchanger Surfaces, IEEE Transactions on Components and Packaging Technologies, vol. 26, No. 1, Mar. 2003, pp. 40-47. https://pdfs.semanticscholar.org/d1a3/b4ce0baa639cf349d25d1506c3fa6118dc3e.pdf.

WU et al., Model-based Analysis and Simulation of Regenerative Heat Wheel, ScienceDirect, Energy and Buildings, Volume 38, No. 5, May 2006, pp. 502-514. http://citeseerx.ist.psu.edu/viewdoc/download?doi=10.1.1.616.3103&rep=rep1&type=pdf.

Xiao et al., Recuperators for micro gas turbines: A review, Applied Energy, ScienceDirect, vol. 197, July 1, 2017, pp. 83-99. (Abstract Only) https://www.sciencedirect.com/science/article/pii/S0306261917303367.

Xie et al., Investigation on the Performances of the Gas Driven Vuilleumier Heat Pump, International Refrigeration and Air Conditioning Conference, Purdue University, School of Mechanical

(56) References Cited

OTHER PUBLICATIONS

Engineering, 2008, 7 Pages. https://docs.lib.purdue.edu/cgi/viewcontent.cgi?referer=https://www.google.com/&httpsredir=1&article=1935&context=iracc.
International Search Report Corresponding to Application No. PCT/US2020/033699 dated Aug. 17, 2020.
International Search Report Corresponding to Application No. PCT/US2020/033695 dated Aug. 20, 2020.
Copy of International Search Report Corresponding to Application No. PCT/US2020/033689 dated Sep. 9, 2020.
International Search Report Corresponding to Application No. PCT/US2020/033686 dated Nov. 9, 2020.
International Search Report Corresponding to Application No. PCT/US2020/033721 dated Nov. 27, 2020.

* cited by examiner

TABLE ES-1 NOMINAL HEAT BALANCES OF PRIME-MOVERS AS A PERCENTAGE OF FUEL INPUT

| ENGINE TYPE | WORK | RECOVERABLE HEAT | REJECTED HEAT |
|---|---|---|---|
| DIESEL | 36 | 42 | 22 |
| ADIABATIC TURBO-COMPOUND DIESEL | 47 | 36 | 17 |
| GAS TURBINE (SIMPLE) | 25 | 45 | 30 |
| GAS TRIBUNE (REGENERATIVE) | 38 | 22 | 40 |
| STIRLING (CURRENT) | 34 | 54 | 12 |

FIG. 5

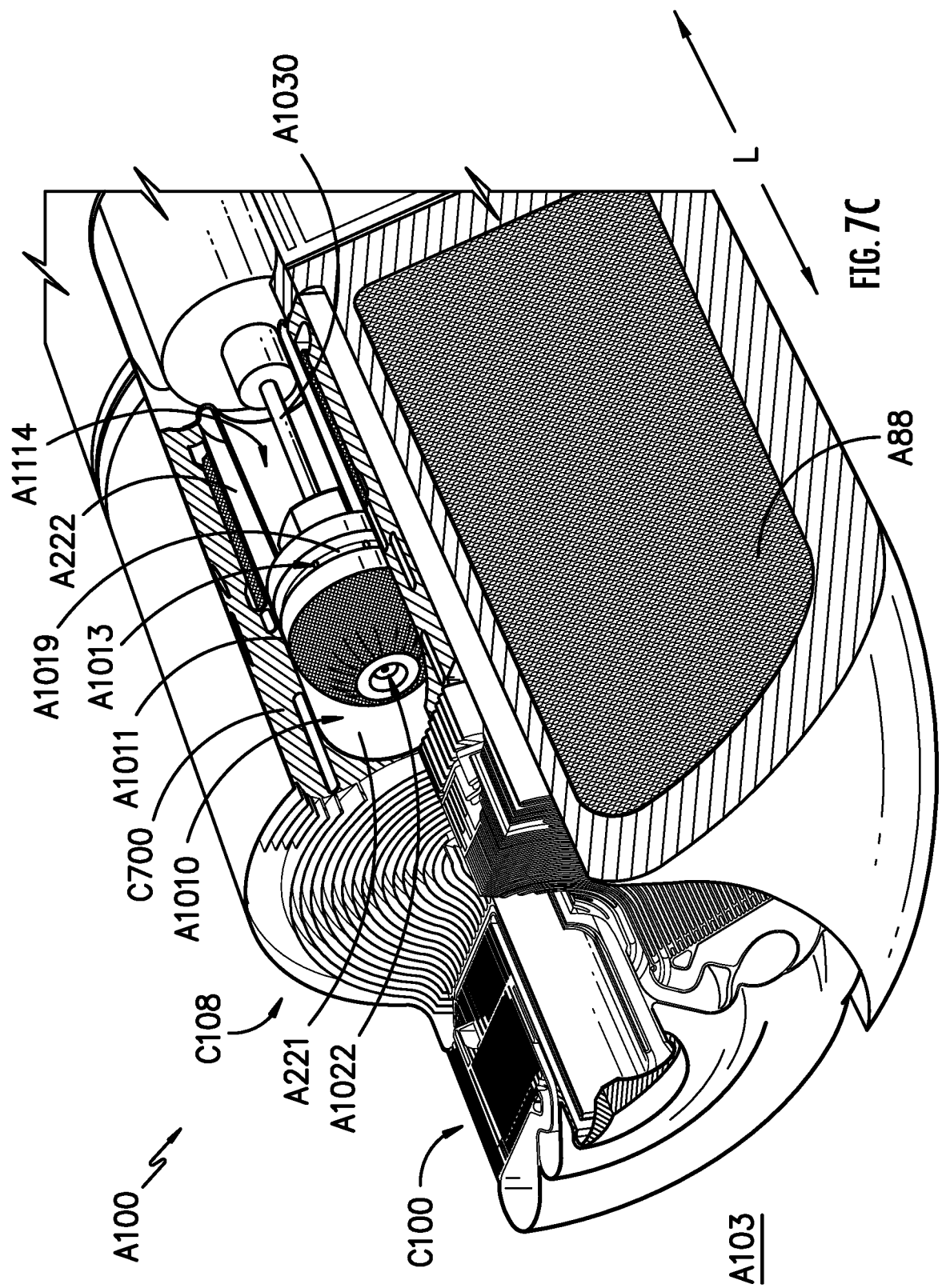

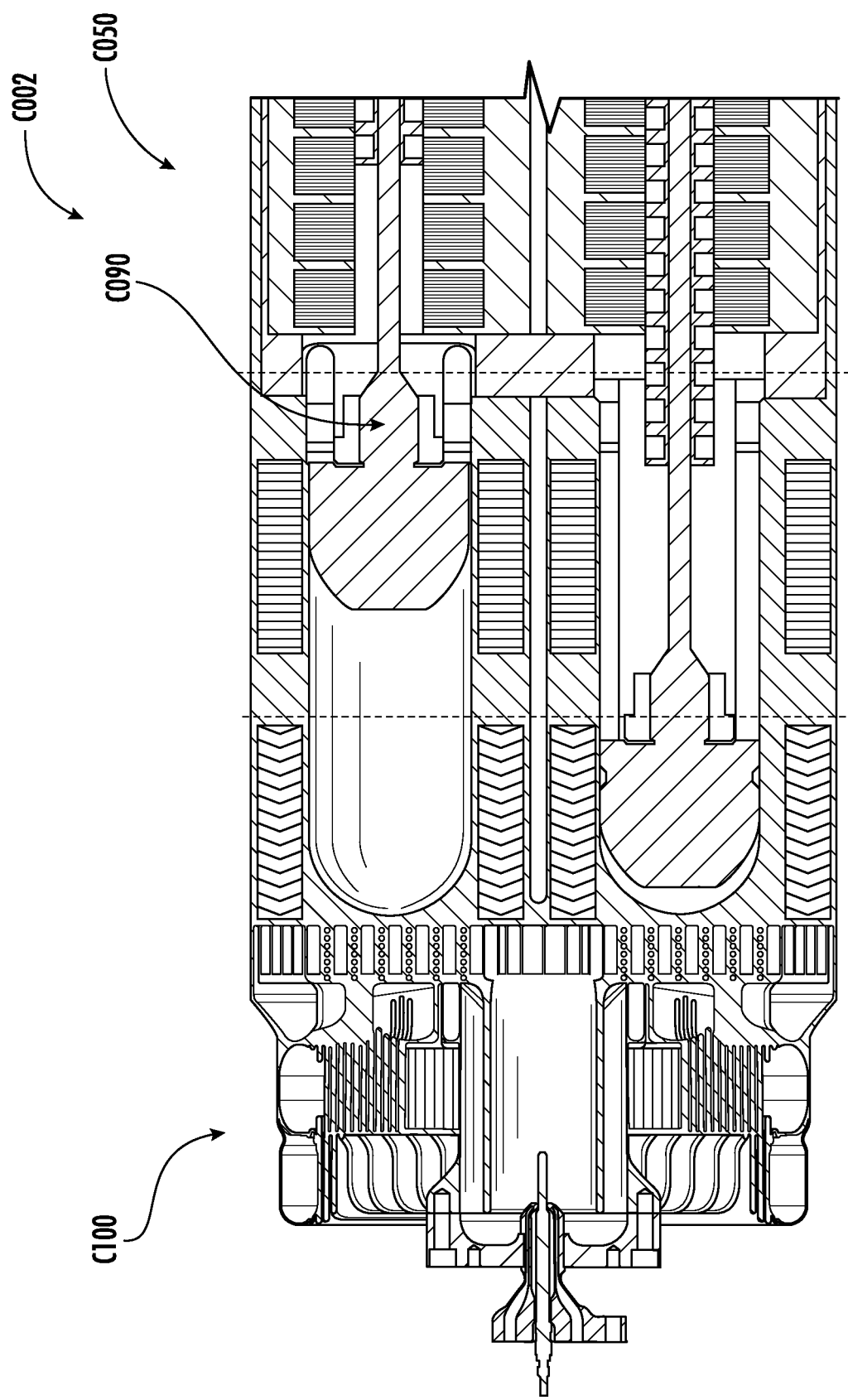

ENERGY CONVERSION APPARATUS

CROSS-REFERENCE TO RELATED APPLICATIONS

The present application claims priority to each of the following U.S. Provisional Applications, the contents of which are incorporated herein by reference in their entirety for all purposes as if set forth verbatim: App. No. 62/850,599, filed May 21, 2019; App. No. 62/850,623, filed May 21, 2019; App. No. 62/850,678, filed May 21, 2019; App. No. 62/850,692, filed May 21, 2019; and App. No. 62/850,701, filed May 21, 2019. The present application also incorporates by reference International Patent Application Number PCT/US2020/033674 filed on May 20, 2020 in its entirety for all purposes.

FIELD

The present subject matter relates generally to energy conversion systems, power generation systems, and energy distribution systems. The present subject matter additionally relates to heat exchangers and heat exchanger systems. The present subject matter further relates to piston engine assemblies, such as closed-cycle engine systems. The present subject matter still further relates to systems and methods for control or operation of one or more systems of the present subject matter herein.

BACKGROUND

Power generation and distribution systems are challenged to provide improved power generation efficiency and/or lowered emissions. Furthermore, power generation and distribution systems are challenged to provide improved power output with lower transmission losses. Certain power generation and distribution systems are further challenged to improve sizing, portability, or power density generally while improving power generation efficiency, power output, and emissions.

Certain engine system arrangements, such as closed cycle engines, may offer some improved efficiency over other engine system arrangements. However, closed cycle engine arrangements, such as Stirling engines, are challenged to provide relatively larger power output or power density, or improved efficiency, relative to other engine arrangements. Closed cycle engines may suffer due to inefficient combustion, inefficient heat exchangers, inefficient mass transfer, heat losses to the environment, non-ideal behavior of the working fluid(s), imperfect seals, friction, pumping losses, and/or other inefficiencies and imperfections. As such, there is a need for improved closed cycle engines and system arrangements that may provide improved power output, improved power density, or further improved efficiency. Additionally, there is a need for an improved closed cycle engine that may be provided to improve power generation and power distribution systems.

Additionally, or alternatively, there is a general need for improved heat transfer devices, such as for heat engines, or as may be applied to power generation systems, distribution systems, propulsion systems, vehicle systems, or industrial or residential facilities.

Furthermore, there is a need for improved control system and methods for operating power generation systems as may include subsystems that collectively may provide improved power generation efficiency or reduced emissions.

BRIEF DESCRIPTION

Aspects and advantages will be set forth in part in the following description, or may be apparent from the description, or may be learned through practicing the presently disclosed subject matter.

In one aspect, the present disclosure embraces energy conversion apparatuses. An exemplary energy conversion apparatus may include an engine assembly, such as a monolithic engine assembly. An exemplary engine assembly may include a first heater body and a first engine body. The first heater body may define a first portion of a first monolithic body or at least a portion of a first monolithic body-segment. The first engine body may define a second portion of the first monolithic body or at least a portion of a second monolithic body-segment operably coupled or operably couplable to the first heater body. In some embodiments, the engine assembly may include a second heater body and/or a second engine body. The second heater body may define a portion of a second monolithic body or a fourth monolithic body-segment. The second engine body may define a portion of the second monolithic body or a fifth monolithic body-segment operably coupled or operably couplable to the second heater body and/or the first engine body.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure including the best mode, directed to one of ordinary skill in the art, is set forth in the specification, which makes reference to the appended figures, in which:

FIG. 5 is a chart depicting nominal heat balances of prime-movers as a percentage of fuel input;

FIG. 7C is a perspective cutaway view of an exemplary portion of an exemplary embodiment of an engine according to an aspect of the present disclosure;

FIGS. 20A and 20B schematically depict a cross-sectional view of an exemplary closed-cycle engine, which may be a regenerative heat engine and/or a Stirling engine;

Figure 1:
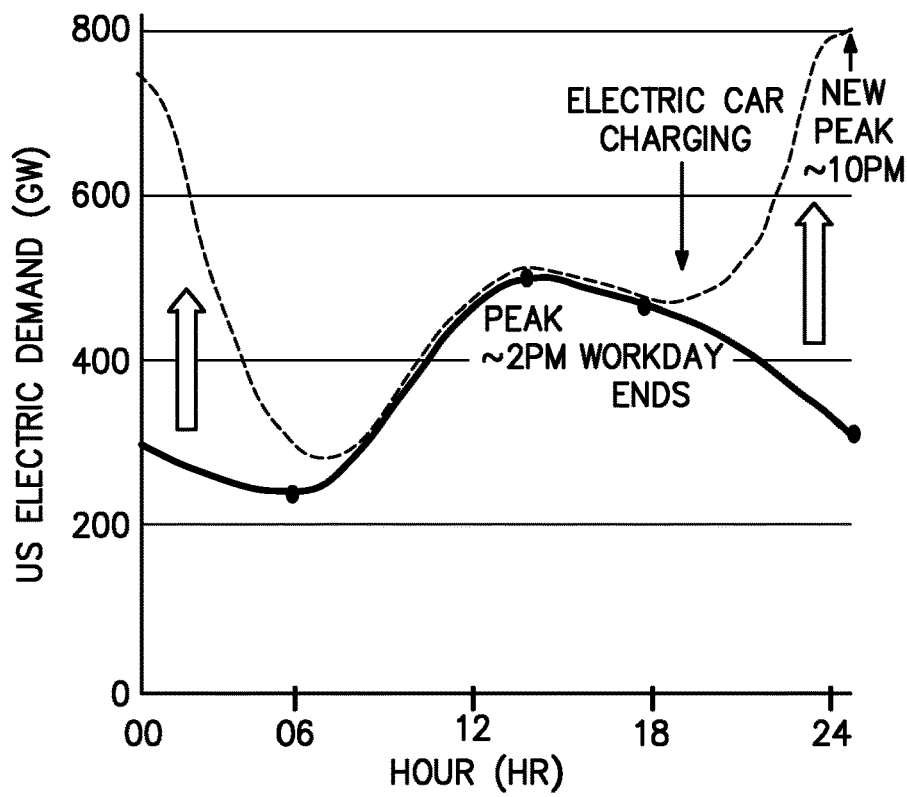
FIG. 1 is a graph depicting power demand as a function of time of day.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure and not limitation. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. In another instance, ranges, ratios, or limits associated herein may be altered to provide further embodiments, and all such embodiments are within the scope of the present disclosure. Unless otherwise specified, in various embodiments in which a unit is provided relative to a ratio, range, or limit, units may be altered, and/or subsequently, ranges, ratios, or limits associated thereto are within the scope of the present disclosure. Thus, it is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms "clockwise" and "counter-clockwise" are terms of convenience and are not to be limiting. Generally, the terms "clock-wise" and "counter-clockwise" have their ordinary meaning, and unless otherwise indicated refer to a direction with reference to a top-down or upright view. Clockwise and counter-clockwise elements may be interchanged without departing from the scope of the present disclosure.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Power generation and distribution systems are generally challenged to reduce production inefficiencies, transmission losses, and emissions (e.g., oxides of nitrogen, sulfur, or carbon) during and post energy production. For example, the U.S. Energy Information Administration (EIA) estimates that electricity transmission and distribution (T&D) losses average about 5% annually in the United States, with other estimates of line losses of 8% or higher. With average power plant efficiencies in the United States of about 30% to 40%, overall electrical efficiency at the end user (e.g., residences, businesses, etc.) is approximately 25% to 35%. Local, distributed, or on-demand power generation may not require access to T&D networks or grids, such as to result in an at least 5% improvement in efficiency, in addition to reducing emission and adverse environmental impacts.

In the United States, power generation may account for approximately one-third of national greenhouse gas emissions. Transportation may further account for another approximately one-third of national greenhouse gas emissions, about 85% of which may be from ground transportation vehicles (e.g., cars, trucks, buses, etc.). Known systems for reducing emissions include chemical or catalytic reduction after-treatment. However, such systems may be expensive to acquire and maintain, complex, or heavy, thereby reducing overall system efficiency. Additionally, such systems may be difficult to regulate, such that emissions reduction benefits may be lost after initial acquisition. Furthermore, although known systems have resulted in reducing emissions of high reactive gases such as unburned hydrocarbons, volatile organic compounds, or oxides of sulfur or nitrogen, emissions of greenhouse gases such as carbon dioxide may generally correspond or increase with power generation and consumption.

Figure 2:
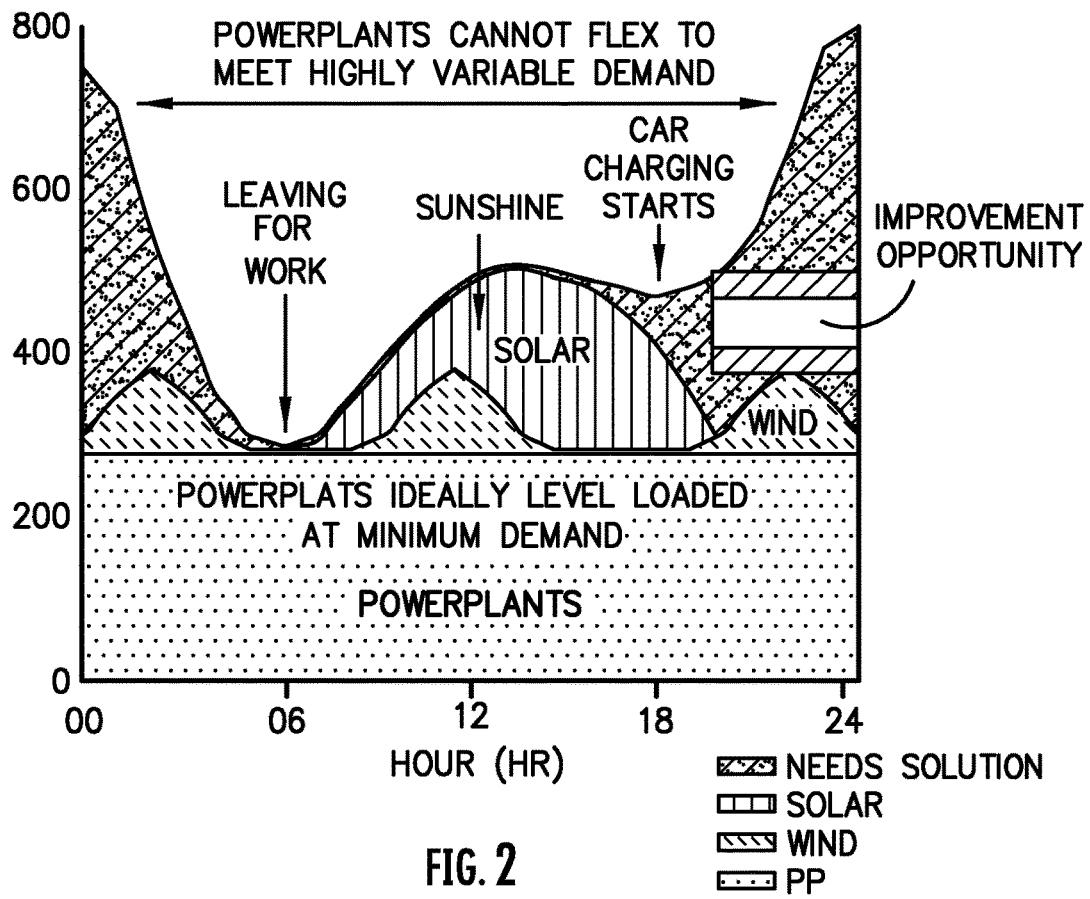
FIG. 2 is a graph depicting power demand versus energy supply from various power generation and distribution systems and a forecasted gap in supply and demand brought to power generation and distribution by an increase in electric load demand.

Power generation and distribution systems may turn to renewable energy sources such as solar, wind, or tidal energy to reduce emissions. However, renewable energy sources are often periodic or unpredictable, such as depicted in FIG. 1 and FIG. 2. For example, referring to FIG. 1-FIG. 2, available sunlight for solar power generation is dependent on the time of day and weather. As another example, wind power generation is dependent on weather patterns and may be both unpredictable and irregular. As still another example, tidal power generation is dependent on currents and lunar phases. Additionally, renewable energy sources are difficult to incorporate to transportation systems due to size, scale, and desired power output and density.

Historically, peak power demand occurs in the mid-afternoon, such as due to high industrial usage. In contrast, power usage is historically lower during the overnight hours when residential and industrial usage is both relatively low. However, overnight power demand is expected to increase with increased electrification, such as with increased usage of electric vehicles. Additionally, daytime power demand may further increase, further increasing peak power demands. For example, full charging of electric vehicles may take 4 to 8 hours and may generally occur overnight when power usage is historically low. Additionally, or alternatively, electric vehicle charging may occur during the workday, such as after a morning commute and during business hours, which may further increase industrial power usage. Generally, current power generation and distribution systems are inflexible relative to changes in usage and demand throughout a day, such as depicted in regard to FIG. 1-FIG. 2. Additionally, such inflexibility may be exasperated by periodic, irregular, or unpredictable power generation from renewable energy sources.

In addition, or alternatively, power generation and distribution infrastructure is costly and renders large geographic areas vulnerable to power outages based on adverse weather, natural or man-made disasters, equipment malfunctions and failures, or maintenance activities. Initial and on-going costs, such as maintenance and repair, result in barriers to further development of access to electricity in developing countries and rural areas. Expanding access to electricity may be hindered by relatively high costs to establish generation and distribution infrastructure, relatively high operational costs, and an ability for governments, corporations, or consumers to pay or invest in power generation and distribution. Such costs may also pose barriers to further maintenance and development in developed countries, as older infrastructure and natural or man-made disasters may cause maintenance or improvement to be cost-prohibitive. For example, in the United States, power lines and transformers are approximately 30 years old on average. Replacement costs for such equipment have been estimated at over $1 trillion dollars.

Such issues and barriers from power generation and distribution systems may further pose barriers to developing or expanding access to clean water, water desalination, and food security. Additionally, or alternatively, smaller scale or portable power generation systems that may overcome distribution obstacles may nonetheless be challenged to provide a necessary power density and output. Such limitations in power density and output may generally result in an inability to apply smaller scale or portable power generation systems to rural areas or developing nations. Furthermore, as clean water treatment and desalination are generally energy intensive, smaller scale or portable power generation system may generally provide inadequate power density and output for providing water to rural or less population-dense areas.

As such, there is a need for power generation systems that provide improved efficiency and reduced emissions over known power generation systems that may further be sized or scaled to provide improved power distribution without adversely affecting efficiency and emissions. The need for improved power generation systems is further, or alternatively, such that issues regarding power distribution, power generation versus changing peak power demands, emissions, barriers to infrastructure development, and challenges and limitations posed by vehicle electrification may each be addressed, improved upon, or alleviated.

Small-scale or portable power generation systems are desirable for applications including space vehicles and systems, automotive drivetrain and aerospace propulsion electrification, direct cooling sources, and portable or distributed power generation such as to address issues regarding power generation efficiency, density, and output. However, there is a need for improved thermal efficiency, electrical conversion efficiency, or both, for such systems.

Figure 3:
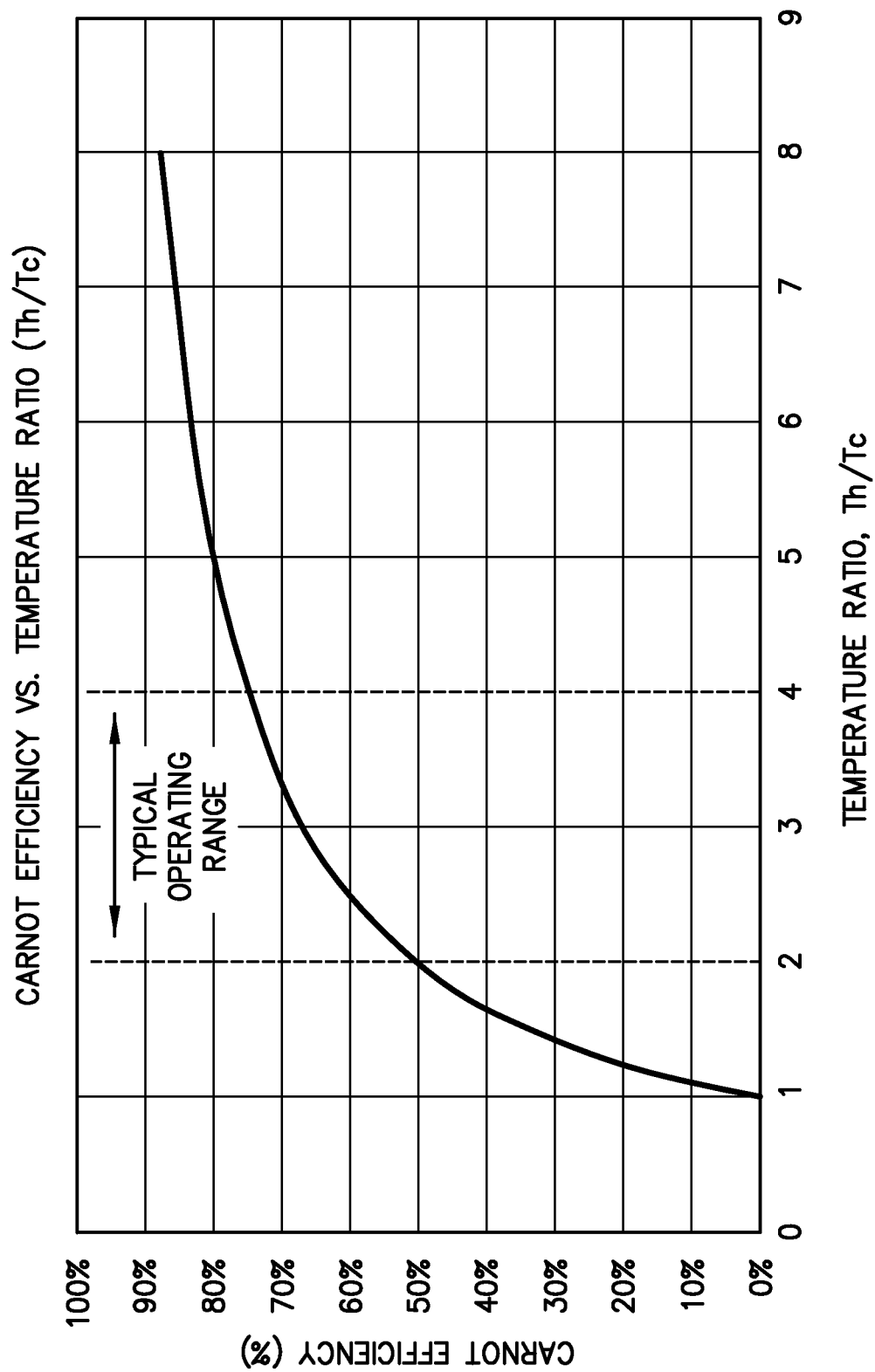
FIG. 3 is a graph depicting Carnot efficiency versus temperature ratio.
Figure 4:
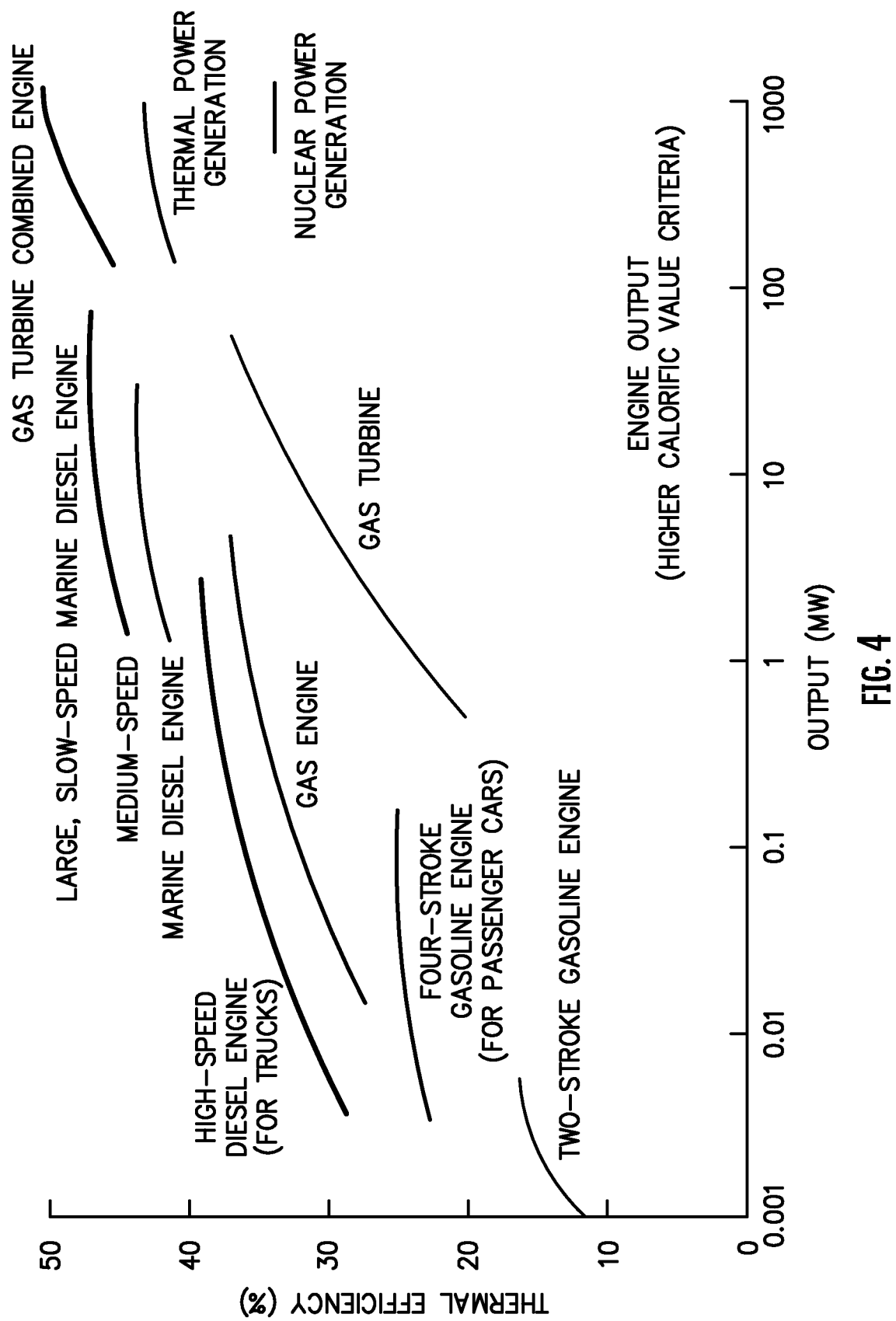
FIG. 4 is a graph depicting thermal efficiency versus power output.

Heat engines and other devices for converting thermal energy into useful work are generally inefficient. Carnot's theorem states that the maximum theoretical efficiency ($\eta_{Carnot}$) for an ideal, reversible heat engine is given by:

$$\eta_{Carnot} = 1 - \left(\frac{T_{Hot,engine}}{T_{Cold,ambient}}\right)$$

where $T_{hot,engine}$ is the absolute temperature (e.g. in Rankine or Kelvin) at which heat enters the engine and $T_{cold,ambient}$ is the absolute temperature of the environment into which the engine exhausts its waste heat. Carnot efficiencies for terrestrial applications over 90% and Carnot efficiencies for space applications of over 99% are theoretically possible based at least on known fuel sources. However, in practice, $T_{Hot,engine}$ is limited by the maximum operating temperature of the materials in the engine and $T_{Cold,ambient}$ is limited by an available heat sink available (e.g., the atmosphere at ambient temperature, the temperature of a body of water, etc.). Thus, heat engines may generally operate with a temperature ratio ($T_{Hot,engine}/T_{cold,ambient}$) between 2 and 4 and have actual Carnot efficiencies between 50% and 70% (FIG. 3). In contrast, open cycle internal combustion engines, such as those that use the Otto cycle, are generally limited to a maximum theoretical efficiency between 60% and 70% based at least on a fuel type or compression ratio at the open cycle engine. Closed cycle heat engines operate through an exchange of thermal energy to and from relatively hot and cold volumes of a piston engine. Closed cycle heat engines, such as Stirling arrangements, or variations thereof, such as Franchot or Vuilleimier arrangements, generally have a maximum theoretical efficiency that is the Carnot efficiency. As such, closed cycle engines such as Stirling arrangements are considered to have a greater potential as high efficiency engines based at least on the difference in maximum theoretical efficiency and actual efficiency.

Achieving maximum theoretical efficiency of an engine is challenged or limited based at least on inefficient combustion, inefficient heat exchange, heat losses to a surrounding environment, non-ideal behavior of one or more working fluids, friction losses, pumping losses, or other inefficiencies and imperfections. Actual or real thermal efficiency $\eta_{th}$ of a heat engine is given by:

$$\eta_{th} = \frac{W_{out}}{Q_{in}} = \frac{Q_{in} - Q_{out}}{Q_{in}} = 1 - \frac{Q_{out}}{Q_{in}}$$

where $W_{out}$ is the net useful work done by the engine, $Q_{in}$ is the thermal energy received by the engine, and $Q_{out}$ is the thermal energy lost or rejected to the environment. Achievable thermal efficiency tends to increase with power output. For example, motor vehicle applications are generally 20% to 35% thermally efficient, while large marine and stationary diesel systems can exceed 50% thermal efficiency (FIG. 3). Stirling engines have demonstrated thermal efficiencies up to 38%.

The useful work generated by a heat engine can further be converted into electrical energy. The electrical efficiency ($\eta_{El}$) can be calculated in the same manner as the thermal efficiency:

$$\eta_{El} = \frac{E_{out}}{Q_{in}}$$

where $E_{out}$ is the net electrical energy output from an electric machine that is operatively coupled to the engine and $Q_{in}$ is the thermal energy received by the engine. $E_{out}$ may be calculated by subtracting any electricity required to operate the power generation system from the gross power generated by the system. If combustion is the source of heating working fluid for the engine, the electrical efficiency may be calculated using a lower heating value (LHV) of the fuel. Gas turbine power plants have demonstrated greater than 41% LHV electrical efficiency. Stirling engines have demonstrated LHV electrical efficiencies between 10% and 30%.

Waste heat, or an amount of heat from a heat engine that is not converted into useful work, may be recoverable to provide additional benefit before being exhausted. The amount and quality of the recoverable heat varies based on the cycle, the engine (FIG. 5), and the operating conditions. High grade or otherwise high quality waste heat may be used in one or more additional heat engines or power generation cycles before being exhausted, such as in one or more bottoming cycles of a combined cycle power generation system. For example, the waste heat from a gas turbine power generation system may be used to boil water for a bottoming steam power generation cycle. The electrical efficiency $\eta_{CC}$ of a combined cycle power generation system is given by:

$$\eta_{CC} = \frac{\Sigma(E_{out,1} + E_{out,2} + \ldots E_{out,n})}{\Sigma Q_{in}}$$

where $E_{out,1}$ is the net electricity produced by a first power generation cycle, $E_{out,2}$ is the net electricity produced by a second power generation cycle, $E_{out,n}$ is the net electricity produced by an $n^{th}$ (final) power generation cycle, and $\Sigma Q_{in}$ is the net thermal energy received by the system. Generally, the net thermal energy received by the system may be nominally $Q_{in}$ of the topping cycle, or additionally or alternatively inclusive of any supplementary thermal input (e.g. supplementary firings, if applicable). Stated another way, $\eta_{CC}$ is the total net electricity generated by the entire combined cycle power generation system divided by the total energy input into the combined cycle system. Some combined cycle power generation systems may include an efficiency (i.e., LHV electrical efficiency) of up to approximately 62% for a gas turbine bottomed by a steam cycle.

Waste heat may also be used to produce hot water, process steam, or other useful products that would otherwise require additional energy input to produce in a combined heat and power (CHP) system or cogeneration system, after a combined cycle, or in lieu thereof. The overall electrical efficiency $\eta_{CHP}$ of a combined heat and power system is given by:

$$\eta_{CHP} = \frac{E_{out} + \Sigma Q_{th}}{Q_{in}}$$

where $E_{out}$ is the net useful power output of the system, $\Sigma Q_{th}$ is the sum of the net useful thermal outputs from the system, and $Q_{in}$ is the thermal energy received by the system. CHP systems may have demonstrated total efficiencies between 55% and 85%. Stirling engines may have total efficiencies of 88% and higher. However, higher CHP system efficiencies can come at the cost of lower thermal efficiency, lower electrical efficiency, or both. For example, $\eta_{CHP}$ can maximized by maximizing $\Sigma Q_{th}$, which may be achieved at the cost of electricity generation.

Known closed cycle engines, such as Stirling arrangements, are challenged to produce increasing levels of power output and power density, and generally compromise improved efficiency or power output with larger sizes and scaling. Such larger sizes or scales can negate other desirable qualities of the engine, such as relatively small-scale or portability. Stirling engines tend to be small, with power generation of 1-5 kW for domestic use, up to 25 kW for commercial use, or up to 75 kW for military use. At least one 75 kW engine Stirling engine is a four shaft kinematic Stirling engine for use in submarines. It is nominally 1.1 m in diameter, 1.75 m long, including the generator and control system but not including the fuel or oxidizer sources, with an energy density of 175 kWh/ton.

Stirling engines may generally include two types: kinematic or free piston. Kinematic Stirling engines use mechanically-connected piston assemblies to transmit and convert linear motion of the pistons to a rotary motion for an output shaft. Although such systems may address issues regarding power transmission and stability of the engine, mechanically-connected piston assemblies introduce relatively large power losses via the mechanical members. Additionally, or alternatively, the relatively fixed relationship of mechanically-connected piston assemblies limits the mechanical stroke of the piston assembly. As such, the efficiency of mechanically-connected multi-piston assemblies in a closed cycle engine is decreased in addition to mechanical losses (e.g., friction, leakage, inertia, etc.).

Single-piston free piston closed cycle engine arrangements generally exchange improved thermal efficiency for lower total power generation and density. As such, single-piston free piston closed cycle engine arrangements are not generally suited for higher power output applications.

Multi-piston free piston closed cycle engine arrangements may provide thermal efficiencies of single-piston free piston arrangements and further increase total power generation. However, multi-piston free piston arrangements generally differ from single-piston arrangements and mechanically-connected multi-piston arrangements in that the cycle or motion of a multi-piston free piston arrangement is generally determined by thermo-mechanical interactions of the entire system including the free pistons, the thermal source(s), and a power extraction apparatus. The thermo-mechanical interactions may further include mechanical losses and their effect on balance of the entire system.

For example, multi-piston free-piston closed cycle engines are challenged to respond to time lags. As another example, if one piston assembly drifts from an intended position a subsequent oscillation can become unbalanced. An unbalanced arrangement may lead to undesired vibrations, crashing of the pistons to end walls, or other mechanical losses that may further reduce power output, induce wear and deterioration, or otherwise reduce efficient, stable, or effective use of a multi-piston free piston engine.

As such, there is a need for improved closed cycle engines such as Stirling engines that provide improved power generation efficiency and output. Additionally, there is a need for such improved closed cycle engines that may further retain or improve power density, such as to provide relatively small-scale or portability such as to provide improved application to power generation and distribution systems.

Figure 6:
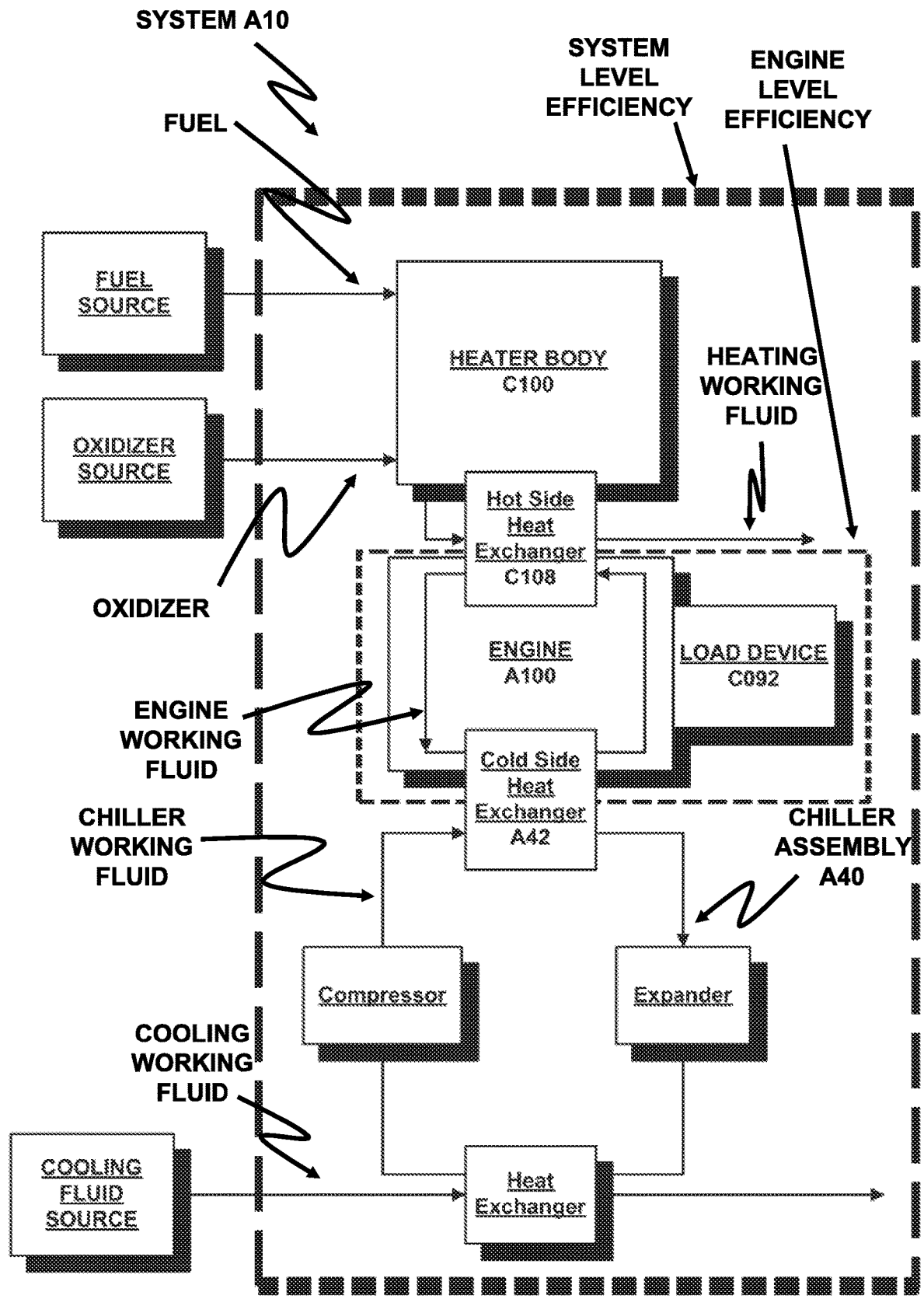
FIG. 6 is a schematic block diagram depicting a system for energy conversion according to an aspect of the present disclosure.
Figure 7A:
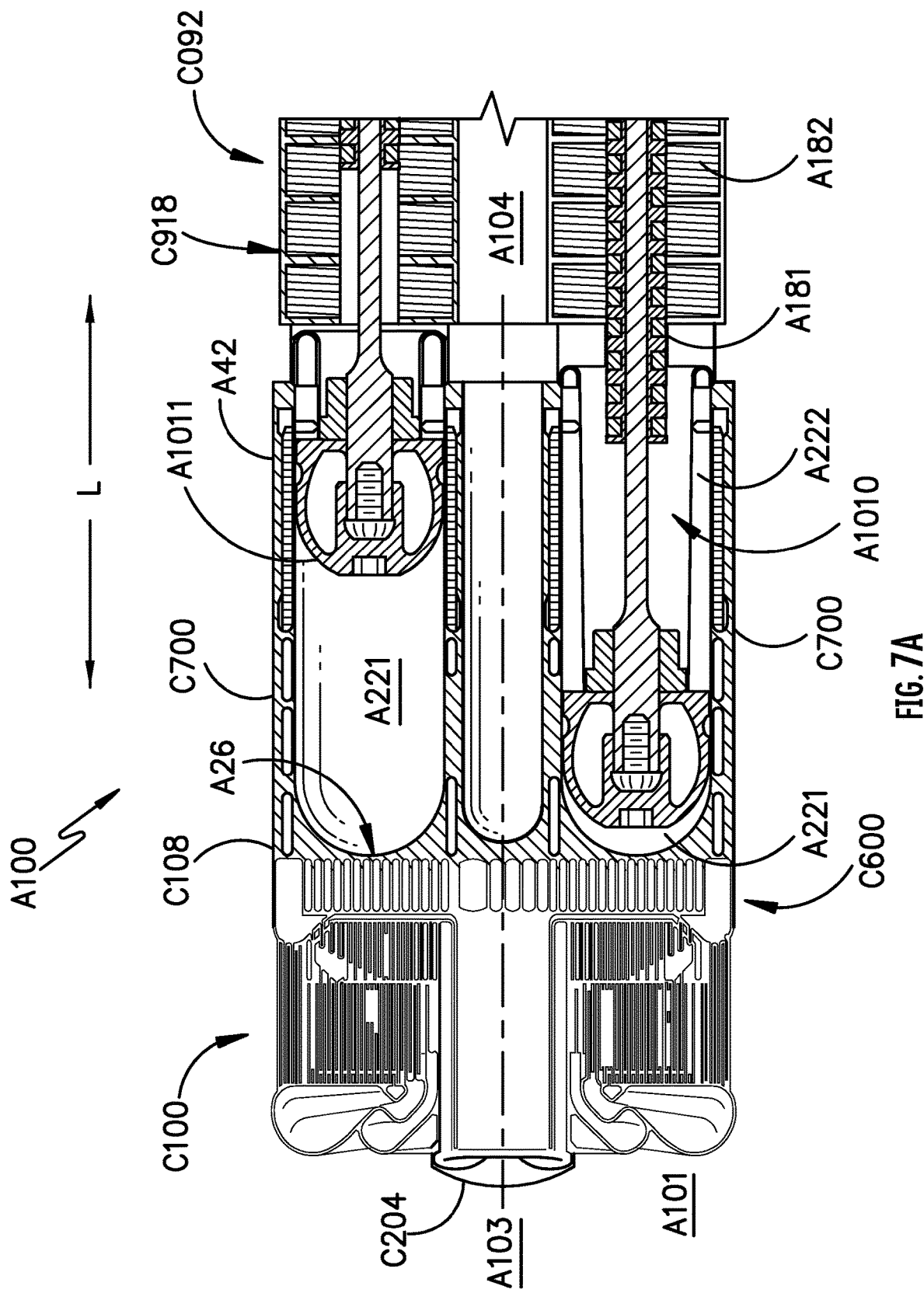
FIGS. 7A and 7B show a cross sectional view of an exemplary embodiment of a closed cycle engine and load device according to an aspect of the present disclosure.
Figure 7B:
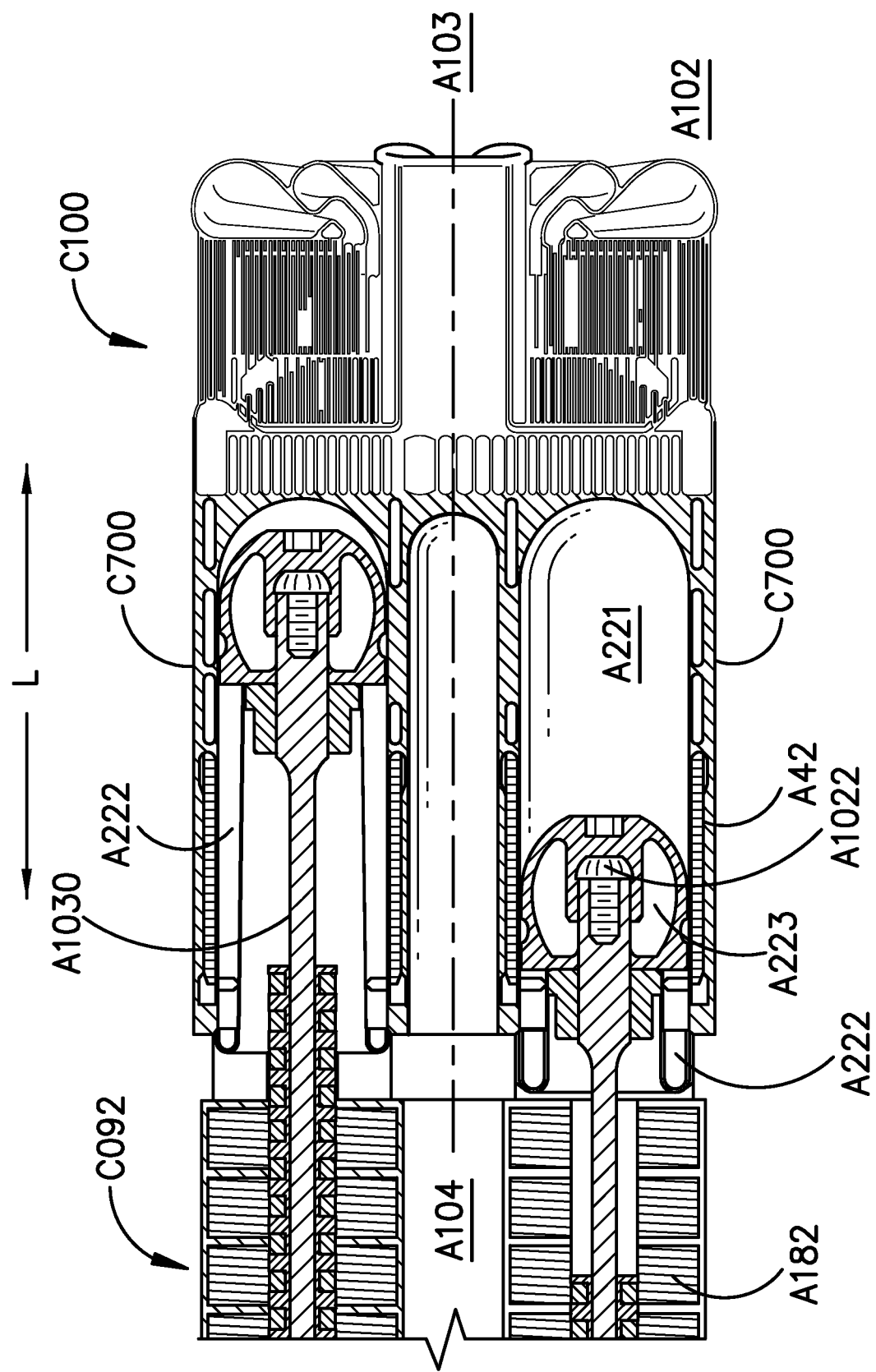

Referring now to FIG. 6, an exemplary schematic block diagram depicting a system for energy conversion (hereinafter, "system A10") is provided. Various embodiments of the system A10 provided herein include systems for power generation, a heat recovery system, a heat pump or cryogenic cooler, a system including and/or acting as a bottoming cycle and/or a topping cycle, or other system for producing useful work or energy, or combinations thereof. Referring additionally to FIGS. 7A and 7B, various embodiments of the system A10 include a closed cycle engine apparatus (hereinafter, "engine A100", apparatus "A100", or "engine assembly C900", or otherwise denoted herein) operably coupled to a load device c092. The engine A100 contains a substantially fixed mass of an engine working fluid to which and from which thermal energy is exchanged at a respective cold side heat exchanger A42 and a hot side heat exchanger C108. In one embodiment, the engine working fluid is helium. In other embodiments, the engine working fluid may include air, nitrogen, hydrogen, helium, or any appropriate compressible fluid, or combinations thereof. In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the engine. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device C092 is a mechanical work device or an electric machine. In one embodiment, the load device C092 is a pump, compressor, or other work device. In another embodiment, the load device C092 as an electric machine is configured as a generator producing electric energy from movement of a piston assembly A1010 at the engine. In still another embodiment, the electric machine is configured as a motor providing motive force to move or actuate the piston assembly A1010, such as to provide initial movement (e.g., a starter motor). In still various embodiments, the electric machine defines a motor and generator or other electric machine apparatus such as described further herein.

A heater body C100 is thermally coupled to the engine A100. The heater body C100 may generally define any apparatus for producing or otherwise providing a heating working fluid such as to provide thermal energy to the engine working fluid. Various embodiments of the heater body C100 are further provided herein. Exemplary heater bodies C100 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies C100 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. The exemplary heater body C100 providing thermal energy to the engine working fluid may include all or part of a combined heat and power cycle, or cogeneration system, or power generation system generally.

In still various embodiments, the heater body C100 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane ($C_2$), methane, high $H_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, the system A10 includes a working fluid body C108, such as further described herein. In one embodiment, the working fluid body C108 defines a hot side heat exchanger A160, such as further described herein, from which thermal energy is output to the engine working fluid at an expansion chamber A221 of the engine. The working fluid body C108 is positioned at the expansion chamber A221 of the engine in thermal communication with the heater body C100. In other embodiments, the working fluid body C108 may be separate from the heater body C100, such that the heating working fluid is provided in thermal communication, or additionally, in fluid communication with the working fluid body C108. In particular embodiments, the working fluid body C108 is positioned in direct thermal communication with the heater body C100 and the expansion chamber A221 of the engine A100 such as to receive thermal energy from the heater body C100 and provide thermal energy to the engine working fluid within the engine.

In still various embodiments, the heater body C100 may include a single thermal energy output source to a single expansion chamber A221 of the engine. As such, the system A10 may include a plurality of heater assemblies each providing thermal energy to the engine working fluid at each expansion chamber A221. In other embodiments, such as depicted in regard to FIGS. 7A and 7B, the heater body C100 may provide thermal energy to a plurality of expansion chambers A221 of the engine. In still other embodiments, such as depicted in regard to FIG. 8, the heater body includes a single thermal energy output source to all expansion chambers A221 of the engine.

The system A10 further includes a chiller assembly, such as chiller assembly A40 further described herein. The chiller assembly A40 is configured to receive and displace thermal energy from a compression chamber A222 of the engine.

The system A10 includes a cold side heat exchanger A42 thermally coupled to the compression chamber A222 of the closed cycle engine and the chiller assembly. In one embodiment, the cold side heat exchanger A42 and the piston body C700 defining the compression chamber A222 of the engine are together defined as an integral, unitary structure. In still various embodiments, the cold side heat exchanger A42, at least a portion of the piston body C700 defining the compression chamber A222, and at least a portion of the chiller assembly together define an integral, unitary structure.

In various embodiments, the chiller assembly A40 is a bottoming cycle to the engine A100. As such, the chiller assembly A40 is configured to receive thermal energy from the engine A100. The thermal energy received at the chiller assembly A40, such as through a cold side heat exchanger A42, or cold side heat exchanger A170 further herein, from the engine A100 is added to a chiller working fluid at the chiller assembly A40. In various embodiments, the chiller assembly A40 defines a Rankine cycle system through which the chiller working fluid flows in closed loop arrangement with a compressor. In some embodiments, the chiller working fluid is further in closed loop arrangement with an expander. In still various embodiments, the system A10 includes a heat exchanger A88 (FIG. 7C). In various embodiments, the heat exchanger A188 may include a condenser or radiator. The cold side heat exchanger A40 is positioned downstream of the compressor and upstream of the expander and in thermal communication with a compression chamber A222 of the closed cycle engine, such as further depicted and described in regard to FIGS. 7A and 7B-FIG. 7C. In various embodiments, the cold side heat exchanger A42 may generally define an evaporator receiving thermal energy from the engine A40.

Referring still to FIG. 6, in some embodiments, the heat exchanger A188 is positioned downstream of the expander and upstream of the compressor and in thermal communication with a cooling working fluid. In the schematic block diagram provided in FIG. 6, the cooling working fluid is an air source. However, in various embodiments, the cooling fluid may define any suitable fluid in thermal communication with the heat exchanger. The heat exchanger may further define a radiator configured to emit or dispense thermal energy from the chiller assembly A40. A flow of cooling working fluid from a cooling fluid source is provided in thermal communication with the heat exchanger to further aid heat transfer from the chiller working fluid within the chiller assembly A40 to the cooling working fluid.

As further described herein, in various embodiments the chiller assembly A40 may include a substantially constant density heat exchanger. The constant density heat exchanger generally includes a chamber including an inlet and an outlet each configured to contain or trap a portion of the chiller working fluid for a period of time as heat from the closed cycle engine is transferred to the cold side heat exchanger A42. In various embodiments, the chamber may define a linear or rotary chamber at which the inlet and the outlet are periodically opened and closed via valves or ports such as to trap the chiller working fluid within the chamber for the desired amount of time. In still various embodiments, the rate at which the inlet and the outlet of the chamber defining the constant density heat exchanger is a function at least of velocity of a particle of fluid trapped within the chamber between the inlet and the outlet. The chiller assembly A40 including the constant density heat exchanger may provide efficiencies, or efficiency increases, performances, power densities, etc. at the system A10 such as further described herein.

It should be appreciated that in other embodiments, the chiller assembly A40 of the system A10 may include a thermal energy sink generally. For example, the chiller assembly A40 may include a body of water, the vacuum of space, ambient air, liquid metal, inert gas, etc. In still various embodiments, the chiller working fluid at the chiller assembly A40 may include, but is not limited to, compressed air, water or water-based solutions, oil or oil-based solutions, or refrigerants, including, but not limited to, class 1, class 2, or class 3 refrigerants. Further exemplary refrigerants may include, but are not limited to, a supercritical fluid including, but not limited to, carbon dioxide, water, methane, ethane, propane, ethylene, propylene, methanol, ethanol, acetone, or nitrous oxide, or combinations thereof. Still exemplary refrigerants may include, but are not limited to, halon, perchloroolefin, perchlorocarbon, perfluoroolefin, perfluorocarbon, hydroolefin, hydrocarbon, hydrochloroolefin, hydrochlorocarbon, hydrofluoroolefin, hydrofluorocarbon, hydrochloroolefin, hydrochlorofluorocarbon, chlorofluoroolefin, or chlorofluorocarbon type refrigerants, or combinations thereof. Still further exemplary embodiments of refrigerant may include, but are not limited to, methylamine, ethylamine, hydrogen, helium, ammonia, water, neon, nitrogen, air, oxygen, argon, sulfur dioxide, carbon dioxide, nitrous oxide, or krypton, or combinations thereof.

It should be appreciated that where combustible or flammable refrigerants are included for the chiller working fluid, various embodiments of the system A10 may beneficially couple the heater body C100, and/or the fuel source, and the chiller assembly A40 in fluid communication such that the combustible or flammable working fluid to which thermal energy is provided at the chiller assembly A40 may further be utilized as the fuel source for generating heating working fluid, and the thermal energy therewith, to output from the heater body C100 to the engine working fluid at the engine A100.

Various embodiments of the system A10 include control systems and methods of controlling various sub-systems disclosed herein, such as, but not limited to, the fuel source, the oxidizer source, the cooling fluid source, the heater body C100, the chiller assembly C40, the engine A100, and the load device C092, including any flow rates, pressures, temperatures, loads, discharges, frequencies, amplitudes, or other suitable control properties associated with the system A10. In one aspect, a control system for the system A10 defining a power generation system is provided. The power generation system includes one or more closed cycle engines (such as engine A100), one or more load devices defining electric machines (such as load device C092) operatively coupled to the engine, and one or more energy storage devices in communication with the electric machines.

The control system can control the closed cycle engine and its associated balance of plant to generate a temperature differential, such as a temperature differential at the engine working fluid relative to the heating working fluid and the chiller working fluid. Thus, the engine defines a hot side, such as at the expansion chamber A221, and a cold side, such as at the compression chamber A222. The temperature differential causes free piston assemblies A1010 to move within their respective piston chambers defined at respective piston bodies C700. The movement of the pistons A1011 causes the electric machines to generate electrical power. The generated electrical power can be provided to the energy storage devices for charging thereof. The control system monitors one or more operating parameters associated with the closed cycle engine, such as piston movement (e.g., amplitude and position), as well as one or more operating parameters associated with the electric machine, such as voltage or electric current. Based on such parameters, the control system generates control commands that are provided to one or more controllable devices of the system A10. The controllable devices execute control actions in accordance with the control commands. Accordingly, the desired output of the system A10 can be achieved.

Furthermore, the control system can monitor and anticipate load changes on the electric machines and can control the engine A100 to anticipate such load changes to better maintain steady state operation despite dynamic and sometimes significant electrical load changes on the electric machines. A method of controlling the power generation system is also provided. In another aspect, a control system for a heat pump system is provided. The heat pump system includes one or more of the closed cycle engines described herein. A method of controlling the heat pump system is also provided. The power generation and heat pump systems as well as control methods therefore are provided in detail herein.

Referring now to FIGS. 7A and 7B-FIG. 7C, exemplary embodiments of the system A10 are further provided. FIGS. 7A and 7B is an exemplary cross sectional view of the system A10 including the heater body C100 and the chiller assembly A40 each in thermal communication with the engine A100, or particularly the engine working fluid within the engine A100, such as shown and described according to the schematic block diagram of FIG. 6. FIG. 7C is an exemplary cutaway perspective view of a portion of the engine A100. The system A10 includes a closed cycle engine A100 including a piston assembly A1010 positioned within a volume or piston chamber C112 (FIGS. 11A and 11B-FIGS. 16A and 16B) defined by a wall defining a piston body C700. The volume within the piston body C700 is separated into a first chamber, or hot chamber, or expansion chamber A221 and a second chamber, or cold chamber (relative to the hot chamber), or compression chamber A222 by a piston A1011 of the piston assembly A1010. The expansion chamber A221 is positioned thermally proximal to the heater body C100 relative to the compression chamber A222 thermally distal to the heater body C100. The compression chamber A222 is positioned thermally proximal to the chiller assembly A40 relative to the expansion chamber A221 thermally distal to the chiller assembly A40.

In various embodiments, the piston assembly A1010 defines a double-ended piston assembly A1010 in which a pair of pistons A1011 is each coupled to a connection member A1030. The connection member A1030 may generally define a rigid shaft or rod extended along a direction of motion of the piston assembly A1010. In other embodiments, the connection members A1030 includes one or more springs or spring assemblies, such as further provided herein, providing flexible or non-rigid movement of the connection member A1030. In still other embodiments, the connection member A1030 may further define substantially U- or V-connections between the pair of pistons A1011.

Each piston A1011 is positioned within the piston body C700 such as to define the expansion chamber A221 and the compression chamber A222 within the volume of the piston body C700. The load device c092 is operably coupled to the piston assembly A1010 such as to extract energy therefrom, provide energy thereto, or both. The load device c092 defining an electric machine is in magnetic communication with the closed cycle engine via the connection member A1030. In various embodiments, the piston assembly A1010 includes a dynamic member A181 positioned in operable communication with a stator assembly A182 of the electric machine. The stator assembly A182 may generally include a plurality of windings wrapped circumferentially relative to the piston assembly A1010 and extended along a lateral direction L. In one embodiment, such as depicted in regard to FIGS. 7A and 7B, the dynamic member A181 is connected to the connection member A1030. The electric machine may further be positioned between the pair of pistons A1011 of each piston assembly A1010. Dynamic motion of the piston assembly A1010 generates electricity at the electric machine. For example, linear motion of the dynamic member A181 between each pair of chambers defined by each piston A1011 of the piston assembly A1010 generates electricity via the magnetic communication with the stator assembly A182 surrounding the dynamic member A181.

Referring to FIGS. 7A and 7B-FIG. 7C, in various embodiments, the working fluid body C108 may further define at least a portion of the expansion chamber A221. In one embodiment, such as further described herein, the working fluid body C108 defines a unitary or monolithic structure with at least a portion of the piston body C700, such as to define at least a portion of the expansion chamber A221. In some embodiments, the heater body C100 further defines at least a portion of the working fluid body C108, such as to define a unitary or monolithic structure with the working fluid body C108, such as further described herein.

The engine A100 defines an outer end A103 and an inner end A104 each relative to a lateral direction L. The outer ends A103 define laterally distal ends of the engine A100 and the inner ends 104 define laterally inward or central positions of the engine A100. In one embodiment, such as depicted in regard to FIGS. 7A and 7B-FIG. 7C, the heater body C100 is positioned at outer ends A103 of the system A10. The piston body C700 includes a dome structure A26 at the expansion chamber A221. The expansion chamber dome structure A26 s provides reduced surface area heat losses across the outer end A103 of the expansion chamber A221. In various embodiments, the pistons A1011 of the piston assembly A1010 further include domed pistons A1011 corresponding to the expansion chamber A221 dome. The dome structure A26, the domed piston A1011, or both may provide higher compressions ratios at the chambers A221, A222, such as to improve power density and output.

The chiller assembly A40 is positioned in thermal communication with each compression chamber A222. Referring to FIGS. 7A and 7B-FIG. 7C, the chiller assembly A40 is positioned inward along the lateral direction L relative to the heater body C100. In one embodiment, the chiller assembly A40 is positioned laterally between the heater body C100 and the load device c092 along the lateral direction L. The chiller assembly A40 provides the chiller working fluid in thermal communication with the engine working fluid at the cold side heat exchanger A42 and/or compression chamber A222. In various embodiments, the piston body C700 defines the cold side heat exchanger A42 between an inner volume wall A46 and an outer volume wall A48 surrounding at least the compression chamber A222 portion of the piston body C700.

In various embodiments, such as depicted in regard to FIGS. 7A and 7B-FIG. 7C, the load device c092 is positioned at the inner end A104 of the system A10 between laterally opposing pistons A1011. The load device c092 may further include a machine body c918 positioned laterally between the piston bodies C700. The machine body c918 surrounds and houses the stator assembly A182 of the load device c092 defining the electric machine. The machine body c918 further surrounds the dynamic member A181 of the electric machine attached to the connection member A1030 of the piston assembly A1010. In various embodiments, such as depicted in regard to FIGS. 7A and 7B-FIG. 7C, the machine body c918 further provides an inner end wall A50 at the compression chamber A222 laterally distal relative to the expansion chamber A221 dome.

Now referring to FIGS. 8A through 8D, exemplary regenerator bodies c800 will be described. The presently disclosed regenerator bodies c800 may define part of the heater body c100 and/or an engine c002, such as shown and described in regard to system A10 and engine A100 herein, or further herein with reference to FIGS. 20A and 20B. For example, a regenerator body c800 may define at least a portion of a monolithic body or a monolithic body-segment. Such monolithic body or monolithic body-segment may define at least a portion of the heater body c100 and/or the engine c002. Additionally, or in the alternative, the presently disclosed regenerator bodies c800 may be provided as a separate component, whether for use in connection with a heater body c100, an engine c002, or any other setting whether related or unrelated to a heater body c100 or an engine c002. It will be appreciated that an engine c002 and/or a heater body c100 may include any desired number of regenerator bodies c800.

FIG. 8A through 8D show an exemplary regenerator body c800 implemented within an exemplary engine c002. The regenerator body c800 may fluidly communicate with one or more piston bodies c700. For example, a plurality of working-fluid pathways c110 may provide fluid communication between a regenerator body c800 and a piston body c700. The working-fluid pathways c110 may fluidly communicate between a piston chamber c112 defined by the piston body c700 and a regenerator conduit c1000 defined by the regenerator body c800.

The plurality of working-fluid pathways c110 may extend between respective ones of a plurality of piston chamber apertures c111 and respective ones of a plurality of regenerator apertures c113. The piston chamber apertures c111 provide fluid communication between the working-fluid pathways c110 and the piston chamber c112, and the regenerator apertures c113 provide fluid communication between the working-fluid pathways c110 and the regenerator conduit c1000. The piston chamber apertures c111 may define a first end of the working-fluid pathways c110 and the regenerator apertures c113 may define a second end of the working-fluid pathways c110.

A piston body c700 may define a hot-side c1002 of the piston chamber c112 and a cold side piston chamber c1004. A regenerator conduit c1000 may include a hot-side portion c1006 and a cold-side portion c1008. A plurality of hot-side working-fluid pathways c1010 may provide fluid communication between the regenerator body c800 and a first piston body c700, such as between the hot-side portion c1006 and the hot-side c1002 of the piston chamber c112. A plurality of cold-side working-fluid pathways c1010 may provide fluid communication between the regenerator body c800 and a second piston body c700, such as between the cold-side portion c1008 of the regenerator conduit c1000 and the cold-side c1004 of the piston chamber c112.

The first piston body c700 may include a first piston assembly c090 disposed therein and/or the second piston body c700 may include a second piston assembly c090 disposed therein. Heat may be input ($Q_{IN}$) to engine-working fluid disposed within the hot-side working-fluid pathways c1010, such as from a heater body c100 (e.g., FIGS. 20A and 20B) or any other suitable heat source. Heat may be extracted ($Q_{OUT}$) from engine-working fluid disposed within the cold-side working-fluid pathways c1012, such as from a chiller body (not shown) or any other suitable cooling source. A regenerator body c800 may be disposed adjacent to a piston body c700, such as circumferentially adjacent to a piston body c700. As shown in FIG. 8C, a regenerator body c800 may circumferentially surround a piston body c700. Alternatively, a regenerator body c800 may be disposed adjacent to a piston body c700. In some embodiments, a semiannular regenerator body c800 may be disposed circumferentially adjacent to a piston body c700.

During operation, engine-working fluid flowing from the plurality of hot-side working-fluid pathways c1010 to the regenerator body c800 enters the regenerator conduit c1000. Fluid passing through the regenerator conduit c1000 may flow out of the regenerator body c800 and into the plurality of cold-side working-fluid pathways c1012. The regenerator conduit c1000 includes a heat storage medium c1014 disposed therein. The heat storage medium c1014 may be any suitable thermal energy storage medium within which heat from the hot-side working-fluid pathways c1010 may be intermittently stored as the engine-working fluid flows from the regenerator body c800 to the cold-side working-fluid pathways c1012. In some embodiments, the heat storage medium c1014 may include a plurality of fin arrays c1016; however, other heat storage medium may additionally or alternatively be utilized, including sensible heat storage and/or latent heat storage technologies. Other suitable heat storage medium may include packed beds, include molten salts, miscibility gap alloys, silicon materials (e.g., solid or molten silicon), phase change materials, and so forth.

The plurality of fin arrays c1016 include an array of high-surface area heat transfer fins having a thermally conductive relationship with engine-working fluid in the regenerator conduit c1000. As fluid flows from the hot-side working-fluid pathways c1010 into or through the regenerator conduit c1000, heat transfers to the heat storage medium 1014 (e.g., the plurality of fin arrays c1016), preserving thermal energy from being extracted ($Q_{OUT}$) at the chiller body (not shown) or other suitable cooling source. As fluid flows from the cold-side working-fluid pathways c1012 into or through the regenerator conduit c1000, heat transfers from the heat storage medium 1014 (e.g., the plurality of fin arrays c1016) back to the engine-working fluid, thereby returning thermal energy to the engine-working fluid flowing into the hot-side working-fluid pathways c1010.

Figure 8A:
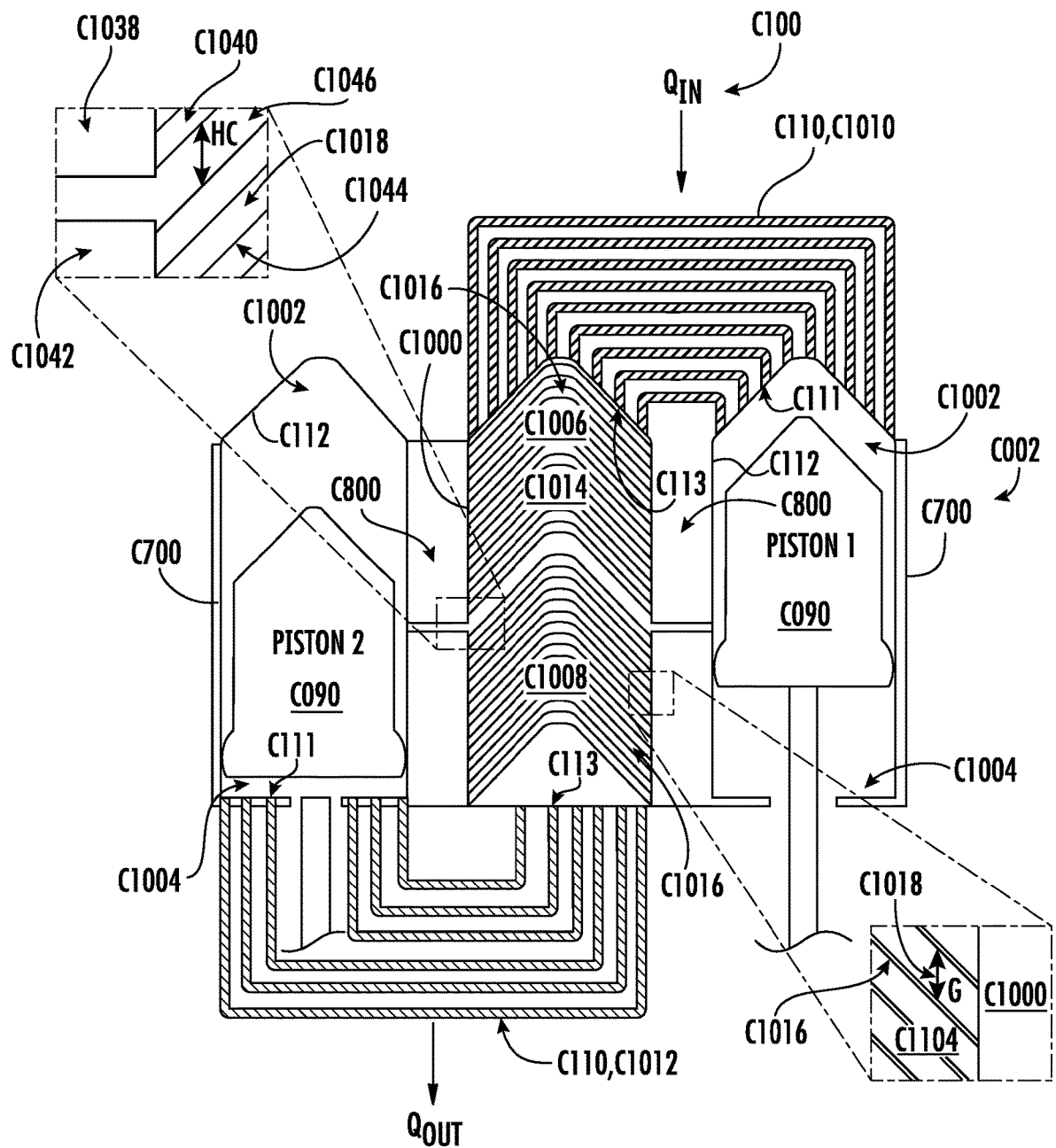
FIG. 8A schematically depicts an exemplary regenerator system of an engine according to an aspect of the present disclosure.
Figure 8B:
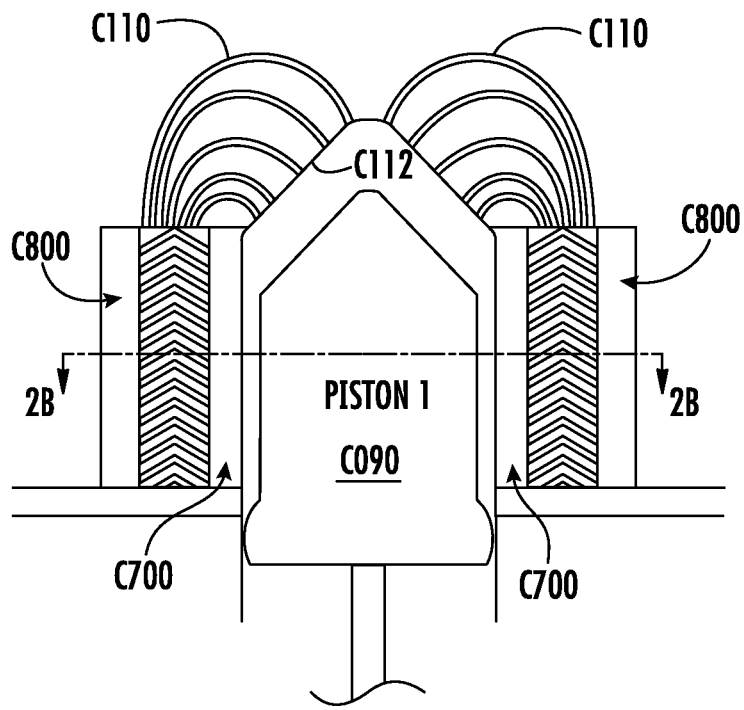
FIG. 8B schematically depicts a cross-sectional view of an exemplary regenerator body in relation to a portion of an engine according to an aspect of the present disclosure.
Figure 8C:
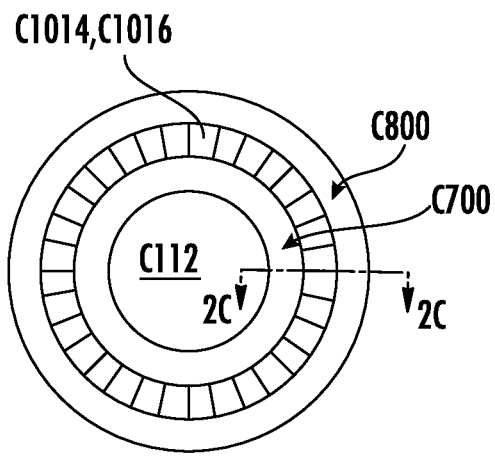
FIG. 8C schematically depicts a top cross-sectional view of the exemplary regenerator body of FIG. 8B.
Figure 8D:
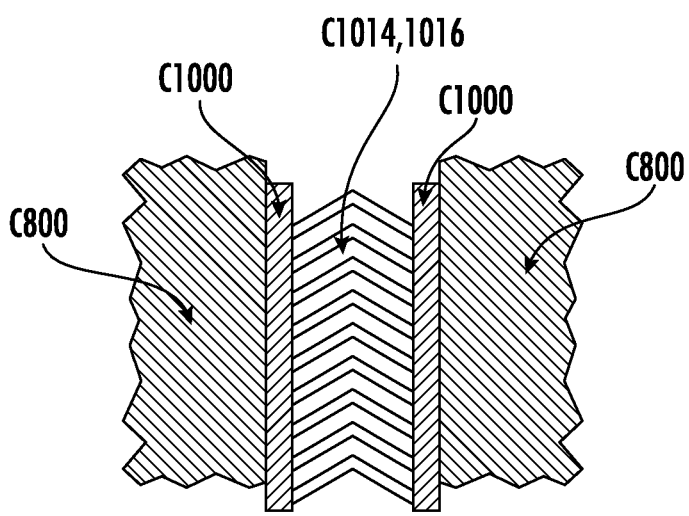
FIG. 8D schematically depicts an enlarged perspective cross-sectional view of the exemplary regenerator body of FIG. 8B.

Still referring to FIG. 8A, in some embodiments, a heat storage medium c1014 may include a plurality of fin arrays c1016 adjacently disposed within a regenerator conduit c1000. The plurality of fin arrays c1016 may be respectively supported by the regenerator conduit c1000 in spaced relation to one another. The spaced relation of the plurality of fin arrays c1016 may define a gap, G c1018 longitudinally separating adjacent ones of the plurality of fin arrays c1016.

Figure 9A:
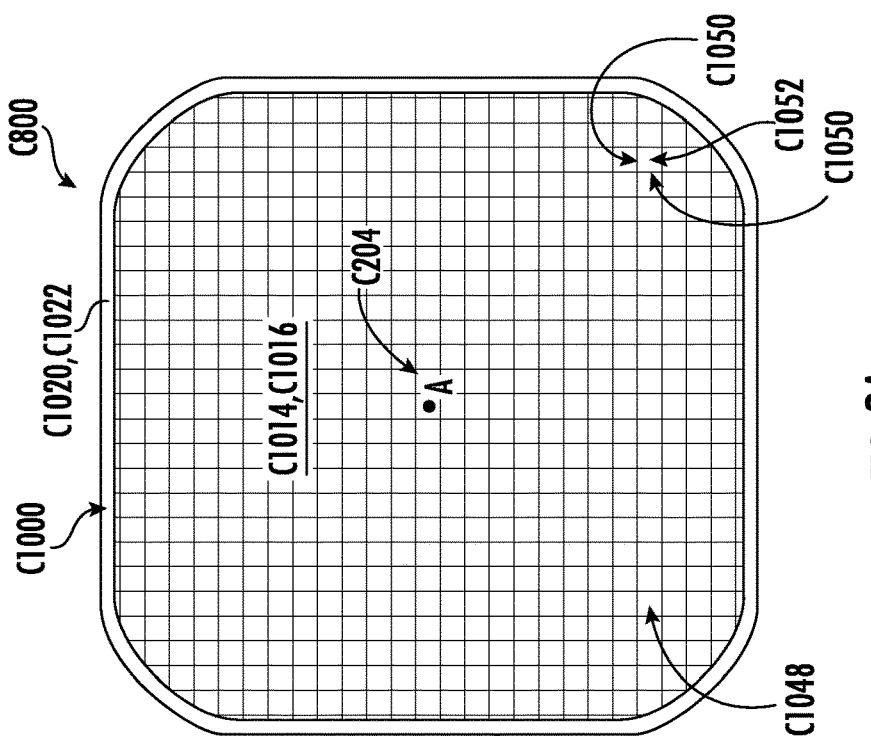
FIG. 9A schematically depicts a cross-sectional view of another exemplary regenerator body.
Figure 10:
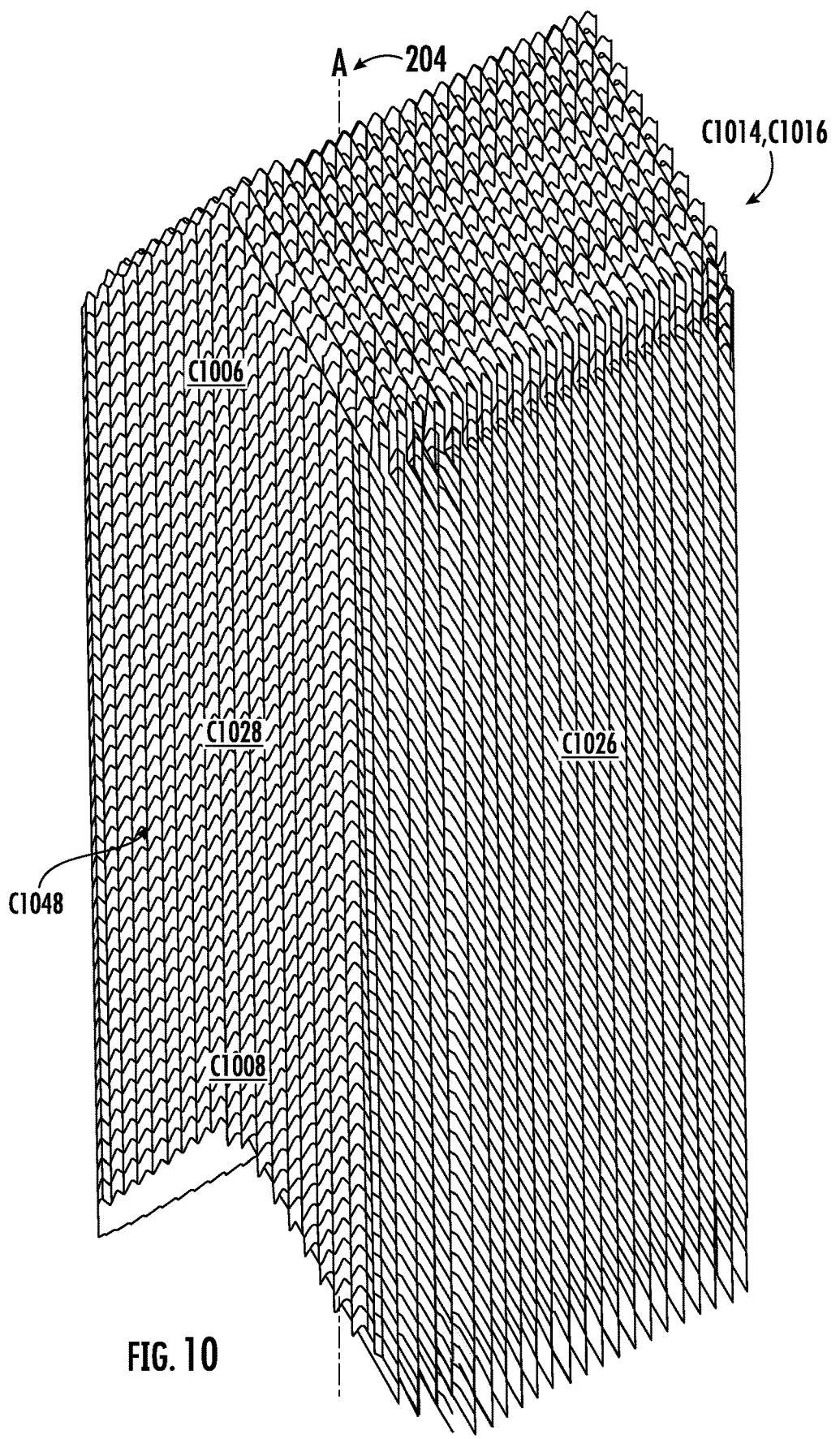
FIG. 10 schematically depicts a perspective view of a plurality of fin arrays that may be included in a regenerator body, such as the regenerator body shown in FIG. 8A or 8B.

As shown in FIG. 10, the regenerator conduit c100 circumferentially surrounding the heat storage medium c1014 (e.g., FIG. 9A) has been omitted from FIG. 1012a_4 to reveal details of the plurality of fin arrays c1016. As shown, a plurality of fin arrays c1016 may extend from at least a portion of the regenerator conduit c1000 obliquely towards a hot-side portion c1006 of the regenerator body c800. The regenerator conduit may be disposed about a longitudinal axis and the plurality of fin arrays c1016 may be supported by the regenerator conduit at least in part at an oblique angle relative to the longitudinal axis. For example, a first region c1026 of the plurality of fin arrays c1016 may extend obliquely from the regenerator conduit c1000 towards the hot-side portion c1006 of the regenerator body c800. Alternatively, the plurality of fin arrays c1016 may extent from at least a portion of the regenerator conduit c1000 obliquely towards a cold-side portion c1008 of the regenerator body c800. Additionally, or in the alternative, at least a portion of the plurality of fin arrays c1016 may extend perpendicularly from at least a portion of the regenerator conduit c1000. The plurality of fin arrays c1016 may be supported by the regenerator conduit c800 at least in part at a perpendicular angle relative to the longitudinal axis. For example, a second region c1028 of the plurality of fin arrays c1016 may extend perpendicularly from the regenerator conduit c1000.

Figure 9B:
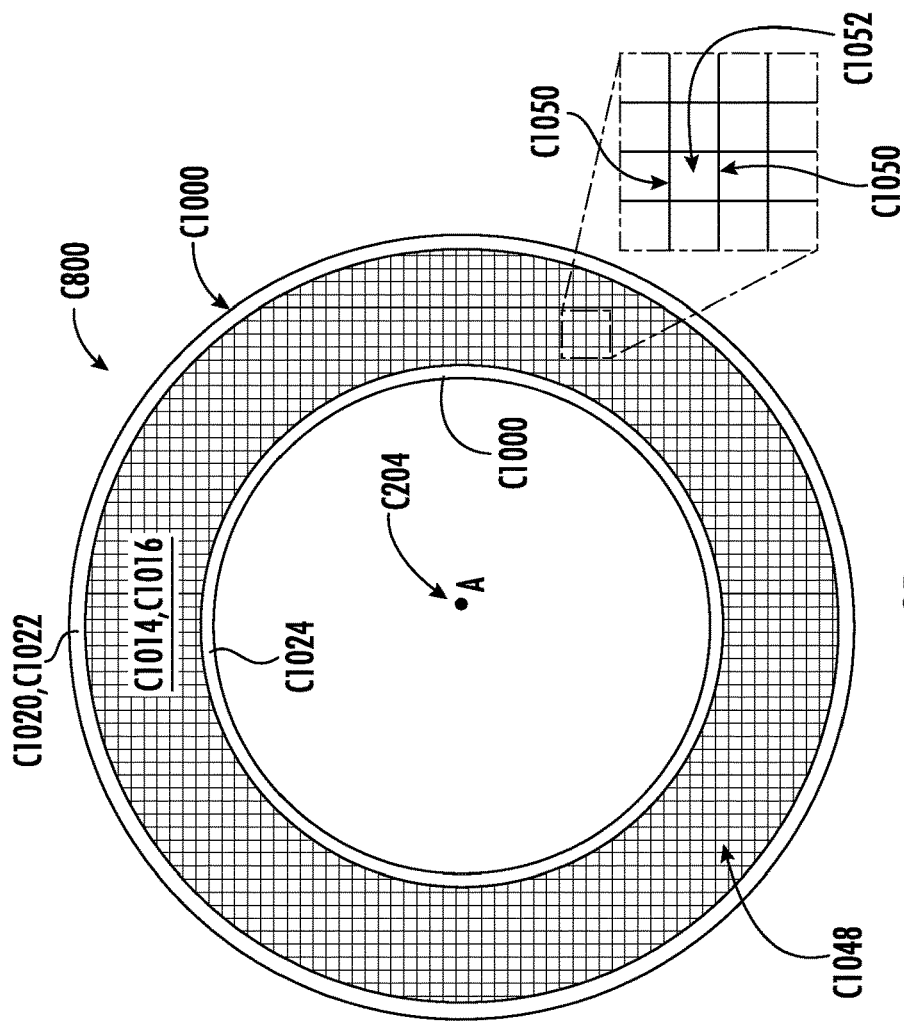
FIG. 9B schematically depicts a cross-sectional view of yet another exemplary regenerator body.

Referring now to FIGS. 9A and 2B, an exemplary regenerator conduits c1000 will be further described. As shown, an exemplary regenerator conduit c1000 may include a sidewall c1020, such as an annular sidewall c1020. The sidewall c1020 may circumferentially surround the heat storage medium c1014, such as the plurality of fin arrays c1016. As shown in FIG. 9B, in some embodiments, a regenerator conduit c1000 may define an annulus. For example, the regenerator conduit c1000 may include an outward sidewall c1022 and an inward sidewall c1024. The outward sidewall c1022 may circumferentially surround the heat storage medium c1014, such as the plurality of fin arrays c1016. The heat storage medium c1014, such as the plurality of fin arrays c1016, may circumferentially surround the inward sidewall c1024. The plurality of fin arrays c1016 may extend from the regenerator conduit c1000. FIG. 10 shows an exemplary heat storage medium c1014. The heat storage medium shown in FIG. 10 includes a plurality of fin arrays c1016, which may correspond to the regenerator body c800 shown in FIG. 9A.

Now referring to FIGS. 11A and 11B through FIGS. 16A and 16B, exemplary engine assemblies c900 will be described. The engine assemblies c900 described herein may include an engine c002, such as described in regard to the system A10 and engine A100 shown and depicted in regard to FIG. 6, or further herein with reference to FIGS. 20A and 20B. The engine assembly c900 may include one or more monolithic bodies or monolithic body-segments as described herein. A monolithic body and/or a monolithic body-segment may be fabricated using an additive manufacturing technology and may be void of any seams, joints, or the like characteristic of separately fabricated components.

An engine c002 may include one or more heater bodies c100 and one or more engine bodies c050 that together define an engine assembly c900. An exemplary engine assembly c900 may include at least one heater body c100 and at least one engine body c050. However, it will be appreciated that any number of heater bodies c100 and/or any number of engine bodies c050 may be provided. In some embodiments, a first heater body c100 may be disposed at a first side of an engine assembly c900 and a second heater body c100 may be disposed at a second side of an engine assembly c900. One or more engine bodies c050 may be disposed adjacent to the first heater body c100 and/or adjacent to the second heater body c100. One or more heater bodies c100 and/or one or more engine bodies c050 may be operably coupled or operably couplable to one another such as via welding, fusing, or the like, so as to provide an integrally formed engine assembly c900. Additionally, or in the alternative, one or more heater bodies c100 and/or one or more engine bodies c050 may be operably coupled or operably couplable to one another such as via bolts, fasteners, or the like, so as to provide an assembled engine assembly c900.

The engine assembly c900 may include one or more piston assemblies c090 and one or more generator assemblies c092. The one or more piston assemblies c090 and the one or more generator assemblies c092 may be operably insertable within an engine body c050 and/or a heater body c100. The one or more generator assemblies c092 may receive a mid-ward portion of the one or more piston assemblies 092. The one or more piston assemblies c090 and/or the one or more generator assemblies c092 may be inserted into an engine body c050 and/or a heater body c100 prior to operably coupling at least one engine body c050 to another engine body c050 or to a heater body c100. Additionally, or in the alternative, one or more piston assemblies c090 and/or the one or more generator assemblies c092 may be inserted into an engine body c050 and/or a heater body c100 prior to operably coupling at least one heater body c100 to an engine body c050. In this way, an engine assembly c900 may be integrally formed and/or assembled at least in part by installing one or more piston assemblies c090 and/or the one or more generator assemblies c092 into one or more monolithic bodies and/or monolithic body-segments that make up the engine assembly c900. The one or more monolithic bodies and/or monolithic body-segments may be operably coupled to one another after having installed the one or more piston assemblies c090 and/or the one or more generator assemblies c092 therein. However, it will be appreciated that in some embodiments some of the more monolithic bodies and/or monolithic body-segments that make up an engine assembly c900 may be operably coupled to one another prior to installing the one or more piston assemblies c090 and/or the one or more generator assemblies c092 therein.

FIGS. 11A and 11B through FIGS. 16A and 16B show exploded views of exemplary engine assemblies c900. An engine assembly c900 may include at least two monolithic bodies or monolithic body-segments, within which one or more piston assemblies c090 and one or more generator assemblies c092 may be enclosed. For example, an engine assembly c900 may include a first monolithic body that includes a first heater body c100 and a first portion of an engine body c050, and a second monolithic body that includes a second heater body c100 and a second portion of an engine body c050. In some embodiments, an engine assembly c900 may include only two monolithic bodies or monolithic body-segments, while in other embodiments an engine assembly c900 may include more than two (e.g., multiple) monolithic bodies or monolithic body-segments.

One or more of the monolithic bodies and/or monolithic body-segments that make up an engine assembly may include one or more regenerator bodies and/or one or more chiller bodies. The one or more regenerator bodies may define a portion of another monolithic body or a portion of a monolithic body-segment. Alternatively, the one or more regenerator bodies may represent a monolithic body or monolithic body-segment, such as a monolithic body or monolithic body-segment insertable, inserted, operably couplable, or operably coupled to another monolithic body or monolithic body-segment. The one or more chiller bodies may define a portion of another monolithic body or a portion of a monolithic body-segment. Alternatively, the one or more chiller bodies may represent a monolithic body or monolithic body-segment, such as a monolithic body or monolithic body-segment insertable, inserted, operably couplable, or operably coupled to another monolithic body or monolithic body-segment.

The engine assemblies c900 shown in FIGS. 11A and 11B and FIGS. 13A and 13B include two monolithic bodies or monolithic body-segments within which one or more piston assemblies c090 and one or more generator assemblies c092 may be enclosed. The embodiments shown in FIGS. 11A and 11B and FIGS. 13A and 13B allow for the one or more piston assemblies c090 and one or more generator assemblies c092 to be enclosed within an engine assembly c900 upon operably coupling the first monolithic body to the second monolithic body, which may advantageously minimize assembly steps.

Figure 11A:
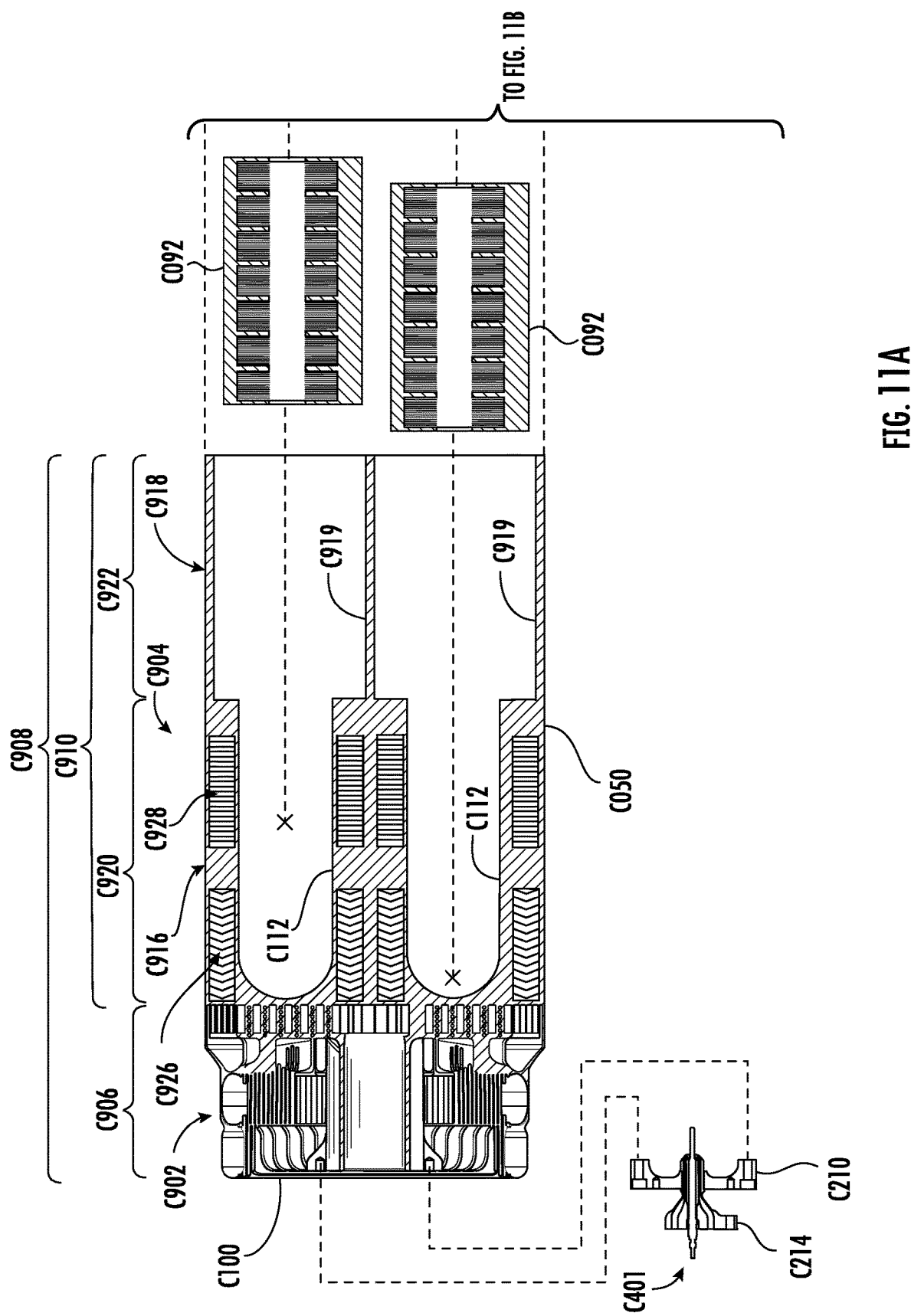
FIGS. 11A and 11B, 12A and 12B, 13A and 13B, 14A and 14B, 15A and 15B, and 16A and 16B schematically depict exploded views of exemplary engine assemblies according to aspects of the present disclosure.
Figure 11B:
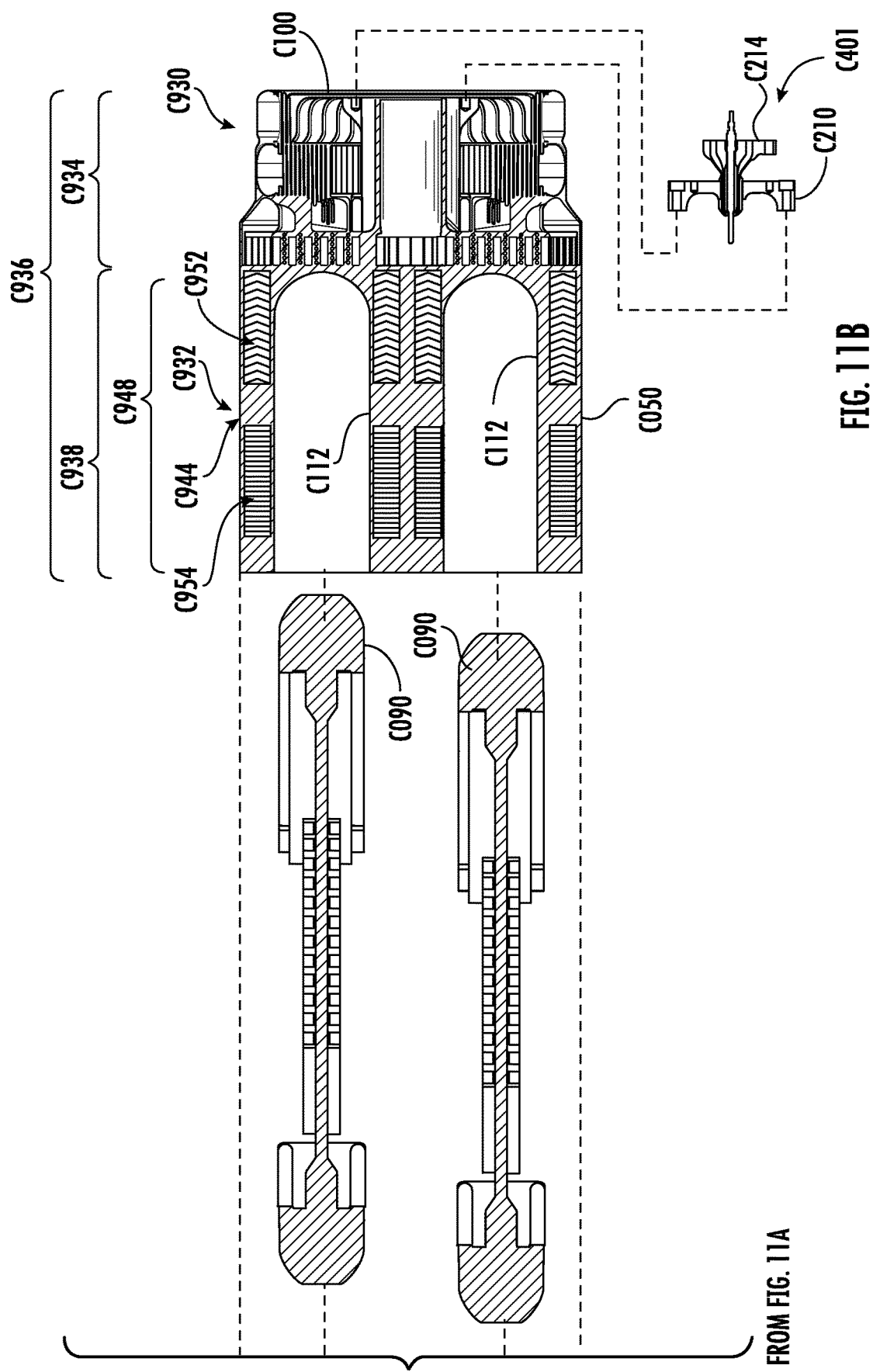

As shown in FIGS. 11A and 11B, the first monolithic body may be separated from the second monolithic body at or about an axial location corresponding to an axial end of the one or more generator assemblies c092. The first portion of the engine body c050 (e.g., on the left-hand side as shown) may define one or more generator housings respectively configured to receive the one or more generator assemblies c092. The one or more generator assemblies c092 may be respectively installed in the one or more generator housings defined by the first portion of the engine body c050. The first portion of the engine body c050 may define a first set of one or more piston chambers c112 respectively configured to receive a first portion of the one or more piston assemblies c090. The first portion of the one or more piston assemblies c090 may be respectively installed in the one or more piston chambers c112 defined by the first portion of the engine body c050.

Additionally, or in the alternative, the second portion of the engine body c050 may define a second set of one or more piston chambers c112 respectively configured to receive a second portion of the one or more piston assemblies c090. The second portion of the one or more piston assemblies c090 may be respectively installed in the second set of the one or more piston chambers c112 defined by the second portion of the engine body c050. The second portion of the engine body c050 and the first portion of the engine body c050 may be operably coupled to one another, enclosing the one or more generator assemblies c092 and the one or more piston assemblies c090 therein.

Figure 13A:
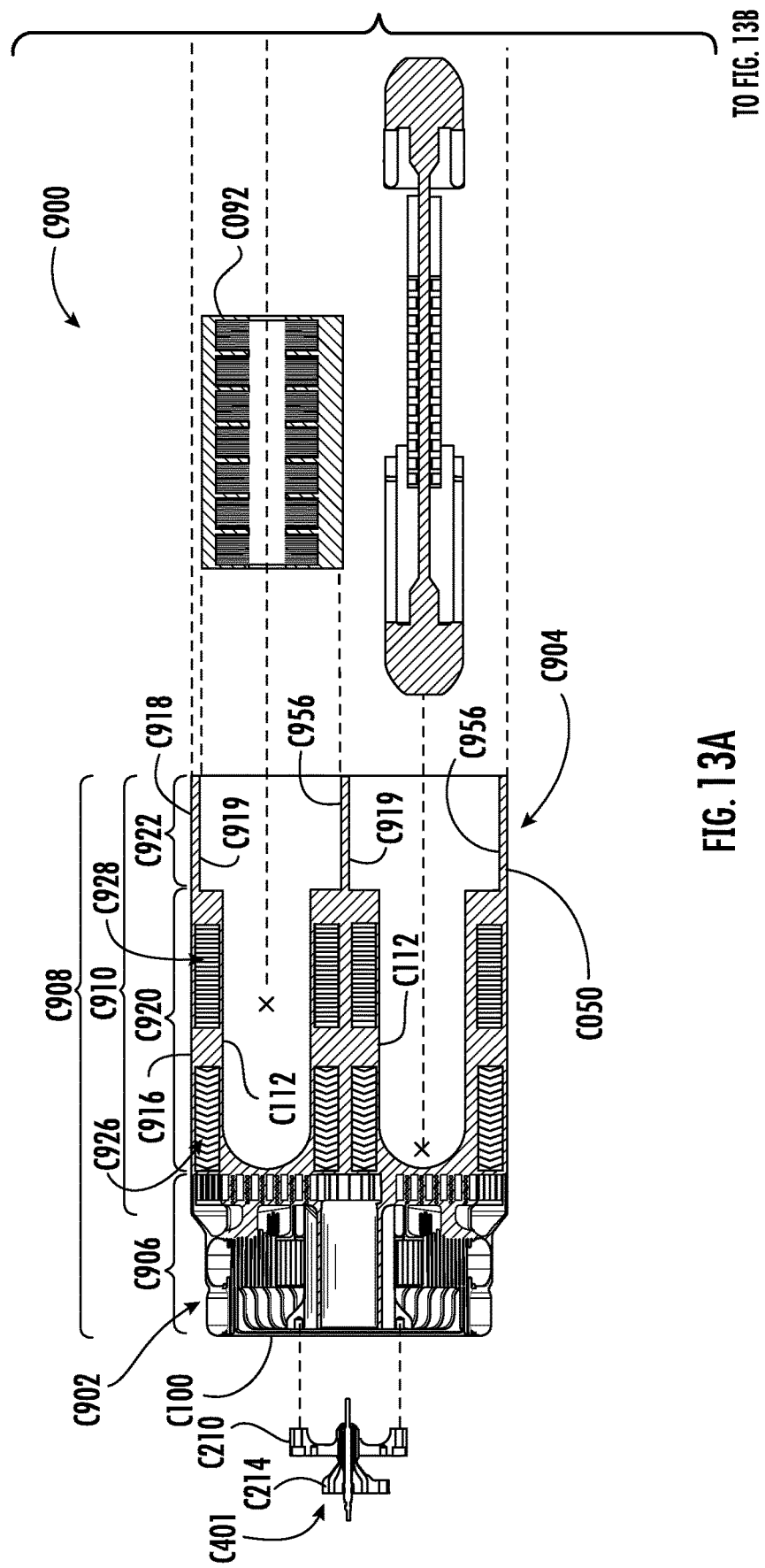
Figure 13B:
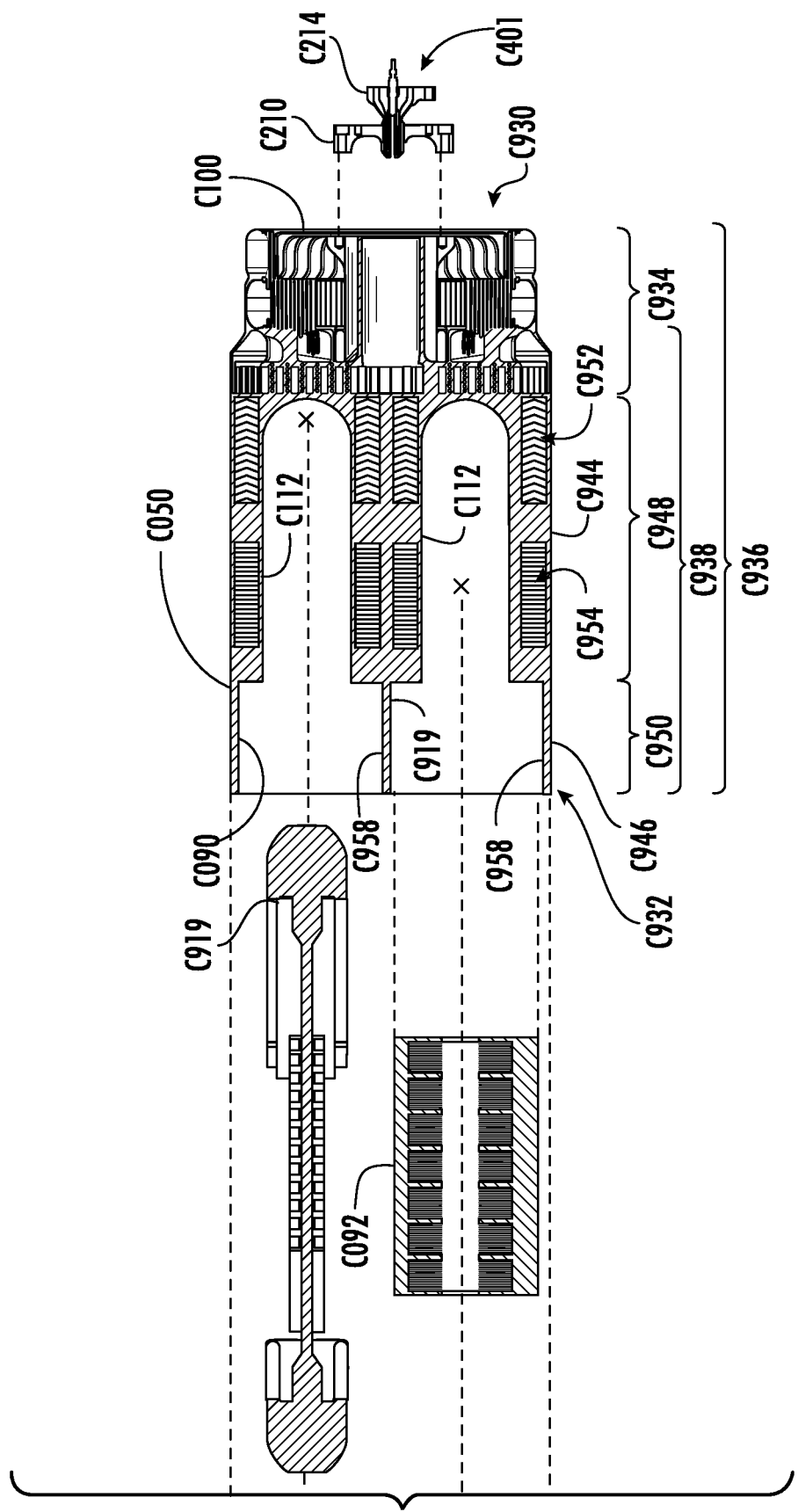

As another example, as shown in FIGS. 13A and 13B, the first monolithic body may be separated from the second monolithic body at or about a mid-point of the engine assembly c900. The first monolithic body (e.g., on the left-hand side as shown) may include a first portion of the engine body c050 configured to receive a first portion of the one or more generator assemblies c092, and the second monolithic body may include a second portion of the engine body c050 configured to receive a second portion of the one or more generator assemblies c092. One or more piston assemblies c090 and/or one or more generator assemblies c092 may be installed in the first and/or second portion of the engine body c050, and the two monolithic bodies or monolithic body-segments may be operably coupled to one another, enclosing the one or more generator assemblies c092 and the one or more piston assemblies c090 therein.

Figure 12A:
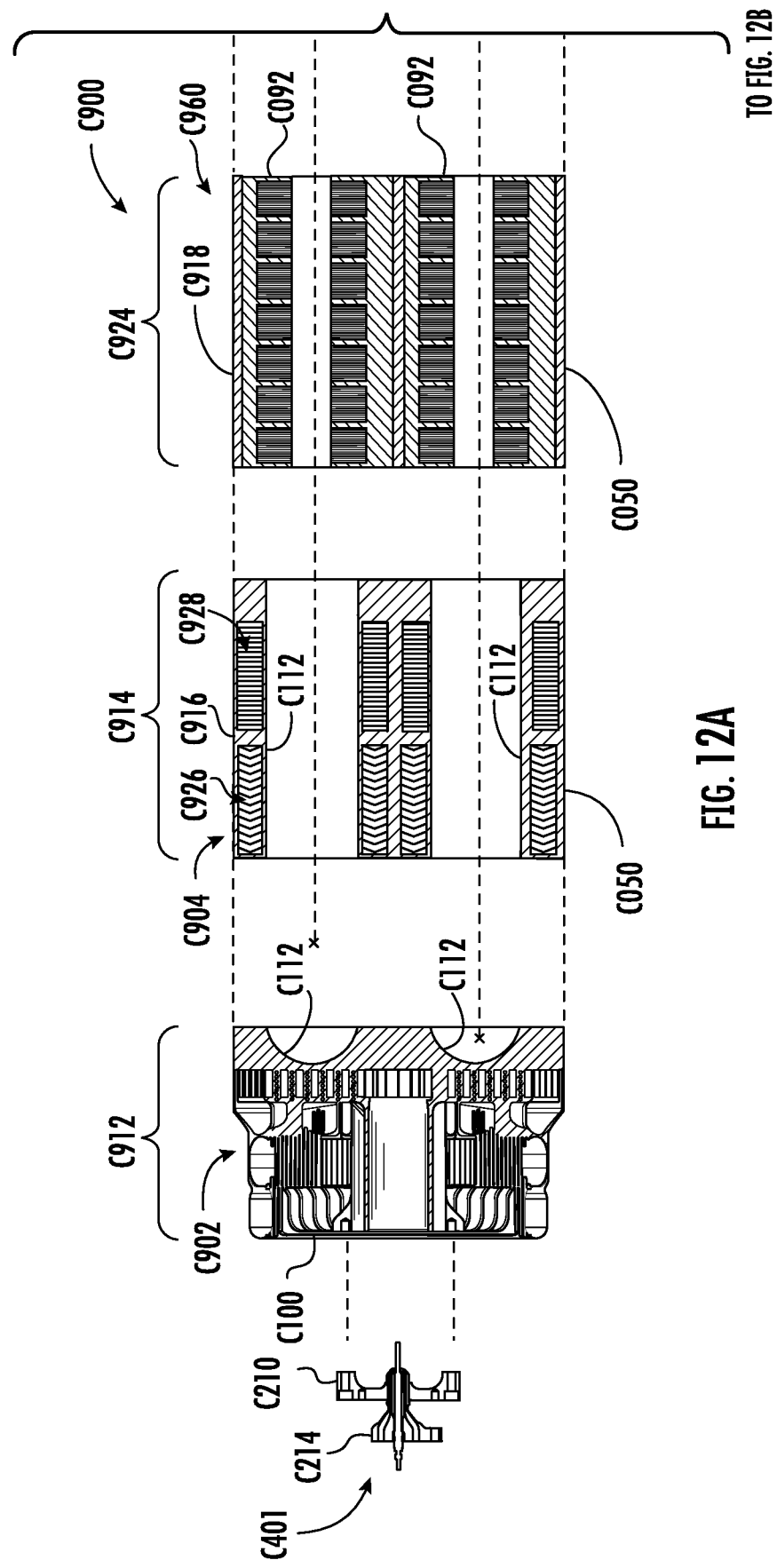
Figure 12B:
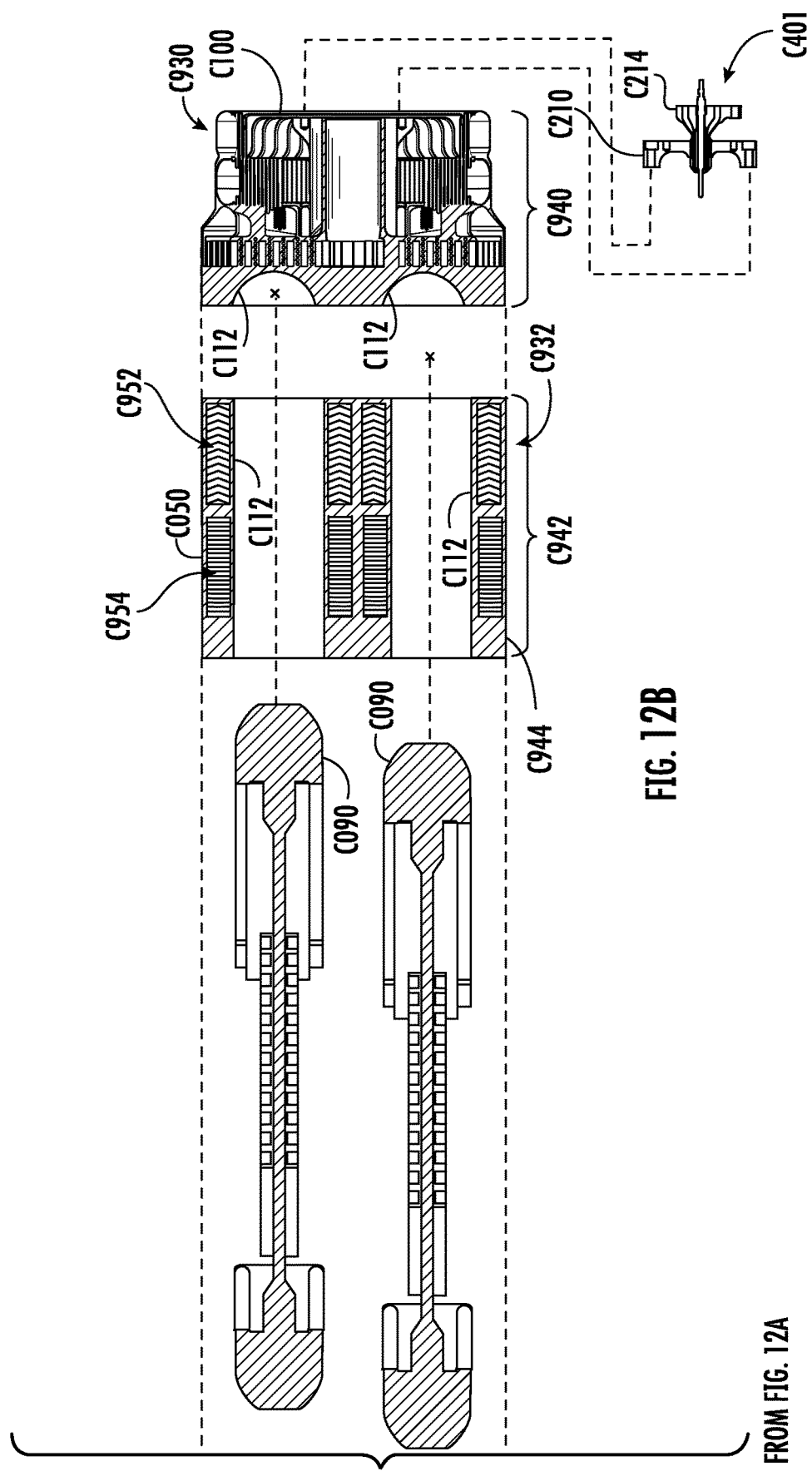

As shown in FIGS. 12A and 12B, an engine assembly c900 may include a plurality of monolithic bodies or monolithic body-segments separated at or about locations corresponding to respective components of the engine assembly. Engine assemblies c900 configured in accordance with FIGS. 12A and 12B may include separate monolithic bodies or monolithic body-segments respectively corresponding to respective elements of the engine assembly c900. For example, an engine assembly c900 may include a first monolithic body-segment (e.g., on the top left-hand side as shown) that includes a first heater body c100, a second monolithic body-segment that includes a first portion of an engine body c050 corresponding to a left-hand side of one or more piston assemblies c090, a third monolithic body-segment that includes a second portion of the engine body c050 corresponding to one or more generator assemblies c092, a fourth monolithic body-segment that includes a third portion of the engine body c050 corresponding to a right-hand side of the one or more piston assemblies c090, and a fifth monolithic body-segment that includes a second heater body c100. The first monolithic body-segment that includes the first heater body c100 may additionally include a portion of the engine body c050. Additionally, or in the alternative, the second monolithic body-segment that includes the second heater body c100 may include a portion of the engine body c050.

The second monolithic body-segment may define one or more regenerator bodies and/or one or more chiller bodies corresponding to the first heater body c100. Additionally, or in the alternative, one or more regenerator bodies and/or one or more chiller bodies corresponding to the first heater body c100 may be operably coupled or operably couplable to the second monolithic body-segment. The fourth monolithic body-segment may define one or more regenerator bodies and/or one or more chiller bodies corresponding to the second heater body c100. Additionally, or in the alternative, one or more regenerator bodies and/or one or more chiller bodies corresponding to the second heater body c100 may be operably coupled or operably couplable to the fourth monolithic body-segment.

The one or more generator assemblies c092 may be installed in one or more generator housing defined by the second portion of the engine body c050. A first portion of one or more piston assemblies c090 may be installed in a corresponding one or more piston chambers c112 defined by the first portion of the engine body c050 and/or a second portion of the one or more piston assemblies c090 may be installed in a corresponding one or more piston chambers c112 defined by the second portion of the engine body c050. The respective portions of the engine assembly c900 may be operably coupled to one another, enclosing the one or more generator assemblies c092 and the one or more piston assemblies c090 therein.

Figure 14A:
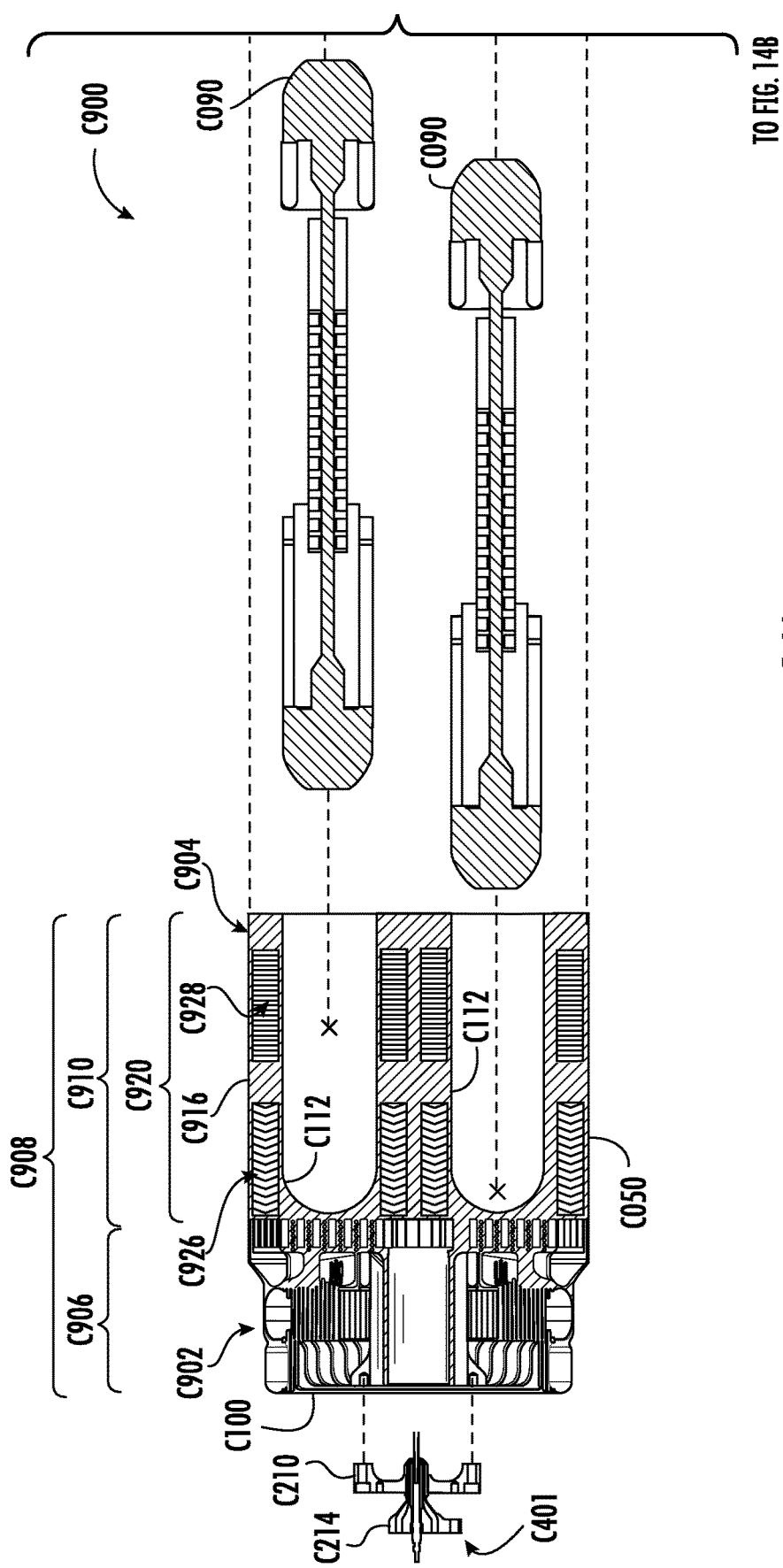
Figure 14B:
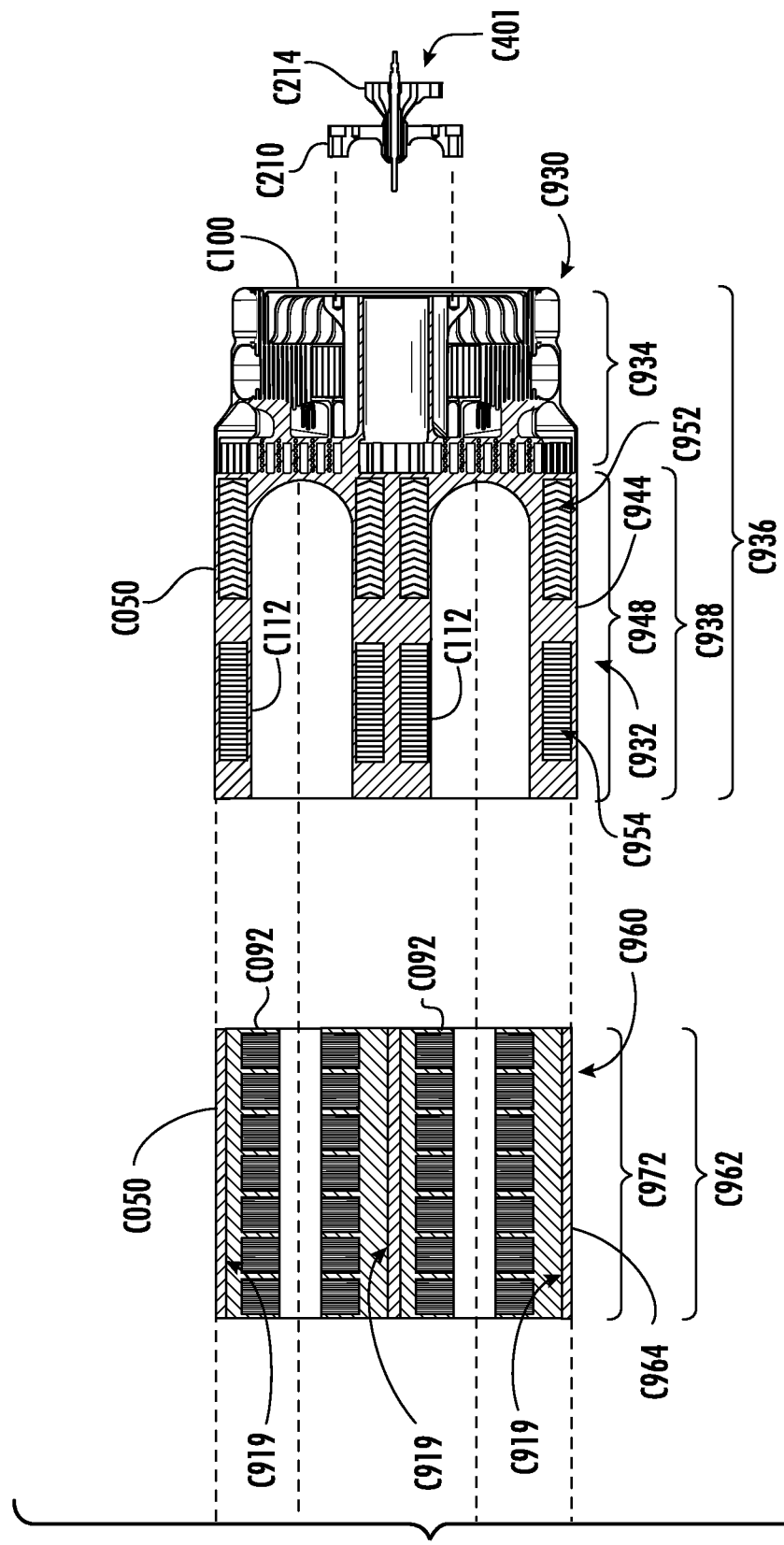

As shown in FIGS. 14A and 14B, an engine assembly c900 may include a first monolithic body or monolithic body-segment that includes a first heater body c100 and a first portion of an engine body c050, a second monolithic body or monolithic body-segment that includes a second portion of an engine body c050, and a third monolithic body or monolithic body-segment that includes a second heater body c100 and a third portion of an engine body c050. The second portion of the engine body c050 may define one or more generator housings configured to receive one or more generator assemblies c092, and the first and second portions of the engine body c050 may respectively define one or more piston chambers c112 respectively configured to receive respective portions of the one or more piston assemblies c090. The one or more generator assemblies c092 may be installed in the one or more generator housings defined by the second portion of the engine body c050. A first portion of the one or more piston assemblies c090 may be installed in the one or more piston chambers c112 defined by first portion of the engine body c050 and/or a second portion of the one or more piston assemblies c090 may be installed in the one or more piston chambers defined by the third portion of the engine body c050. The respective monolithic bodies and/or monolithic body-segments may be operably coupled to one another, enclosing the one or more generator assemblies c092 and the one or more piston assemblies c090 therein.

The second monolithic body or monolithic body-segment may define one or more regenerator bodies and/or one or more chiller bodies corresponding to the first heater body c100. Additionally, or in the alternative, one or more regenerator bodies and/or one or more chiller bodies corresponding to the first heater body c100 may be operably coupled or operably couplable to the second monolithic body or monolithic body-segment.

The third monolithic body or monolithic body-segment may define one or more regenerator bodies and/or one or more chiller bodies corresponding to the second heater body c100. Additionally, or in the alternative, one or more regenerator bodies and/or one or more chiller bodies corresponding to the second heater body c100 may be operably coupled or operably couplable to the third monolithic body or monolithic body-segment.

Figure 15A:
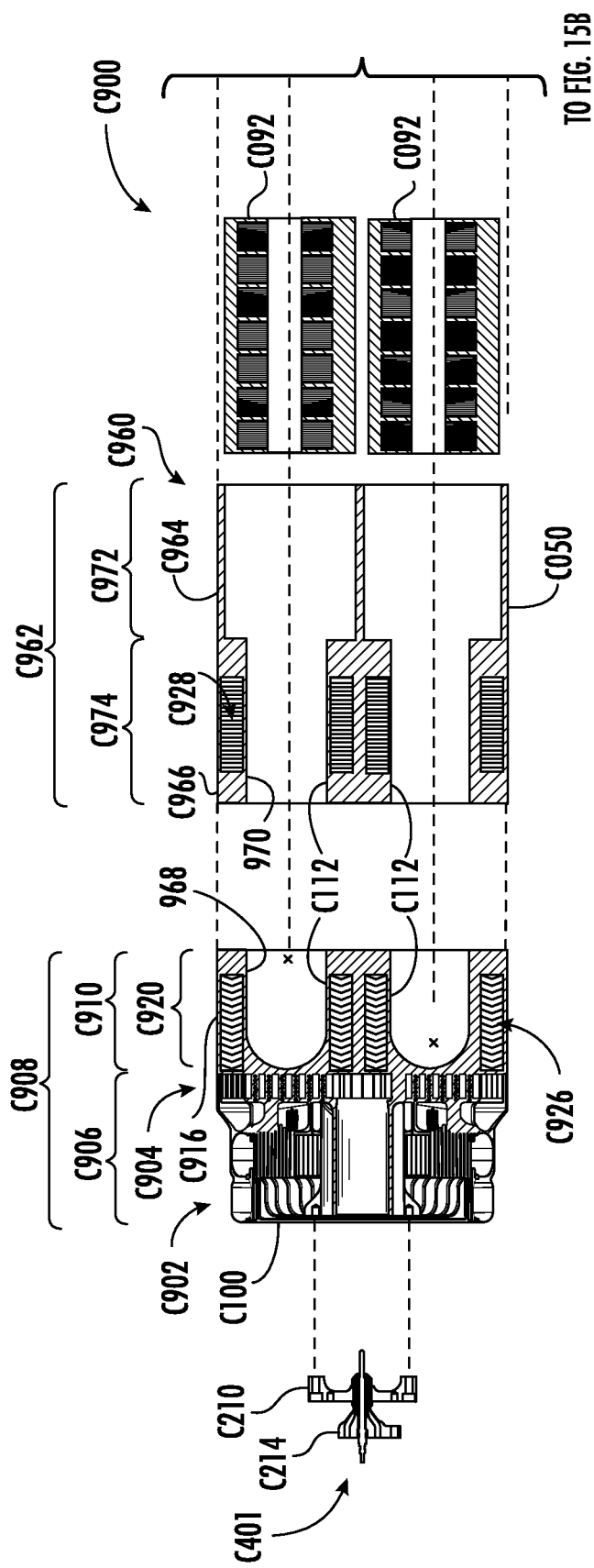
Figure 15B:
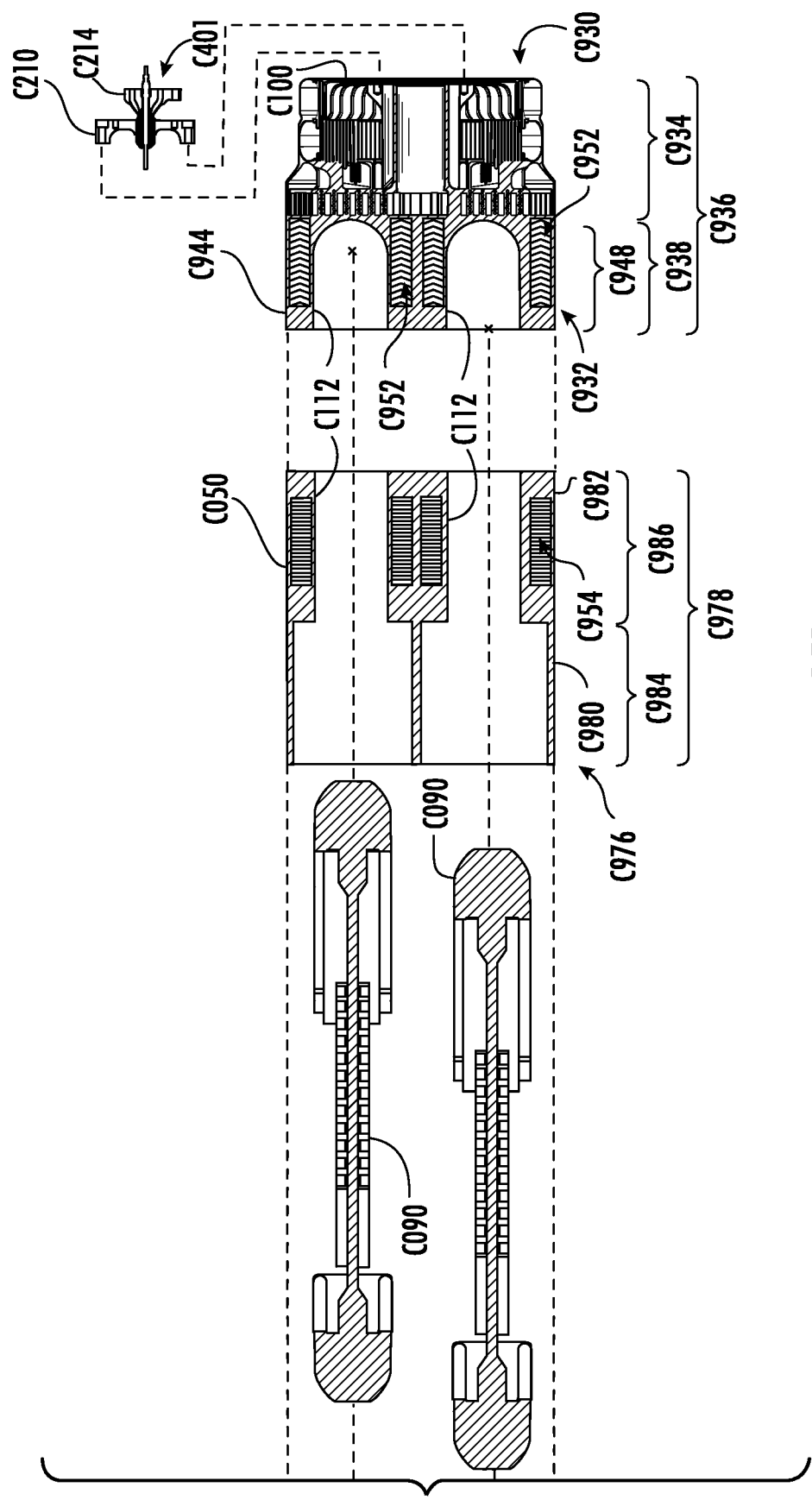

As shown in FIGS. 15A and 15B, an engine assembly c900 may include a first monolithic body or monolithic body-segment that includes a first heater body c100 and a first portion of an engine body c050, a second monolithic body or monolithic body-segment that includes a second portion of an engine body c050, a third monolithic body or monolithic body-segment that includes a third portion of an engine body c050, and a fourth monolithic body or monolithic body-segment that includes a second heater body c100 and a fourth portion of an engine body c050. The second portion of the engine body c050 may define one or more generator housings respectively configured to receive a first portion one or more generator assemblies c092. Additionally, or in the alternative, the third portion of the engine body c050 may define one or more generator housings respectively configured to receive a second portion of one or more generator assemblies c092. The second and third portions of the engine body c050 may additionally define at least a portion of one or more piston chambers c112 respectively configured to receive respective portions of the one or more piston assemblies c090. Additionally, or in the alternative, the first portion of the engine body c050 and/or the fourth portion of the engine body c050 may define at least a portion of one or more piston chambers c112 respectively configured to receive respective portions of the one or more piston assemblies c090. A first portion of the one or more generator assemblies c092 may be respectively installed in the one or more generator housings defined by the second portion of the engine body c050 and/or a second portion of the one or more generator assemblies c092 may be respectively installed in the one or more generator housings defined by the third portion of the engine body c050. A first portion of one or more piston assemblies c090 may be respectively installed in the one or more piston chambers c112 defined by the second portion of the engine body c050 and/or a second portion of the one or more piston assemblies c090 may be respectively installed in the one or more piston chambers c112 defined by the third portion of the engine body c050. A third portion of the one or more piston assemblies c090 may be respectively installed in the one or more piston chambers c112 defined by the first portion of the engine body c050 and/or a fourth portion of the one or more piston assemblies c090 may be respectively installed in the one or more piston chambers c112 defined by the fourth portion of the engine body c050. The respective monolithic bodies and/or monolithic body-segments may be operably coupled to one another, enclosing the one or more generator assemblies c092 and the one or more piston assemblies c090 therein.

Figure 16A:
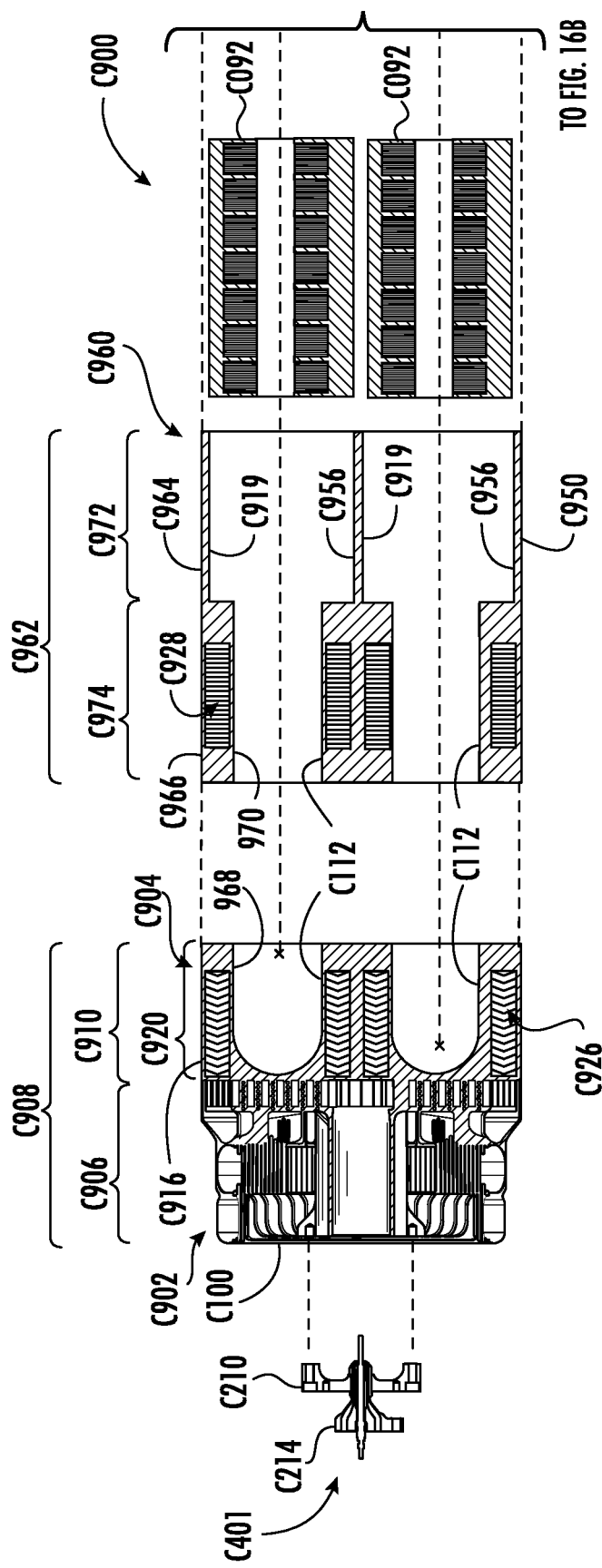
Figure 16B:
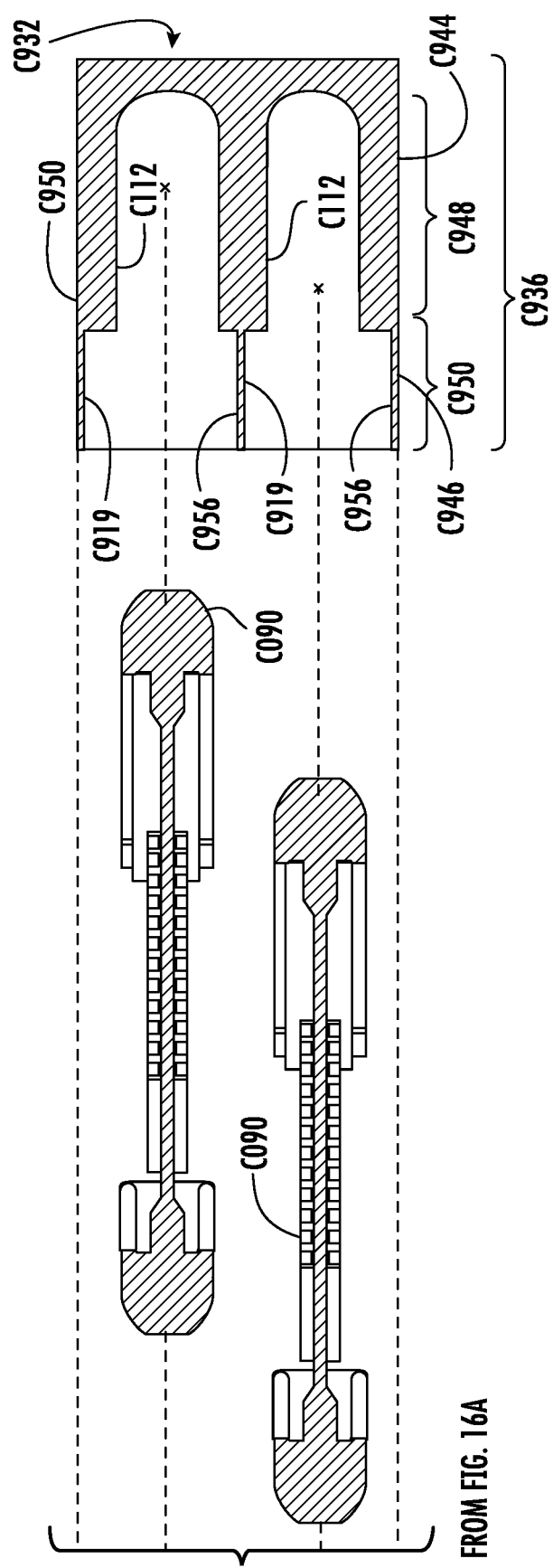

As shown in FIGS. 16A and 16B, an engine assembly c900 may include only one heater body c100. For example, an engine assembly c900 may include a first monolithic body or monolithic body-segment that includes a heater body c100 and a first portion of an engine body c050, a second monolithic body or monolithic body-segment that includes a second portion of an engine body c050, and a third monolithic body or monolithic body-segment that includes a third portion of an engine body c050. The second portion of the engine body c050 may define one or more generator housings respectively configured to receive one or more generator assemblies c092, and the first and second portions of the engine body c050 may respectively define one or more piston chambers c112 configured to receive respective portions of the one or more piston assemblies c090. The one or more generator assemblies c092 may be respectively installed in the one or more generator assemblies defined by the second portion of the engine body c050. A first portion of one or more piston assemblies c090 may be respectively installed in the one or more piston chambers c112 defined by the first portion of the engine body c050 and/or a second portion of the one or more piston assemblies c090 may be respectively installed in the one or more piston chambers c112 defined by the third portion of the engine body c050. The respective monolithic bodies and/or monolithic body-segments may be operably coupled to one another, enclosing the one or more generator assemblies c092 and the one or more piston assemblies c090 therein.

In some embodiments, it may be advantageous for the monolithic body or monolithic body-segment that defines a heater body c100 to also define the one or more regenerator bodies corresponding to the heater body. When the heater body c100 and corresponding one or more regenerator bodies respectively define a portion of the same monolithic body or monolithic body-segment, working-fluid pathways c110 defined by the heater body c110 may fluidly communicate with the corresponding one or more regenerator bodies while minimizing fluid couplings.

In some embodiments, it may be advantageous for a monolithic body or monolithic body-segment that defines one or more generator housing to also define one or more chiller bodies corresponding to the one or more generator assemblies c092 respectively corresponding to the one or more generator housings. For example, this may allow for cooling fluid pathways to be defined by such monolithic body or monolithic body-segment while minimizing fluid couplings associated with the one or more chiller bodies.

The monolithic bodies and/or monolithic body-segments depicted in FIGS. 11A and 11B through FIGS. 16A and 16B may respectively reflect one or more additively manufactured monolithic bodies or additively manufactured monolithic body-segments. In some embodiments a monolithic body or a monolithic body-segment may be additively manufactured in a continuous process, such as to provide a single monolithic structure void of any seams, joints, or the like characteristic of separately fabricated components. Additionally, or in the alternative, a monolithic body or a monolithic body-segment may include a plurality of separately fabricated components, which may be formed using an additive manufacturing technology or other suitable fabrication technologies. For example, a heater body c100 and/or an engine c002 may additionally or alternatively include a plurality of components formed using a fabrication technology other than additive manufacturing, and such separately components may be operably coupled or operably couplable to one another and/or to one or more monolithic bodies and/or a monolithic body-segments. Other suitable fabrication technologies that may be used to manufacture various components of the presently disclosed heater bodies c100 and closed-cycle engines c002 include, without limitation, forming (e.g., rolling, stamping, joining, etc.), extruding (e.g., sheet extruding), subtractive manufacturing (e.g., machining, drilling, laser cutting, etc.), forging or casting, as well as a combination thereof, or any other manufacturing technology.

Still referring to FIGS. 11A and 11B through FIGS. 16A and 16B, an exemplary engine assembly c900 may include a first heater body c902 and a first engine body c904. As shown, for example, in FIGS. 11A and 11B a first monolithic body c908 may include a first heater body c902, a first engine body c904, a first piston body c916, and a first machine body c918. The first heater body c902 may define a first portion c906 of a first monolithic body c908. The first engine body c904 may define a second portion c910 of the first monolithic body c908. Alternatively, the first heater body c902 may define at least a portion of the first monolithic body c908 and/or the first engine body c904 may define at least a portion c910 of a second monolithic body c936.

The first engine body c904 may include a first piston body c916 and a first machine body c918. The first piston body c916 may define at least a portion of a piston chamber c112. The piston chamber c112 may be configured to receive at least a portion of a piston assembly c090. The first machine body c918 may define at least a portion of a generator housing c919. The generator housing c919 may be configured to receive at least a portion of a load device c092. The first piston body c916 may define a third portion c920 of the first monolithic body c908 and/or a third portion c920 of the first engine body c904. The first machine body c918 may define a fourth portion c922 of the first monolithic body c908 and/or a fourth portion c922 of the first engine body c904.

The first heater body c902 and/or the first engine body c904 may include a first regenerator body c926 and/or a first chiller body c928. For example, the first piston body c916 may include a first regenerator body c926. The first heater body c902 and/or the first engine body c904 may additionally or alternatively include a first chiller body c928. The first regenerator body c926 may define a portion of the first piston body c916 or at least a portion of a monolithic body-segment operably coupled or operably couplable to the first piston body c916. Additionally, or in the alternative, the first chiller body c928 may define a portion of the first piston body c916 or at least a portion of a monolithic body-segment operably coupled or operably couplable to the first piston body c916. As shown, for example, in FIGS. 11A and 11B, the first regenerator body c926 may define a fifth portion of the first monolithic body c908 and/or the first chiller body c928 may define a sixth portion of the first monolithic body c908.

Still referring to FIGS. 11A and 11B through FIGS. 16A and 16B, an exemplary engine assembly c900 may additionally or alternatively include a second heater body c930 and/or a second engine body c932. As shown, for example, in FIGS. 11A and 11B, the second heater body c930 may define a first portion c934 of a second monolithic body c936. The second engine body c932 may define a second portion c938 of the second monolithic body c936. The second monolithic body c936 may be operably coupled or operably couplable to the first monolithic body c908 and/or the first engine body c904.

As shown in FIGS. 11A and 11B, the second engine body c932 may include a second piston body c944. The second piston body c944 may define a third portion c948 of the second monolithic body c936 and/or a third portion c948 of the second engine body c932. The second piston body c944 may define at least a portion of a piston chamber c112. The piston chamber c112 may be configured to receive at least a portion of a piston assembly c090. The second piston body c944 may be operably coupled or operably couplable to the first monolithic body c908 and/or the first the first engine body c904.

In some embodiments, the second piston body c944 may include a second regenerator body c952 and/or a second chiller body c954. For example, the second heater body c930 and/or the second engine body c932 may include a second regenerator body c952. The second heater body c930 and/or the second engine body c932 may additionally or alternatively include a second chiller body c954. The second regenerator body c952 may define a portion of the second piston body c944 or at least a portion of a monolithic body-segment operably coupled or operably couplable to the second piston body c944. Additionally, or in the alternative, the second chiller body c954 may define a portion of the second piston body c944 or at least a portion of a monolithic body-segment operably coupled or operably couplable to the second piston body c944. As shown, for example, in FIGS. 11A and 11B, the second regenerator body c952 may define a fifth portion of the second monolithic body c936 and/or the second chiller body c928 may define a sixth portion of the second monolithic body c936. Additionally, or in the alternative, the second regenerator body c952 and/or the second chiller body c954 may define a monolithic body-segment operably coupled or operably couplable to the second monolithic body c936.

Now referring to FIGS. 12A and 12B, in some embodiments, an engine assembly c900 may include a plurality of monolithic body-segments. For example, as shown in FIGS. 12A and 12B, an engine assembly may include a first heater body c902, a first engine body c904, a second heater body c940, a second engine body c942, and a third engine body c960. As shown, a first heater body c902 may define at least a portion of a first monolithic body-segment c912. The first engine body c904 may define at least a portion of a second monolithic body-segment c914. The first engine body c904 may include a first piston body c916, and the first piston body c916 may define at least a portion of the second monolithic body-segment c914. The first piston body c916 may define at least a portion of a piston chamber c112. The piston chamber c112 may be configured to receive at least a portion of a piston assembly c090. The second monolithic body-segment c914 (e.g., the first piston body c916) may be operably coupled or operably couplable to the first monolithic body-segment c912 (e.g., the first heater body c902). For example, the second monolithic body-segment c914 (e.g., the first engine body c904) may be operably coupled or operably couplable to the first heater body c902.

The first engine body c904 may include a first regenerator body c926 and/or a first chiller body c928. The first regenerator body c926 and/or the first chiller body c928 may define at least a portion of the second monolithic body-segment c914. Additionally, or in the alternative, the first regenerator body c926 and/or the first chiller body c928 may define a monolithic body-segment operably coupled or operably couplable to the first monolithic body c908 or the second monolithic body-segment c914.

Still referring to FIGS. 12A and 12B, an exemplary engine assembly c900 may additionally or alternatively include a second heater body c930 and/or a second engine body c932. As shown, a second heater body c930 may define at least a portion of a fourth monolithic body-segment c940. Additionally, or in the alternative, a second engine body c932 may define at least a portion of a fifth monolithic body-segment c942. A second piston body c944 may define at least a portion of the fifth monolithic body-segment c942. The fifth monolithic body-segment c942 may be operably coupled or operably couplable to the fourth monolithic body-segment c940. For example, the fifth monolithic body-segment c942 (e.g., the second engine body c932 or the second piston body c944) may be operably coupled or operably couplable to the second heater body c930.

The second engine body c932 may include a second regenerator body c952 and/or a second chiller body c954. The second regenerator body c952 and/or the second chiller body c954 may define at least a portion of the fifth monolithic body-segment c942. Additionally, or in the alternative, the second regenerator body c952 and/or the second chiller body c954 may define a monolithic body-segment operably coupled or operably couplable to the second monolithic body c936 or the fifth monolithic body-segment c942. In some embodiments, the second piston body c944 may include a second regenerator body c952 and/or a second chiller body c954. The second regenerator body c952 may define a portion of the second piston body c944 or at least a portion of a monolithic body-segment operably coupled or operably couplable to the second piston body c944. Additionally, or in the alternative, the second chiller body c954 may define a portion of the second piston body c944 or at least a portion of a monolithic body-segment operably coupled or operably couplable to the second piston body c944.

An exemplary engine assembly c900 may additionally or alternatively include a third engine body c960. The third engine body c960 may include a first machine body c918, and the first machine body c918 may define at least a portion of a third monolithic body-segment c924. The first machine body c918 may define at least a portion of a generator housing c919. The generator housing c919 may be configured to receive at least a portion of a load device c092. The third monolithic body-segment c924 (e.g., the first machine body c918) may be operably coupled or operably couplable to the second monolithic body-segment c914 (e.g., the first piston body c916).

Now referring to FIGS. 13A and 13B, in some embodiments, an engine assembly c900 may include a plurality of monolithic bodies or monolithic body-segments, such as a first monolithic body or monolithic body-segment c908 defining a first heater body c902 and a first engine body c904, and a second monolithic body or monolithic body-segment c936 defining a second heater body c930 and a second engine body c932. A first monolithic body c908 may include a first heater body c902, a first engine body c904, a first piston body c916, and a first machine body c918. The first heater body c902 may define a first portion c906 of a first monolithic body c908. The first engine body c904 may define a second portion c910 of the first monolithic body c908. Alternatively, the first heater body c902 may define at least a portion of the first monolithic body c908 and/or the first engine body c904 may define at least a portion c910 of a second monolithic body c936.

The first engine body c904 may include a first piston body c916 and a first machine body c918. The first piston body c916 may define a third portion c920 of the first monolithic body c908 and/or a third portion c920 of the first engine body c904. The first piston body c916 may define at least a portion of a piston chamber c112. The piston chamber c112 may be configured to receive at least a portion of a piston assembly c090. The first machine body c918 may define a fourth portion c922 of the first monolithic body c908 and/or a fourth portion c922 of the first engine body c904. The first machine body c918 may define at least a portion of a generator housing c919. The generator housing c919 may be configured to receive at least a portion of a load device c092.

The first heater body c902 and/or the first engine body c904 may include a first regenerator body c926 and/or a first chiller body c928. For example, the first piston body c916 may include a first regenerator body c926. The first heater body c902 and/or the first engine body c904 may additionally or alternatively include a first chiller body c928. The first regenerator body c926 may define a portion of the first piston body c916 or at least a portion of a monolithic body-segment operably coupled or operably couplable to the first piston body c916. Additionally, or in the alternative, the first chiller body c928 may define a portion of the first piston body c916 or at least a portion of a monolithic body-segment operably coupled or operably couplable to the first piston body c916. The first regenerator body c926 may define a fifth portion of the first monolithic body c908 and/or the first chiller body c928 may define a sixth portion of the first monolithic body c908.

Still referring to FIGS. 13A and 13B, an exemplary engine assembly c900 may additionally or alternatively include a second heater body c930 and/or a second engine body c932. The second heater body c930 may define a first portion c934 of a second monolithic body c936. The second engine body c932 may define a second portion c938 of the second monolithic body c936. The second monolithic body c936 may be operably coupled or operably couplable to the first monolithic body c908 and/or the first engine body c904.

The second engine body c932 may include a second piston body c944 and/or a second machine body c946. The second piston body c944 may define a third portion c948 of the second monolithic body c936 and/or a third portion c948 of the second engine body c932. The second piston body c944 may define at least a portion of a piston chamber c112. The piston chamber c112 may be configured to receive at least a portion of a piston assembly c090. The second machine body c946 may define a fourth portion c950 of the second monolithic body c936 and/or a fourth portion c950 of the second engine body c932. The second machine body c946 may define at least a portion of a generator housing c919. The generator housing c919 may be configured to receive at least a portion of a load device c092. In some embodiments, the first machine body c918 may define a first portion c956 of a generator housing c919 and the second machine body c946 may define a second portion c958 of the generator housing c919. The first portion c956 of the generator housing c919 may be operably coupled or operably couplable to the second portion c958 of the generator housing c919.

In some embodiments, the second piston body c944 may include a second regenerator body c952 and/or a second chiller body c954. For example, the second heater body c930 and/or the second engine body c932 may include a second regenerator body c952. The second heater body c930 and/or the second engine body c932 may additionally or alternatively include a second chiller body c954. The second regenerator body c952 may define a portion of the second piston body c944 or at least a portion of a monolithic body-segment operably coupled or operably couplable to the second piston body c944. Additionally, or in the alternative, the second chiller body c954 may define a portion of the second piston body c944 or at least a portion of a monolithic body-segment operably coupled or operably couplable to the second piston body c944. The second regenerator body c952 may define a fifth portion of the second monolithic body c936 and/or the second chiller body c928 may define a sixth portion of the second monolithic body c936. Additionally, or in the alternative, the second regenerator body c952 and/or the second chiller body c954 may define a monolithic body-segment operably coupled or operably couplable to the second monolithic body c936.

Now referring to FIGS. 14A and 14B, in some embodiments, an engine assembly c900 may include a plurality of monolithic bodies or monolithic body-segments, such as a first monolithic body or monolithic body-segment c908 defining a first heater body c902 and a first engine body c904, a second monolithic body or monolithic body-segment c936 defining a second heater body c930 and a second engine body c932, and a third monolithic body or monolithic body-segment c962 defining a third engine body c960.

A first monolithic body c908 may include a first heater body c902, a first engine body c904, and a first piston body c916. The first heater body c902 may define a first portion c906 of a first monolithic body c908. The first engine body c904 may define a second portion c910 of the first monolithic body c908. Alternatively, the first heater body c902 may define at least a portion of the first monolithic body c908 and/or the first engine body c904 may define at least a portion c910 of a second monolithic body c936.

The first engine body c904 may include a first piston body c916 defining a third portion c920 of the first monolithic body c908 and/or a third portion c920 of the first engine body c904. The first piston body c916 may define at least a portion of a piston chamber c112. The piston chamber c112 may be configured to receive at least a portion of a piston assembly c090.

The first heater body c902 and/or the first engine body c904 may include a first regenerator body c926. For example, the first piston body c916 may include a first regenerator body c926 and/or a first chiller body c928. The first heater body c902 and/or the first engine body c904 may additionally or alternatively include a first chiller body c928. The first regenerator body c926 may define a portion of the first piston body c916 or at least a portion of a monolithic body-segment operably coupled or operably couplable to the first piston body c916. Additionally, or in the alternative, the first chiller body c928 may define a portion of the first piston body c916 or at least a portion of a monolithic body-segment operably coupled or operably couplable to the first piston body c916. The first regenerator body c926 may define a fifth portion of the first monolithic body c908 and/or the first chiller body c928 may define a sixth portion of the first monolithic body c908.

Still referring to FIGS. 14A and 14B, an exemplary engine assembly c900 may additionally or alternatively include a second heater body c930 and/or a second engine body c932. The second heater body c930 may define a first portion c934 of a second monolithic body c936. The second engine body c932 may define a second portion c938 of the second monolithic body c936.

The second engine body c932 may include a second piston body c944. The second piston body c944 may define a third portion c948 of the second monolithic body c936 and/or a third portion c948 of the second engine body c932. The second piston body c944 may define at least a portion of a piston chamber c112. The piston chamber c112 may be configured to receive at least a portion of a piston assembly c090.

In some embodiments, the second piston body c944 may include a second regenerator body c952 and/or a second chiller body c954. For example, the second heater body c930 and/or the second engine body c932 may include a second regenerator body c952. The second heater body c930 and/or the second engine body c932 may additionally or alternatively include a second chiller body c954. The second regenerator body c952 may define a portion of the second piston body c944 or at least a portion of a monolithic body-segment operably coupled or operably couplable to the second piston body c944. Additionally, or in the alternative, the second chiller body c954 may define a portion of the second piston body c944 or at least a portion of a monolithic body-segment operably coupled or operably couplable to the second piston body c944. The second regenerator body c952 may define a fifth portion of the second monolithic body c936 and/or the second chiller body c928 may define a sixth portion of the second monolithic body c936. Additionally, or in the alternative, the second regenerator body c952 and/or the second chiller body c954 may define a monolithic body-segment operably coupled or operably couplable to the second monolithic body c936.

As shown, for example, in FIGS. 14A and 14B, in some embodiments, an engine assembly c900 may include a third engine body c960. The third engine body c960 may define at least a portion of a third monolithic body or monolithic body-segment c962. As shown in FIGS. 14A and 14B, the third engine body c960 may be operably couplable to the first engine body c904 and/or the second engine body c932. The third engine body c960 may include a third machine body c964. The third machine body c964 may define a first portion c972 of the third monolithic body c962 or at least a portion of a monolithic body-segment. The third machine body c964 may define at least a portion of a generator housing c919. The generator housing c919 may be configured to receive at least a portion of a load device c092. The third machine body c964 may be operably coupled or operably couplable to the first engine body c904 and/or the second engine body c932.

Now referring to FIGS. 15A and 15B, in some embodiments, an engine assembly c900 may include a plurality of monolithic bodies or monolithic body-segments, such as a first monolithic body or monolithic body-segment c908 defining a first heater body c902 and a first engine body c904, a second monolithic body or monolithic body-segment c936 defining a second heater body c930 and a second engine body c932, a third monolithic body or monolithic body-segment c962 defining a third engine body c960, and a fourth monolithic body or monolithic body-segment c978 defining a fourth engine body c976.

A first monolithic body c908 may include a first heater body c902, a first engine body c904, and a first piston body c916. The first heater body c902 may define a first portion c906 of a first monolithic body c908. The first engine body c904 may define a second portion c910 of the first monolithic body c908. Alternatively, the first heater body c902 may define at least a portion of the first monolithic body c908 and/or the first engine body c904 may define at least a portion c910 of a second monolithic body c936.

The first engine body c904 may include a first piston body c916 defining a third portion c920 of the first monolithic body c908 and/or a third portion c920 of the first engine body c904. The first piston body c916 may define at least a portion of a piston chamber c112. The piston chamber c112 may be configured to receive at least a portion of a piston assembly c090.

The first heater body c902 and/or the first engine body c904 may include a first regenerator body c926. For example, the first piston body c916 may include a first regenerator body c926. The first regenerator body c926 may define a portion of the first piston body c916 or at least a portion of a monolithic body-segment operably coupled or operably couplable to the first piston body c916. The first regenerator body c926 may define a fifth portion of the first monolithic body c908.

Still referring to FIGS. 15A and 15B, an exemplary engine assembly c900 may additionally or alternatively include a second heater body c930 and/or a second engine body c932. The second heater body c930 may define a first portion c934 of a second monolithic body c936. The second engine body c932 may define a second portion c938 of the second monolithic body c936.

The second engine body c932 may include a second piston body c944. The second piston body c944 may define a third portion c948 of the second monolithic body c936 and/or a third portion c948 of the second engine body c932. The second piston body c944 may define at least a portion of a piston chamber c112. The piston chamber c112 may be configured to receive at least a portion of a piston assembly c090.

In some embodiments, the second piston body c944 may include a second regenerator body c952. For example, the second heater body c930 and/or the second engine body c932 may include a second regenerator body c952. The second regenerator body c952 may define a portion of the second piston body c944 or at least a portion of a monolithic body-segment operably coupled or operably couplable to the second piston body c944. The second regenerator body c952 may define a fifth portion of the second monolithic body c936 and/or. Additionally, or in the alternative, the second regenerator body c952 may define a monolithic body-segment operably coupled or operably couplable to the second monolithic body c936.

As shown in FIGS. 15A and 15B, in some embodiments, an engine assembly c900 may include a third engine body c960 and a fourth engine body c976. The third engine body c960 may define at least a portion of a third monolithic body or monolithic body-segment c962. The third engine body c960 may be operably coupled or operably couplable to the first engine body c904 and/or the fourth engine body c976. The third engine body c960 may include a third machine body c964 and/or a third piston body c966. The third machine body c964 may define a first portion c972 of the third monolithic body c962 or at least a portion of a monolithic body-segment. The third piston body c966 may define a second portion c974 of the third monolithic body c962 or at least a portion of a monolithic body-segment. The third machine body c964 may be operably coupled or operably couplable to the fourth engine body c976 and/or the third piston body c966 may be operably coupled or operably couplable to the first engine body c904 (e.g., the first piston body c916).

The fourth engine body c976 may define at least a portion of a fourth monolithic body c978 or at least a portion of a monolithic body-segment operably coupled or operably couplable to the third engine body c960 and/or the second engine body c932. The fourth engine body c976 may include a fourth machine body c980 and/or a fourth piston body c982. The fourth machine body c980 may define a first portion c984 of the fourth monolithic body c978 or at least a portion of a monolithic body-segment. The fourth piston body c982 may define a second portion c986 of the fourth monolithic body c978 or at least a portion of a monolithic body-segment. The fourth machine body c980 may be operably coupled or operably couplable to the third engine body c960 (e.g., the third machine body c964) and/or the fourth piston body c982 may be operably coupled or operably couplable to the second engine body c932 (e.g., the second piston body c944). The third machine body c960 may define a first portion of a generator housing c919 and the fourth machine body c980 may define a second portion of the generator housing c919.

The first piston body c916 may be operably coupled or operably couplable to the third piston body c966. The first piston body c916 may define a first portion c968 of a first piston chamber c112 and the third piston body c966 may define a second portion c970 of the first piston chamber c112. The second piston body c944 may be operably coupled or operably couplable to the fourth piston body c982. The second piston body c944 may define a first portion c968 of a second piston chamber c112 and the fourth piston body c982 may define a second portion c970 of the second piston chamber c112.

The third piston body c966 may include the first chiller body c928 and/or the fourth piston body c982 may include the second chiller body c954. The first chiller body c928 may define at least a portion of the third monolithic body c962 or at least a portion of a monolithic body-segment operably coupled or operably couplable to the third piston body c966. The second chiller body c954 may define at least a portion of the fourth monolithic body c978 or at least a portion of a monolithic body-segment operably coupled or operably couplable to the fourth piston body c982.

Now referring to FIGS. 16A and 16B, in some embodiments, an engine assembly c900 may include a plurality of monolithic bodies or monolithic body-segments, such as a first monolithic body or monolithic body-segment c908 defining a first heater body c902 and a first engine body c904, a second monolithic body or monolithic body-segment c936 defining a second engine body c932, and a third monolithic body or monolithic body-segment c962 defining a third engine body c960.

A first monolithic body c908 may include a first heater body c902, a first engine body c904, and a first piston body c916. The first heater body c902 may define a first portion c906 of a first monolithic body c908. The first engine body c904 may define a second portion c910 of the first monolithic body c908. Alternatively, the first heater body c902 may define at least a portion of the first monolithic body c908 and/or the first engine body c904 may define at least a portion c910 of a second monolithic body c936.

The first engine body c904 may include a first piston body c916 defining a third portion c920 of the first monolithic body c908 and/or a third portion c920 of the first engine body c904. The first piston body c916 may define at least a portion of a piston chamber c112. The piston chamber c112 may be configured to receive at least a portion of a piston assembly c090.

The first heater body c902 and/or the first engine body c904 may include a first regenerator body c926. For example, the first piston body c916 may include a first regenerator body c926. The first regenerator body c926 may define a portion of the first piston body c916 or at least a portion of a monolithic body-segment operably coupled or operably couplable to the first piston body c916. The first regenerator body c926 may define a fifth portion of the first monolithic body c908.

The second engine body c932 may define a second portion c938 of the second monolithic body c936. The second monolithic body c936 may be operably coupled or operably couplable to the third engine body c960.

The second engine body c932 may include a second piston body c944 and/or a second machine body c946. The second piston body c944 may define a third portion c948 of the second monolithic body c936 and/or a third portion c948 of the second engine body c932. The second piston body c944 may define at least a portion of a piston chamber c112. The piston chamber c112 may be configured to receive at least a portion of a piston assembly c090. The second machine body c946 may define a fourth portion c950 of the second monolithic body c936 and/or a fourth portion c950 of the second engine body c932. The second machine body c946 may define at least a portion of a generator housing c919. The generator housing c919 may be configured to receive at least a portion of a load device c092. In some embodiments, the first machine body c918 may define a first portion c956 of a generator housing c919 and the second machine body c946 may define a second portion c958 of the generator housing c919. The first portion c956 of the generator housing c919 may be operably coupled or operably couplable to the second portion c958 of the generator housing c919.

The third engine body c960 and a fourth engine body c976. The third engine body c960 may define at least a portion of a third monolithic body or monolithic body-segment c962. The third engine body c960 may be operably coupled or operably couplable to the first engine body c904 and/or the fourth engine body c976. The third engine body c960 may include a third machine body c964 and/or a third piston body c966. The third machine body c964 may define a first portion c972 of the third monolithic body c962 or at least a portion of a monolithic body-segment. The third piston body c966 may define a second portion c974 of the third monolithic body c962 or at least a portion of a monolithic body-segment. The third machine body c964 may be operably coupled or operably couplable to the fourth engine body c976 and/or the third piston body c966 may be operably coupled or operably couplable to the first engine body c904 (e.g., the first piston body c916). The first piston body c916 may be operably coupled or operably couplable to the third piston body c966. The first piston body c916 may define a first portion c968 of a first piston chamber c112 and the third piston body c966 may define a second portion c970 of the first piston chamber c112. The third piston body c966 may include the first chiller body c928. The first chiller body c928 may define at least a portion of the third monolithic body c962 or at least a portion of a monolithic body-segment operably coupled or operably couplable to the third piston body c966.

Figure 17A:
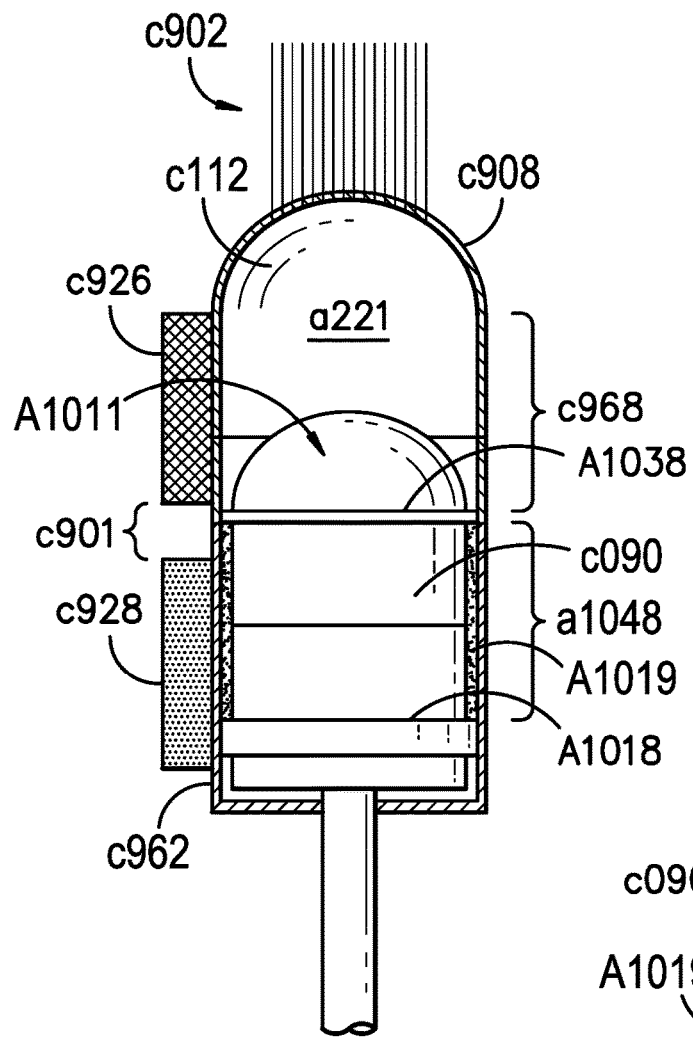
FIGS. 17A and 17B schematically depict an engine assembly with a thermal break positioned between portions the engine assembly.
Figure 17B:
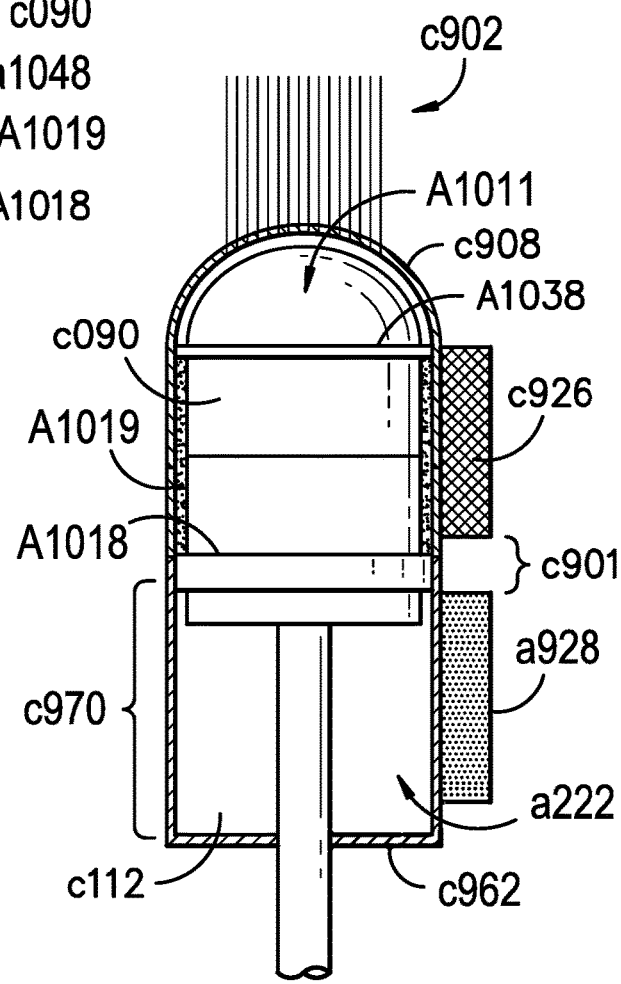

Referring back to FIGS. 15A and 15B and FIGS. 16A and 16B, in addition to FIG. 17A and FIG. 17B, in certain embodiments, the engine assembly c900 defines a thermal break c901 positioned between the first regenerator body c926 and the first chiller body c928. In various embodiments such as provided herein, the thermal break c901 may be positioned at an interface of the first monolithic body c908 and monolithic body-segment c962. The thermal break c901 defines a region of the piston chamber c112 relative to a seal assembly A1018 at the piston assembly c090 configured to mitigate heat transfer between the expansion and compression spaces as the piston assembly c090 moves between extreme positions.

In various embodiments, the thermal break c901 is a space between the relatively hot regenerator body c926 and the relatively cold chiller body c928. In certain embodiments, the thermal break c901, or particularly a lateral dimension between the regenerator body c926 and the chiller body c928, corresponds to a thickness or lateral dimension (i.e., along the direction of articulation of the piston assembly c090 during operation) of the seal assembly a1018.

Referring particularly to FIGS. 17A and 17B, exemplary views of a piston a1011 of the piston assembly c090 at a bottom dead center (BDC, e.g., in FIG. 17A) and a top dead center (TDC, e.g., in FIG. 17B) are provided. In certain embodiments, the seal assembly A1018 is positioned at the piston a1011 of the piston assembly c090 such as to not extend past the thermal break c901 when the piston a1011 extends to one extreme position. For instance, in an embodiment in which the seal assembly a1018 is positioned distal to the first monolithic body c908 or the regenerator body c926, the seal assembly a1018 is positioned at the piston a1011 such as to not extend past the thermal break c901 when the piston assembly c090 is articulated to the TDC position. In some embodiments, the seal assembly a1018 is configured to not extend completely past the thermal break c901. It should be appreciated that in other embodiments, the seal assembly a1018 may be positioned proximate to the first monolithic body c908 or the regenerator body c926 such as to configure the seal assembly a1018 to not extend past the thermal break c901 when the piston assembly c090 is articulated to the BDC position.

Referring still to FIG. 17A and FIG. 17B, in certain embodiments, the piston assembly c090 may include a second seal a1038 positioned proximate to the first monolithic body c908 or the regenerator body c926 relative to the seal assembly a1018. The second seal a1038 may generally define a discourager seal configured to mitigate fluid flow to or from a cavity a1019 positioned between the seal assembly a1018 and second seal a1038. The cavity a1019 is further defined between the piston a1011 and the surrounding walls of the piston chamber a112, such as walls defined by the first monolithic body c908 and the monolithic body-segment c962. The cavity a1019 may define an inter-seal dimension A1048 defined between the seal assembly a1018 and the second seal a1038. In particular embodiments, the inter-seal dimension a1048 is at least a dimension corresponding to a maximum stroke length of the piston assembly c090. As such, the second seal a1038 is configured to not extend past the thermal break c901 when the piston assembly c090 is articulated to the BDC position, such as depicted in FIG. 17A. Additionally, the seal assembly a1018 is configured to not extend past the thermal break c901 when the piston assembly c090 is articulated to the TDC position, such as depicted in FIG. 17B. In other embodiments, it should be appreciated that the second seal a1038 and the seal assembly a1018 may be reversed, such that the second seal a1038 is positioned proximate to the monolithic body-segment c962 and the seal assembly a1018 is positioned proximate to the monolithic body c908.

Various embodiments of the piston assembly c090 may position one or both of the seal assembly a1018 and the second seal a1038 such as to define the first portion c968 of the chamber as a region exposed to relatively hot working fluid, such as an expansion chamber a221. The piston assembly c090 may position one or both of the seal assembly a1018 and the second seal a1038 such as to define the second portion c970 of the chamber as a region exposed to relatively cold working fluid, such as a compression chamber a222. Particular positioning of the seal assembly a1018 and/or the second seal a1038 may allow for a separate or non-overlapping hot and cold region, such as depicted at first portion c968 (FIG. 17A) relative to the second portion c970 (FIG. 17B). The non-overlapping regions may allow for improved heat transfer, engine efficiency, power output, and/or component life by limiting heat transfer to and from the expansion chamber a221 and the compression chamber a222 as the piston assembly c090 moves between BDC and TDC positions.

Figure 18:
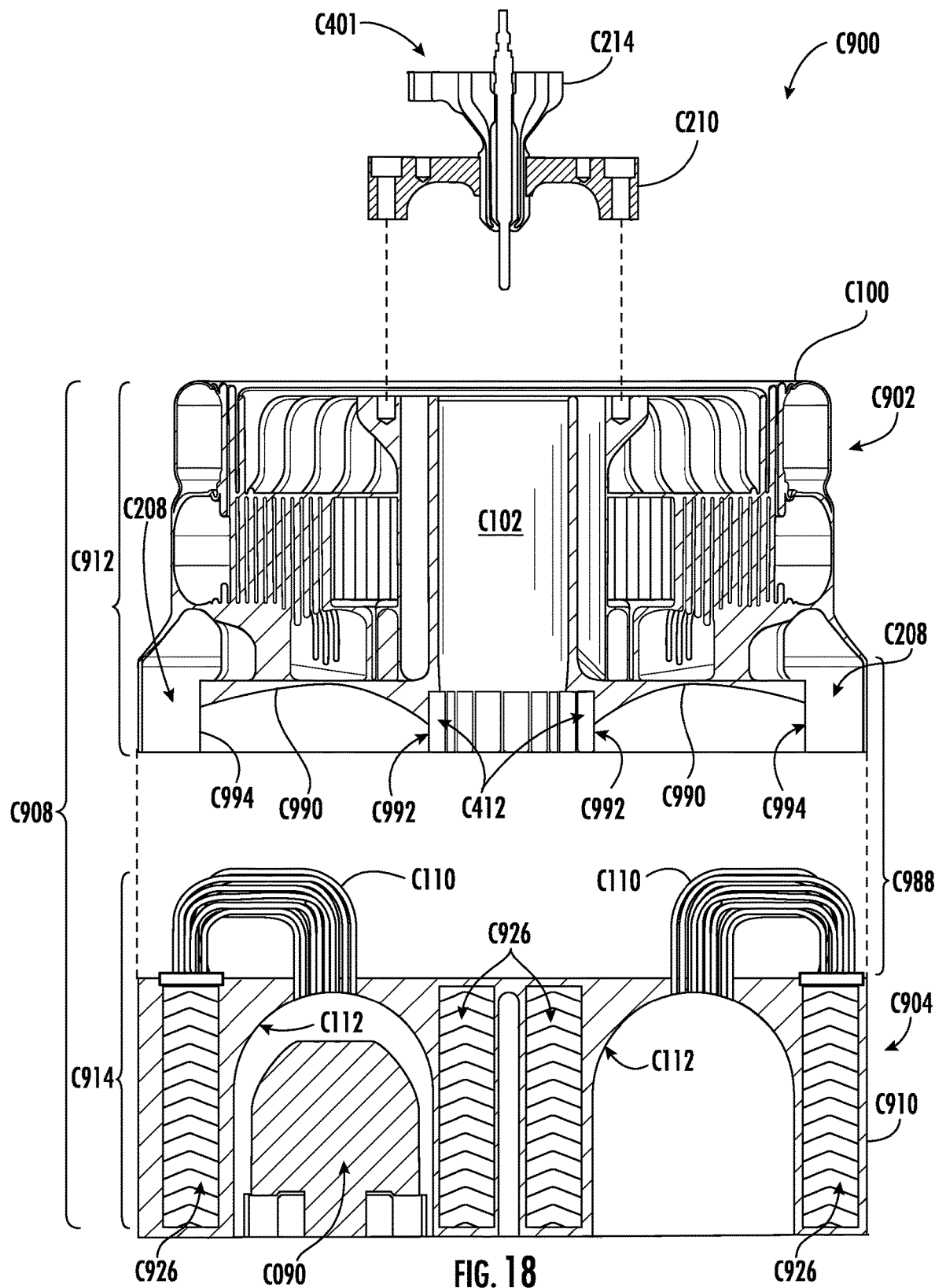
FIG. 18 schematically depicts an enlarged partial exploded view of another exemplary engine assembly according to aspects of the present disclosure.

Now referring to FIG. 18, an exemplary engine assembly c900 may include a one or more engine-working fluid heat exchanger bodies c988. The one or more engine-working fluid heat exchanger bodies c988 may define at least a portion of the first heater body c902 and/or at least a portion of the first engine body c904. A working-fluid heat exchanger body c988 may include a plurality of working-fluid pathways c110 fluidly communicating between a piston body and a regenerator body (e.g., between a first piston body c916 and a first regenerator body c926, or between a second piston body c944 and a second regenerator body c952). For example, an engine body c904 may include a first piston body c916, a first regenerator body c926, and a working-fluid heat exchanger body c988 that includes a plurality of working-fluid pathways c110 fluidly communicating between the first piston body c916 and the first regenerator body c926. The working-fluid heat exchanger body c988 may define at least a portion of the first heater body c902 and/or at least a portion of the first engine body c904. The working-fluid heat exchanger body c988 may additionally or alternatively include a heating chamber body c990.

In some embodiments, the first heater body c902 may define at least a portion of a first monolithic-body segment c912 and/or the first engine body c904 may define at least a portion of a second monolithic-body segment c914. The first heater body c902 may include at least a portion of the heating chamber body c990. The heating chamber body c990 may define at least a portion of the first monolithic body-segment c912. The second monolithic body-segment c914 may include at least a portion of the working-fluid heat exchanger body c988, at least a portion of the first piston body c916, and/or at least a portion of the first regenerator body c926. The working-fluid heat exchanger body c988 may define at least a portion of the second monolithic body-segment c914. The heating chamber body c990 may surround at least a portion of the working-fluid heat exchanger body c988. For example, the heating chamber body c990 may define at least a portion of a recirculation pathway c104 surrounding at least a portion of the working-fluid heat exchanger body c988. The heating chamber body c990 may fluidly communicate at an upstream portion (e.g., at a radially or concentrically inward portion) with a heating fluid inlet c992. For example, the heating chamber body c990 may fluidly communicate with a combustion chamber c102, such as with a combustion chamber outlet c412. The heating chamber body c990 may fluidly communicate at a downstream portion (e.g., at a radially or concentrically outward portion) with a heating fluid outlet c994. For example, the heating chamber body c990 may fluidly communicate with a recirculation annulus c208.

Referring again to FIGS. 11A and 11B through FIGS. 16A and 16B, exemplary engine assemblies c900 may include one or more fuel injector bodies c401. An exemplary fuel injector body c401 may include one or more combustor caps c210. For example, an engine assembly c900 may include a first fuel injector body c401. The first fuel injector body c401 may include a first combustor cap c210 monolithically integrated with the first heater body c902. Alternatively, the first fuel injector body c401 may include a first combustor cap c210 operably coupled or operably couplable to the first heater body c902. Additionally, or in the alternative, an engine assembly c900 may include a second fuel injector body c401. The second fuel injector body may include a second combustor cap c210 monolithically integrated with the second heater body c930. Alternatively, the second fuel injector body c401 may include a second combustor cap c210 operably coupled or operably couplable to the second heater body c930. A first fuel nozzle c214 may be monolithically integrated with first combustor cap c210. Alternatively, a first fuel nozzle c214 may be operably coupled or operably couplable to the first combustor cap c210. Additionally, or in the alternative, a second fuel nozzle c214 may be monolithically integrated with second combustor cap c210. Alternatively, a second fuel nozzle c214 may be operably coupled or operably couplable to the second combustor cap c210. A first piston assembly c090 may be operably inserted or operably insertable into a first piston chamber c112 and/or a second piston assembly c090 may be operably inserted or operably insertable into a second piston chamber c112. A first load device c092 may be operably inserted or operably insertable into a first generator housing c919 and/or a second load device c092 may be operably inserted or operably insertable into a second generator housing c919.

Figure 19:
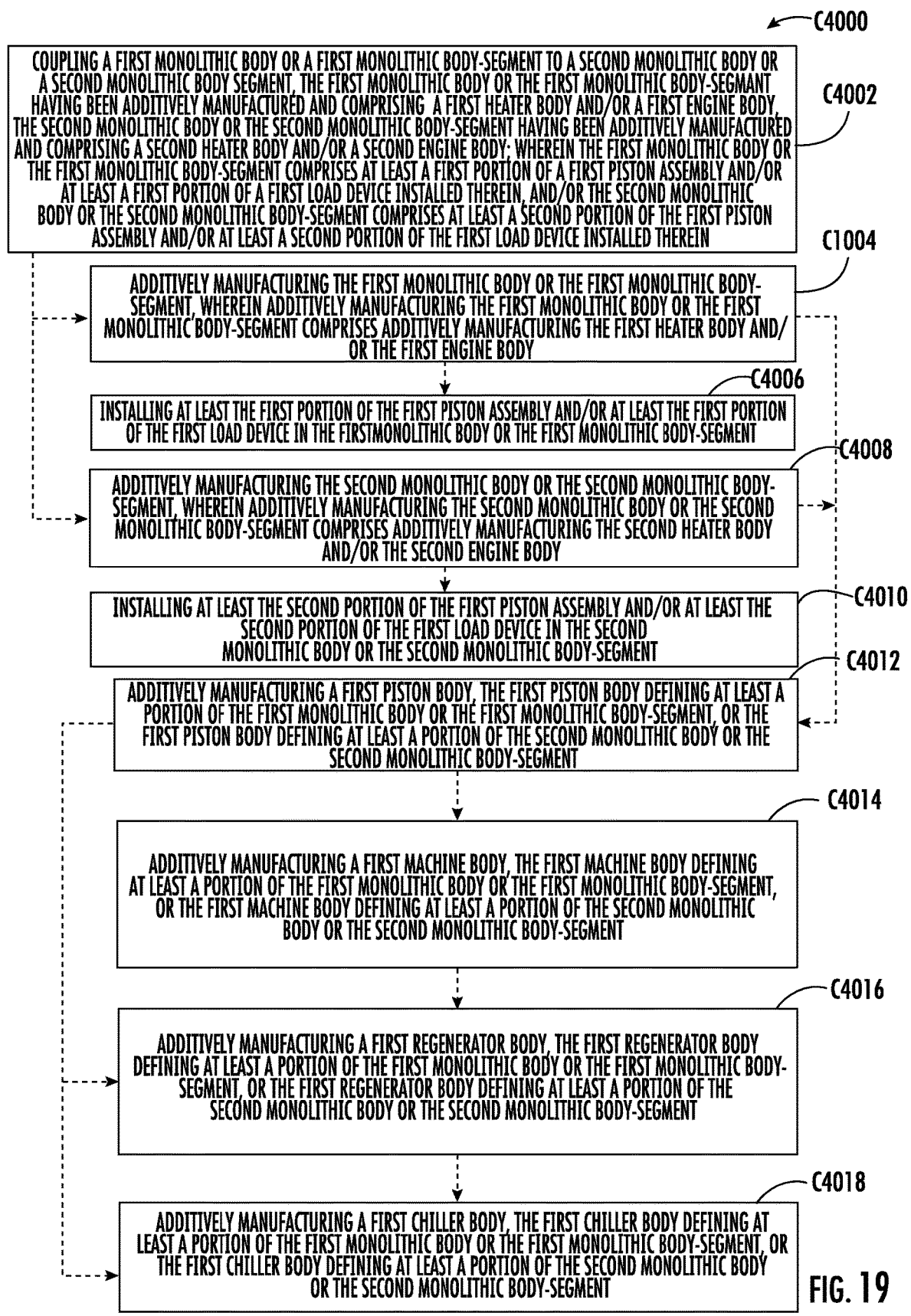
FIG. 19 shows a flowchart depicting an exemplary method of building an engine assembly.

Now turning to FIG. 19, exemplary methods of building an engine assembly c900 will be described. As shown in FIG. 19, an exemplary method c4000 may include, at block c4002, coupling a first monolithic body c908 or a first monolithic body-segment c912 to a second monolithic body c936 or a second monolithic body segment c914. The first monolithic body c908 or the first monolithic body-segment c914 may have been additively manufactured and/or the second monolithic body c936 or the second monolithic body-segment c914 may have been additively manufactured. The first monolithic body c908 or the first monolithic body-segment c912 may include a first heater body c902 and/or a first engine body c904. The second monolithic body c936 or the second monolithic body-segment c914 may include a second heater body c930 and/or a second engine body c932. The first monolithic body c908 or the first monolithic body-segment c912 may include a first piston assembly c090 and/or a first load device c092 installed therein. Additionally, or in the alternative, the second monolithic body c936 or the second monolithic body-segment c914 may include the first piston assembly c090 and/or the first load device c092 installed therein.

An exemplary method 1000 may include, at block c4004, additively manufacturing the first monolithic body c908 or the first monolithic body-segment c912. Additively manufacturing the first monolithic body c908 or the first monolithic body-segment c912 may include additively manufacturing the first heater body c902 and/or the first engine body c904. An exemplary method 1000 may include, at block c4006, installing the first piston assembly c090 and/or the first load device c092 in the first monolithic body c908 or the first monolithic body-segment c912. For example, the method 1000 may include installing the first piston assembly c090 in the first heater body c902 and/or in the first engine body c904. Additionally, or in the alternative, the method 1000 may include installing the first load device c092 in the first heater body c902 and/or in the first engine body c904.

An exemplary method 1000 may include, at block c4008, additively manufacturing the second monolithic body c936 or the second monolithic body-segment c914. Additively manufacturing the second monolithic body c936 or the second monolithic body-segment c914 may include additively manufacturing the second heater body c930 and/or the second engine body c932. An exemplary method 1000 may include, at block c4010, installing the first piston assembly c090 and/or the first load device c092 in the second monolithic body c936 or the second monolithic body-segment c914. For example, the method 1000 may include installing the first piston assembly c090 in the second heater body c930 and/or the second engine body c932. Additionally, or in the alternative, the method 1000 may include installing the first load device c092 in the second heater body c930 and/or the second engine body c932.

An exemplary method 1000 may include, at block c4012, additively manufacturing a first piston body c916. The first piston body c916 may define at least a portion of the first monolithic body c908 or at least a portion of the first monolithic body-segment c912. Additionally, or in the alternative, the first piston body c916 may define at least a portion of the second monolithic body c936 or at least a portion of the second monolithic body-segment c914. The exemplary method c4000 may additionally or alternatively include installing the first piston assembly c090 in the first piston body c916.

The exemplary method 1000 may additionally or alternatively include, at block c4014, additively manufacturing a first machine body c922. The first machine body c922 may define at least a portion of the first monolithic body c908 or at least a portion of the first monolithic body-segment c912. Additionally, or in the alternative, the first machine body c922 may define at least a portion of the second monolithic body c936 or at least a portion of the second monolithic body-segment c912. The exemplary method c4000 may additionally or alternatively include installing the first load device c092 in the first machine body c922.

The exemplary method 1000 may additionally or alternatively include, at block c4016, additively manufacturing a first regenerator body c926. The first regenerator body c926 may define at least a portion of the first monolithic body c908 or at least a portion of the first monolithic body-segment c912. Additionally, or in the alternative, the first regenerator body c926 may define at least a portion of the second monolithic body c936 or at least a portion of the second monolithic body-segment c912. The exemplary method c4000 may additionally or alternatively include installing the first regenerator body c926 in the first monolithic body c908 or at least a portion of the first monolithic body-segment c912.

The exemplary method 1000 may additionally or alternatively include, at block c4018, additively manufacturing a first chiller body c928. The first chiller body c928 may define at least a portion of the first monolithic body c908 or at least a portion of the first monolithic body-segment c912. Additionally, or in the alternative, the first chiller body c928 may define at least a portion of the second monolithic body c936 or at least a portion of the second monolithic body-segment c912. The exemplary method c4000 may additionally or alternatively include installing the first chiller body c928 in the first monolithic body c908 or at least a portion of the first monolithic body-segment c912.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral subcomponents.

Although additive manufacturing technology is described herein as providing fabrication of complex objects by building objects point-by-point, layer-by-layer, typically in a vertical direction, other methods of fabrication are possible and are within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes. As another example, embodiments of the present disclosure may include selectively depositing a binder material to chemically bind portions of the layers of powder together to form a green body article. After curing, the green body article may be pre-sintered to form a brown body article having substantially all of the binder removed, and fully sintered to form a consolidated article.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Laser Sintering (DLS), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Laser Melting (DLM), Direct Selective Laser Melting (DSLM), Selective Laser Melting (SLM), Direct Metal Laser Melting (DMLM), Binder Jetting (BJ), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" or "binding" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process, or additionally with a binder process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, a decreased porosity decreasing and/or an increased density (e.g., via hot isostatic pressing), and other component properties or features.

It should be appreciated that one skilled in the art may add or modify features shown and described herein to facilitate manufacture of the system A10 provided herein without undue experimentation. For example, build features, such as trusses, grids, build surfaces, or other supporting features, or material or fluid ingress or egress ports, may be added or modified from the present geometries to facilitate manufacture of embodiments of the system A10 based at least on a desired manufacturing process or a desired particular additive manufacturing process.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While certain embodiments of the present disclosure may not be limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process, reduce potential leakage, reduce thermodynamic losses, improve thermal energy transfer, or provide higher power densities. For example, the integral formation reduces the number of separate parts that must be assembled, thus reducing associated time, overall assembly costs, reduces potential leakage pathways, or reduces potential thermodynamic losses. Additionally, existing issues with, for example, leakage, may advantageously be reduced. Still further, joint quality between separate parts may be addressed or obviated by the processes described herein, such as to desirably reduce leakage, assembly, and improve overall performance.

Also, the additive manufacturing methods described above provide much more complex and intricate shapes and contours of the components described herein to be formed with a very high level of precision. For example, such components may include thin additively manufactured layers, cross sectional features, and component contours. As another example, additive manufacturing may provide heat exchanger surface areas, volumes, passages, conduits, or other features that may desirably improve heat exchanger efficiency or performance, or overall engine or system performance. In addition, the additive manufacturing process provides the manufacture of a single component having different materials such that different portions of the component may exhibit different performance characteristics. The successive, additive steps of the manufacturing process provide the construction of these novel features. As a result, the components described herein may exhibit improved functionality and reliability.

Closed-cycle engine arrangements, such as Stirling engines, generally define a ratio of power output in Watts to a product of mean average engine working fluid pressure in Pascals, swept volume of the engine working fluid in cubic meters, and engine cycle frequency in Hertz (i.e., operating frequency of a piston assembly), otherwise referred to as a Beale number. A maximum operating Beale number for Stirling engines, depending on operating temperature and engine performance, generally ranges between 0.05 and 0.15. Referring to certain embodiments of the system A10 shown and described herein, features, arrangements, ratios, or methods of manufacture and assembly shown and described herein provide the engine A100 to define a first operational parameter in which the first operational parameter defines a maximum operational Beale number greater than or equal to 0.10. In another embodiment, the engine A100 defines a maximum operational Beale number greater than 0.15. In still another embodiment, the engine A100 defines a maximum operational Beale number greater than 0.20. In yet another embodiment, the engine A100 defines a maximum operational Beale number greater than 0.23. In various embodiments, the engine A100 defines a maximum operational Beale number less than or equal to 0.35. In still various embodiments, the engine A100 defines a maximum operational Beale number less than 0.30. In one embodiment, embodiments of the engine A100 shown and described herein define a maximum operational Beale number between 0.10 and 0.35, inclusive. In still various embodiments, the engine A100 defines a maximum operational Beale number between 0.15 and 0.30.

Embodiments of the system A10 and engine A100 provided herein provide greater Beale numbers via one or more of the features, arrangements, ratios, or methods of manufacture and assembly provided herein. Greater Beale numbers are provided at least in part via lower average engine working fluid pressure, lower engine cycle frequency of the piston assemblies A1010, or lower swept volume of the engine working fluid between fluidly connected chambers A221, A222, or combinations thereof, relative to the power output from the piston assembly A1010. Exemplary embodiments of the system A10 and engine A100 provided herein may produce a mechanical power output from the piston assembly A1010 up to 100 kilowatts (kW) or more.

Embodiments of the engine A100 provided herein may provide greater Beale numbers based at least in part on the plurality of heater conduits C110 collectively defining a desired heat transferability of thermal energy from the hot side heat exchanger C108 to the engine working fluid within the plurality of heater conduits C110. In various embodiments, the system A10 defines a ratio of maximum cycle volume of the engine working fluid to a collective volume of the plurality of heater conduits. The maximum cycle volume is the maximum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The minimum cycle volume is the minimum volume of the engine working fluid within the expansion chamber A221, the compression chamber A222, and the fluid volume connected therebetween (e.g., the expansion chamber A221 of one piston body and the compression chamber A222 of another piston body connected by the walled conduit A1050). The difference between the maximum cycle volume and the minimum cycle volume is the swept volume. In one embodiment, the ratio of maximum cycle volume of the engine working fluid to the volume of the passages within the plurality of heater conduits is between 2.5 and 25. For example, in various embodiments, the plurality of heater conduits together contain between two-fifths and one-twenty-fifth of the volume of the total volume of engine working fluid based on the maximum cycle volume. Stated differently, between two-fifths and one-twenty-fifth of the maximum cycle volume of the engine working fluid is receiving thermal energy from the hot side heat exchanger C108 during operation of the system A10.

In still various embodiments, embodiments of the engine A100 provided herein may provide greater Beale numbers based at least in part on a ratio of surface area of the plurality of heater conduits C110 versus volume of the working fluid within the plurality of heater conduits C110. For instance, the plurality of heater conduits may provide a range of surface area collectively within the plurality of heater conduits C110 relative to the volume of the engine working fluid within the plurality of heater conduits C110. The surface area may generally define the internal area of the heater conduits in direct fluid contact with the engine working fluid. In various embodiments, the ratio of surface area of the plurality of heater conduits to volume of the working fluid within the plurality of heater conduits is between 8 and 40. For example, in various embodiments, the plurality of heater conduits together defines a unit surface area within the conduits (i.e., surface area in fluid contact with the engine working fluid) between 8 and 40 times greater than a unit volume of the plurality of heater conduits.

In still another embodiment, Eout is the net electrical energy output from the load device C092 that is operatively coupled to the engine A100 via the piston assembly C1010.

In various embodiments, the features, arrangements, surface areas, volumes, or ratios thereof provide the engine A100 to operate at higher efficiencies over known closed cycle engines, or Stirling engines particularly. Various embodiments of the system A10 provided herein may be configured to produce mechanical power output from the piston assembly A1010 at a Carnot efficiency $\eta_{Carnot}$ of up to approximately 80%. In some embodiments, the system A10 provided herein may be configured to produce mechanical power output from the piston assembly A1010 at an efficiency of up to approximately 80% in certain cold environments (e.g., space). In one embodiment, the Carnot efficiency corresponds at least to the engine A100 including the hot side heat exchanger C108 and the cold side heat exchanger A42, such as depicted at the engine level efficiency (FIG. 6).

Various embodiments of the system A10 provided herein may be configured to produce mechanical power output from the piston assembly A1010 at electrical efficiency of up to approximately 80%. In one embodiment, the electrical efficiency corresponds to the useful work generated by the engine A100 receiving heat or thermal energy from the heating working fluid and releasing heat or thermal energy to the chiller working fluid and converted into electrical energy via the load device C092, such as depicted within area A106 in FIG. 6. In one embodiment, the electrical efficiency corresponds at least to the system A10 including the engine A100, the heater body C100, and the chiller assembly A40, such as depicted at the system level efficiency (FIG. 6).

In one embodiment, the system A10 provides a temperature differential via the heater body C100 and the chiller assembly C40 in which the engine A100 generates mechanical power output between 1 kW and 100 kW relative to the piston assembly A1010. In another embodiment, the system A10 is configured to generate between 10 kW and 100 kW. In yet another embodiment, the system A10 is configured to generate between 25 kW and 100 kW. In yet another embodiment, the system A10 may be configured to produce greater than 100 kW. For example, the system A10 may include a plurality of the engine A100 operably coupled at two or more piston assemblies A1010 and the load device c092 to produce greater than 100 kW. In various embodiments, a plurality of the engine A100 may be operably coupled to produce up to 5 megawatts.

In still various embodiments, the engine A100 further defines a second operational parameter defining a ratio of mechanical power output from the piston assembly A1010 to maximum cycle volume of the working fluid between 0.0005 and 0.0040 kW per cubic centimeter (cc) for a given efficiency. In various embodiments, the ratio of mechanical power output from the piston assembly A1010 to maximum cycle volume of the working fluid is a range of maximum ratio at which the mechanical power output from the piston assembly A1010 to maximum cycle volume of the working fluid is defined. In some embodiments, the engine A100 defines a maximum ratio of mechanical power output from the piston assembly A1010 to maximum cycle volume of the working fluid between 0.0005 and 0.0040 kW generated from the piston assembly A1010 for one cubic centimeter of engine working fluid at an engine efficiency of at least 50%. Stated differently, between 0.0005 and 0.0040 kW is generated from the piston assembly A1010 for one cubic centimeter of engine working fluid at an engine efficiency of at least 50%. In various embodiments, the engine A100 defines a ratio of mechanical power output from the piston assembly A1010 to the maximum cycle volume of the working fluid between 0.0010 and 0.0030 kW/cc at an engine efficiency of at least 50%. In another embodiment, the engine A100 defines a ratio of mechanical power output from the piston assembly A1010 to the maximum cycle volume of the working fluid between 0.0015 and 0.0025 kW/cc at an engine efficiency of at least 50%. In one embodiment, the system A10 defines the ratio of mechanical power output from the piston assembly A1010 to maximum cycle volume of the working fluid between 0.0005 kW/cc and 0.0040 kW/cc at a Carnot efficiency of the engine of up to 80%. In another embodiment, the engine A100 defines the ratio of mechanical power output from the piston assembly A1010 to maximum cycle volume of the working fluid between 0.0005 kW/cc and 0.0040 kW/cc with an efficiency of the engine A100 of up to 60%.

Various embodiments of the system A10 shown and described herein provide a power density by efficiency that may be advantageous over certain power generation or energy conversion systems including engine and heat exchanger systems. In certain embodiments, the system A10 includes a third operational parameter defining a multiplication product of power density (kW/m$^3$) and system level efficiency greater than 51. For example, the power density is power output at the load device c092 over volume of the engine working fluid at the engine A100. In particular embodiments, the system A10 includes the power density over maximum cycle volume of the engine working fluid at the engine A100. In some embodiments, the system A10 includes a power density (kW/m$^3$) by efficiency greater than 100. In still other embodiments, the system A10 includes a power density (kW/m$^3$) by efficiency greater than 255. In various embodiments, the system A10 includes a power density (kW/m$^3$) by efficiency less than 400. In other embodiments, the system A10 includes a power density (kW/m$^3$) by efficiency less than 125. In still various embodiments, the system A10 includes a power density (kW/m$^3$) by efficiency between 51 and 400.

In still various embodiments, the engine A100 includes a fourth operational parameter at which one or more of the efficiencies and ratio of mechanical power output from the piston assembly A1010 to maximum cycle volume of the engine working fluid relative to a temperature differential of the engine working fluid at the expansion chamber A221 and the compression chamber A222. In one embodiment, the fourth operational parameter defines the temperature differential of the engine working fluid at the expansion chamber A221 ant he compression chamber A222 of at least 630 degrees Celsius. In yet another embodiment, the hot side heat exchanger C108 is configured to heat the engine working fluid at the heater conduits C110 or expansion chamber A221 to at least 750 degrees Celsius. However, it should be appreciated that an upper limit of the heat provided to the hot side heat exchanger C108 or the expansion chamber A221 is based at least on materials limits, such as one or materials listed or described herein, or another suitable material for constructing the engine and/or system. Material limits may include, but are not limited to, a melting point, tensile stress, yield stress, deformation or deflection limits, or desired life or durability of the engine.

It should be appreciated that performances, power outputs, efficiencies, or temperature differentials at the system A10, the engine A100, or both, provided herein may be based on a "Sea Level Static" or "Standard Day" input air condition such as defined by the United States National Aeronautics and Space Administration, unless otherwise specified. For example, unless otherwise specified, conditions provided to the heater body, the chiller assembly, or both, or any subsystems, components, etc. therein, or any other portions of the system A10 receiving an input fluid, such as air, are based on Standard Day conditions.

The heat transfer relationships described herein may include thermal communication by conduction and/or convection. A heat transfer relationship may include a thermally conductive relationship that provides heat transfer through conduction (e.g., heat diffusion) between solid bodies and/or between a solid body and a fluid. Additionally, or in the alternative, a heat transfer relationship may include a thermally convective relationship that provides heat transfer through convection (e.g., heat transfer by bulk fluid flow) between a fluid and a solid body. It will be appreciated that convection generally includes a combination of a conduction (e.g., heat diffusion) and advection (e.g., heat transfer by bulk fluid flow). As used herein, reference to a thermally conductive relationship may include conduction and/or convection; whereas reference to a thermally convective relationship includes at least some convection.

A thermally conductive relationship may include thermal communication by conduction between a first solid body and a second solid body, between a first fluid and a first solid body, between the first solid body and a second fluid, and/or between the second solid body and a second fluid. For example, such conduction may provide heat transfer from a first fluid to a first solid body and/or from the first solid body to a second fluid. Additionally, or in the alternative, such conduction may provide heat transfer from a first fluid to a first solid body and/or through a first solid body (e.g., from one surface to another) and/or from the first solid body to a second solid body and/or through a second solid body (e.g., from one surface to another) and/or from the second solid body to a second fluid.

A thermally convective relationship may include thermal communication by convection (e.g., heat transfer by bulk fluid flow) between a first fluid and a first solid body, between the first solid body and a second fluid, and/or between a second solid body and a second fluid. For example, such convection may provide heat transfer from a first fluid to a first solid body and/or from the first solid body to a second fluid. Additionally, or in the alternative, such convection may provide heat transfer from a second solid body to a second fluid.

It will be appreciated that the terms "clockwise" and "counter-clockwise" are terms of convenience and are not to be limiting. Generally, the terms "clock-wise" and "counter-clockwise" have their ordinary meaning, and unless otherwise indicated refer to a direction with reference to a top-down or upright view. Clockwise and counter-clockwise elements may be interchanged without departing from the scope of the present disclosure.

Where temperatures, pressures, loads, phases, etc. are said to be substantially similar or uniform, it should be appreciated that it is understood that variations, leakages, or other minor differences in inputs or outputs may exist such that the differences may be considered negligible by one skilled in the art. Additionally, or alternatively, where temperatures or pressures are said to be uniform, i.e., a substantially uniform unit (e.g., a substantially uniform temperature at the plurality of chambers A221), it should be appreciated that in one embodiment, the substantially uniform unit is relative to an average operating condition, such as a phase of operation of the engine, or thermal energy flow from one fluid to another fluid, or from one surface to a fluid, or from one surface to another surface, or from one fluid to another surface, etc. For example, where a substantially uniform temperature is provided or removed to/from the plurality of chambers A221, A222, the temperature is relative to an average temperature over a phase of operation of the engine. As another example, where a substantially uniform thermal energy unit is provided or removed to/from the plurality of chambers A221, A222, the uniform thermal energy unit is relative to an average thermal energy supply from one fluid to another fluid relative to the structure, or plurality of structures, through which thermal energy transferred.

Various interfaces, such as mating surfaces, interfaces, points, flanges, etc. at which one or more monolithic bodies, or portions thereof, attach, couple, connect, or otherwise mate, may define or include seal interfaces, such as, but not limited to, labyrinth seals, grooves into which a seal is placed, crush seals, gaskets, vulcanizing silicone, etc., or other appropriate seal or sealing substance. Additionally, or alternatively, one or more of such interfaces may be coupled together via mechanical fasteners, such as, but not limited to, nuts, bolts, screws, tie rods, clamps, etc. In still additional or alternative embodiments, one or more of such interfaces may be coupled together via a joining or bonding processes, such as, but not limited to, welding, soldering, brazing, etc., or other appropriate joining process.

It should be appreciated that ratios, ranges, minimums, maximums, or limits generally, or combinations thereof, may provide structure with benefits not previously known in the art. As such, values below certain minimums described herein, or values above certain maximums described herein, may alter the function and/or structure of one or more components, features, or elements described herein. For example, ratios of volumes, surface area to volume, power output to volume, etc. below the ranges described herein may be insufficient for desired thermal energy transfer, such as to undesirably limit power output, efficiency, or Beale number. As another example, limits greater than those described herein may undesirably increase the size, dimensions, weight, or overall packaging of the system or engine, such as to undesirably limit the applications, apparatuses, vehicles, usability, utility, etc. in which the system or engine may be applied or operated. Still further, or alternatively, undesired increases in overall packaging may undesirably decrease efficiency of an overall system, application, apparatus, vehicle, etc. into which the engine may be installed, utilized, or otherwise operated. For example, although an engine may be constructed defining a similar or greater efficiency as described herein, such an engine may be of undesirable size, dimension, weight, or overall packaging such as to reduce an efficiency of the system into which the engine is installed. As such, obviation or transgression of one or more limits described herein, such as one or limits relative to features such as, but not limited to, heater conduits, chiller conduits A54, chamber volumes, walled conduit volumes, or operational temperatures, or combinations thereof, may undesirably alter such structures such as to change the function of the system or engine.

Figure 20B:
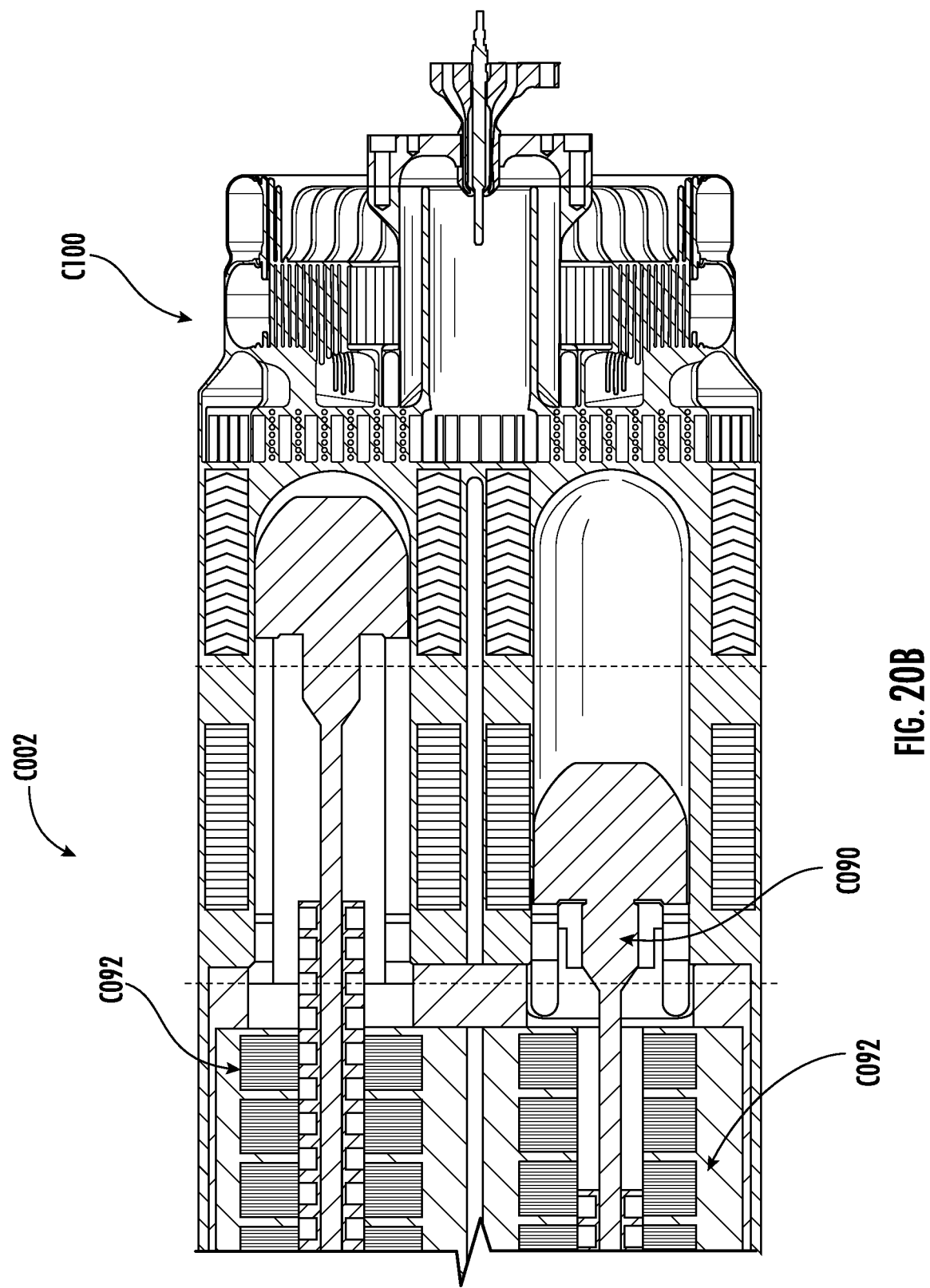

An exemplary engine c002 is shown in FIGS. 20A and 20B. The engine c002 may be a closed cycle engine, such as a regenerative heat engine and/or a Stirling engine; however other engines including other closed-cycle engines and/or regenerative heat engines are also contemplated and the scope of the present disclosure embraces any engine. A closed-cycle engine c002 may include a heater body c100 and an engine body c050. In the embodiment shown, a closed-cycle engine c002 may include an engine body c050 and a heater body c100 disposed on opposite sides of the engine body c050. For example, a first heater body c100 may be disposed at a first side of an engine body c050 and a second heater body c100 may be disposed at a second side of an engine body c050. In still other embodiments, a plurality of engine bodies c050 may be provided and/or a single heater body c100 or a multitude of heater bodies c100 may be provided. The closed-cycle engine c002 may include a piston assembly c090 and a load device c092 operably inserted within an engine body c050 and/or a heater body c100.

The closed-cycle engine c002 may be provided in the form of an engine assembly that includes one or more monolithic bodies or monolithic body-segments as described herein. A monolithic body and/or a monolithic body-segment may be fabricated using an additive manufacturing technology and may be void of any seams, joints, or the like characteristic of separately fabricated components. By way of example, an exemplary closed-cycle engine c002 may be assembled from an engine assembly that includes a first heater body c100 and a first engine body c050. The first heater body may define a first portion of a first monolithic body or a first monolithic body-segment, and the first engine body may define a second portion of the first monolithic body or a second monolithic body-segment operably coupled or operably couplable to the first heater body.

Now turning to e.g., FIGS. 21A and 21B, FIGS. 22A and 22B through FIGS. 24A and 24B, and FIG. 25, exemplary heater bodies c100 will be described. The presently disclosed heater bodies c100 may be used to supply heat to a closed-cycle engine c002 such as a regenerative heat engine and/or a Stirling engine. However, it will be appreciated that the presently disclosed heater bodies c100 may be used as a heating source in a number of other settings, all of which are within the scope of the present disclosure. In some embodiments, at least a portion of the heater body c100 may define at least a portion of a closed-cycle engine c002, such as a monolithic body or a monolithic body-segment of such a closed-cycle engine c002. For example, the monolithic body may be an additively manufactured monolithic body, or the monolithic body-segment may be an additively manufactured monolithic body-segment. However, in addition or as an alternative to additive manufacturing technology, it will be appreciated that the monolithic body or various monolithic body-segments of a closed-cycle engine c002 may be formed using any desired technology, all of which are within the scope of the present disclosure.

As shown, an exemplary heater body c100 may include a combustion chamber c102 and a recirculation pathway c104 configured to recirculate combustion gas through the combustion chamber c102. The recirculation pathway c104 may include a hot-side heat exchanger c106 configured to transfer heat from circulating combustion gas to a heat input source, such as a working-fluid body c108 defining a heat transfer region having a thermally conductive relationship with at least a portion of the hot-side heat exchanger c106. For example, heat from the combustion gas may be transferred to the heat transfer region via an engine-working fluid disposed within a working-fluid pathway c110. The working-fluid pathway c110 may be defined at least in part by the hot-side heat exchanger c106 and/or at least in part by the working-fluid body c108. The hot-side heat exchanger c106 may define a portion of the recirculation pathway c104. The heat transfer region may define a region having a have a thermally conductive relationship with the heating fluid pathway.

The heat transfer region defined by the working-fluid body c108 may include a solid body and/or a fluid pathway defined at least in part by the solid body. In an exemplary embodiment, the hot-side heat exchanger c106 may include a plurality of heating fluid pathways that have a heat transfer relationship with a plurality of heat transfer regions. For example, the plurality of heat transfer regions have a thermally conductive relationship with a corresponding portion of the plurality of heating fluid pathways. Additionally, or in the alternative, the heat transfer regions may have a thermally convective relationship with a heating fluid flowing through the heating fluid pathways. The heat transfer regions may be circumferentially spaced about the longitudinal axis of the heater body c100. Respective ones of the plurality of heat transfer regions may include a solid body and/or a fluid pathway defined at least in part by the solid body.

The working-fluid body c108 may include one or more portions of a closed-cycle engine c002, such as a piston chamber c112 (e.g., a hot piston chamber) and/or a regenerator body c114. A fluid pathway defined the working-fluid body c108 may fluidly communicate with the piston chamber and the regenerator body c114. The engine-working fluid disposed within the working-fluid pathway c110 may be an engine-working fluid, such as an inert gas, which may flow in an alternating fashion between the piston chamber c112 and the regenerator body c114. The hot-side heat exchanger c106 may be provided in the form of a heat exchanger body. The heat exchanger body may define a monolithic body portion of the heater body c100 or a monolithic body-segment operably coupled or operably couplable to a monolithic heater body c100 or to one or more other monolithic body-segments that make up the heater body c100.

The recirculation pathway c104 may additionally include a recirculation eductor c116 configured to utilize intake air flowing through an intake air pathway c118 to entrain and/or accelerate combustion gas and thereby provide a mixture of intake air and recirculating combustion gas to the combustion chamber c102. The recirculation eductor c116 may also include an exhaust pathway c120 configured to discharge a portion of the combustion gas as exhaust gas. The recirculation eductor c116 may fluidly communicate with a downstream portion of the hot-side heat exchanger c106. The recirculation eductor c116 may be provided in the form of an eductor body. The eductor body may define a monolithic body portion of the heater body c100 or a monolithic body-segment operably coupled or operably couplable to a monolithic heater body c100 or to one or more other monolithic body-segments that make up the heater body c100.

In some embodiments, the heater body c100 may include a conditioning conduit c122 fluidly communicating with a downstream portion of the recirculation eductor c116 and an upstream portion of the combustion chamber c102. The conditioning conduct c122 may be configured to guide combustion gas (e.g., a mixture of intake air and recirculating combustion gas) to the combustion chamber c102, and may be configured with a size and shape so as to condition one or more fluid dynamic properties of the combustion gas flowing to the combustion chamber c122. Exemplary fluid dynamics properties that may be conditioned by the conditioning conduit c122 include pressure, pressure gradient, flow velocity, velocity gradient, turbulence, vorticity, curl, and so forth. The conditioning conduit c122 may define a conduit volume selected to provide one or more desired fluid dynamics properties of combustion gas flowing therethrough, and/or to allow for mixing of intake air with recirculating combustion gas. In some embodiments, the conditioning conduit c122 may be configured to swirl combustion gas flowing therethrough. For example, the conditioning conduit c122 may establish or sustain a vortex, which may enhance combustion quality in the combustion chamber c102. Additionally, or in the alternative, combustion gas circulating through the conditioning conduit c122 may cool the combustion chamber c102, with heat from the combustion chamber c102 heating the combustion gas prior to entering the combustion chamber c102.

The combustion chamber c102 and the conditioning conduit c104 may be provided in the form of a combustor body. The combustor body may define a monolithic body portion of the heater body c100 or a monolithic body-segment operably coupled or operably couplable to a monolithic heater body c100 or to one or more other monolithic body-segments that make up the heater body c100.

Figure 21A:
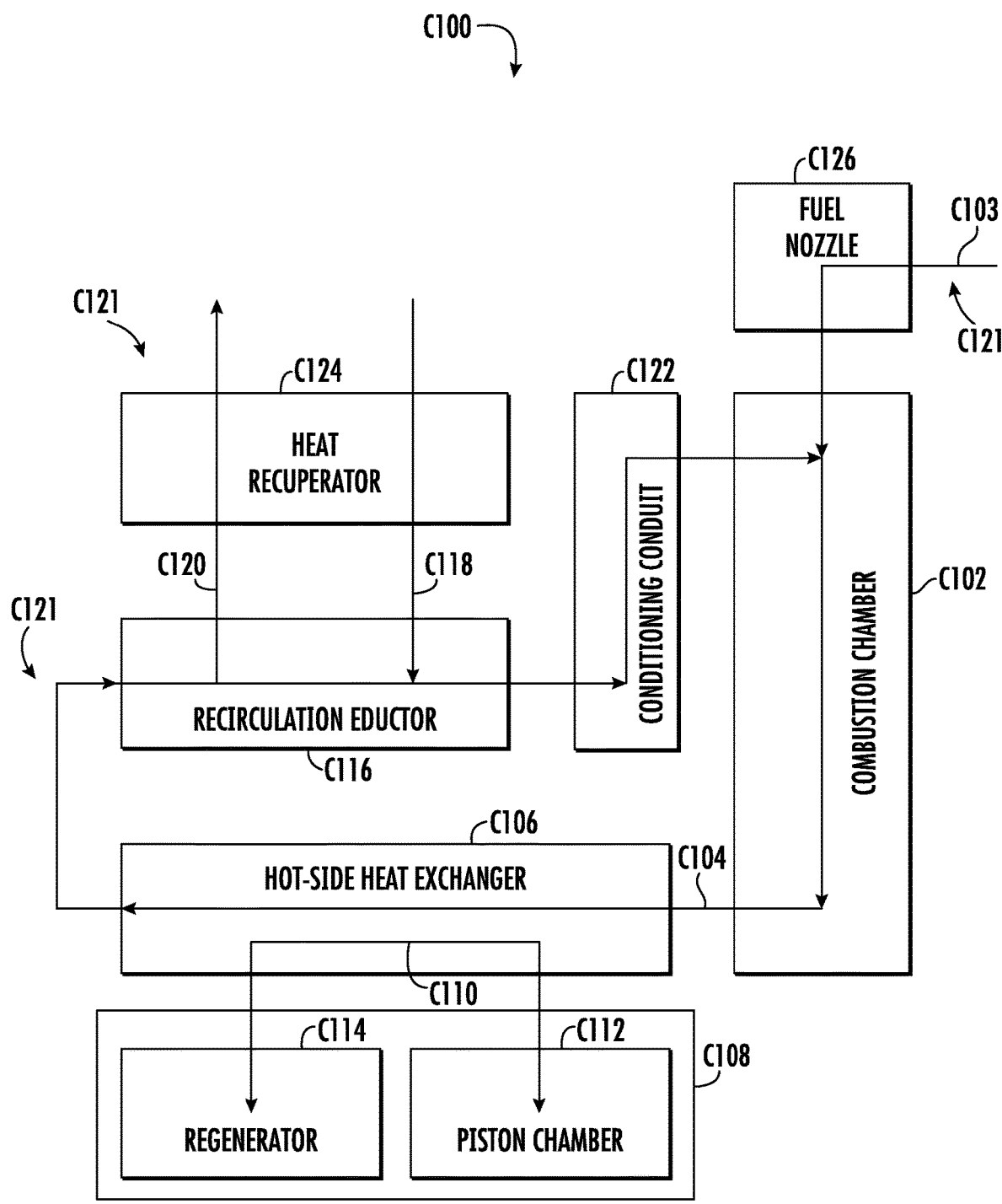
FIGS. 21A and 21B schematically depict an exemplary heater bodies, which, for example, may be included in the closed-cycle engine shown in FIGS. 20A and 20B.
Figure 21B:
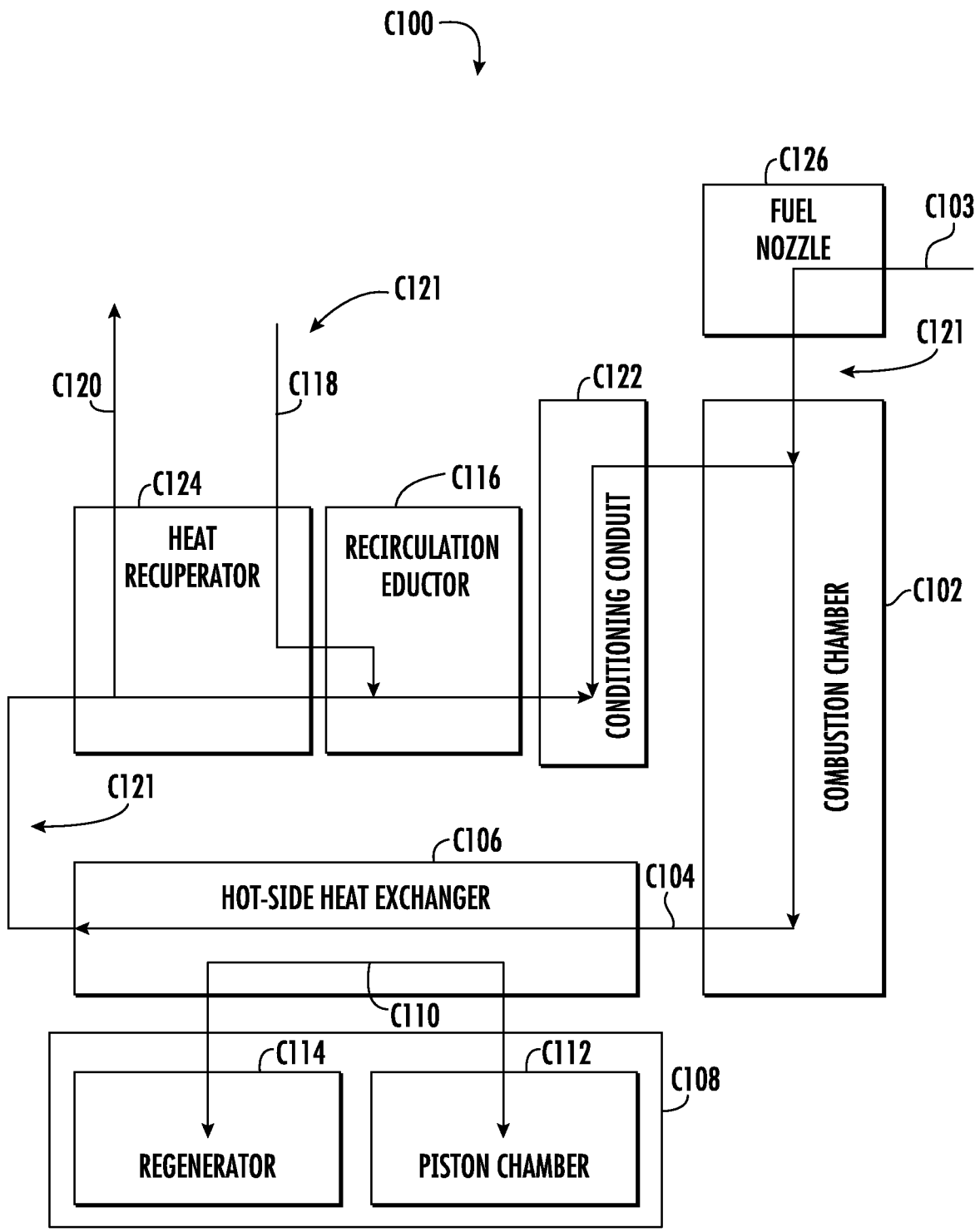

The heater body c100 may additionally include a heat recuperator c124 configured to utilize exhaust gas flowing through the exhaust pathway c120 to preheat intake air flowing through the intake air pathway c118, thereby recuperating heat from the exhaust gas. The terms preheater and recuperator may be used interchangeably; however, in some instances, the term preheater may be used with reference to preheating intake air flowing through the intake air pathway c118, and the term recuperator may be used with reference to recuperating heat from exhaust gas flowing through the exhaust pathway c120. The heat recuperator c124 may be provided in the form of a heat recuperator body. The heat recuperator body may define a monolithic body portion of the heater body c100 or a monolithic body-segment operably coupled or operably couplable to a monolithic heater body c100 or to one or more other monolithic body-segments that make up the heater body c100. As shown in FIG. 21A, the heat recuperator c124 may be located downstream from the recirculation eductor c116 relative to the exhaust gas pathway c120 and upstream from the recirculation eductor c116 relative to the intake air pathway c118. The heat recuperator located as shown in FIG. 21A may exchange heat between exhaust gas flowing through the exhaust gas pathway c120 and intake air flowing through the intake air pathway c118. In another embodiment, as shown in FIG. 21B, the heat recuperator c124 may define a portion of the recirculation pathway c104. For example, the heat recuperator c124 may be located upstream from the recirculation eductor c116 relative to the recirculation pathway c120, while also being located upstream from the recirculation eductor c116 relative to the intake air pathway c118. The heat recuperator located as shown in FIG. 21B may exchange heat between exhaust gas flowing through the exhaust gas pathway c120 and intake air flowing through the intake air pathway c118, and/or between combustion gas flowing through the recirculating pathway c104 and intake air flowing through the intake air pathway c118.

One or more fuel nozzles c126 may be operably coupled to the heater body c100. Fuel may be supplied to the combustion chamber c102 by one or more fuel lines c103. For example, the one or more fuel nozzles c126 may be operably coupled to the combustion chamber c102. Fuel injected into the combustion chamber c102 may combine with circulating combustion gas to provide a suitable air-to-fuel ratio. The fuel and at least a portion of the circulating combustion gas may be combusted in the combustion chamber so as to generate hot combustion gas. The combustion chamber c102 may fluidly communicate with an upstream portion of the hot-side heat exchanger c106, thereby suppling the hot combustion gas to the hot-side heat exchanger c106 for heating the working-fluid body c108. One or more intake air pathways c118, one or more exhaust gas pathways c120, one or more recirculation pathways c104, and one or more fuel lines c103 may collectively define a primary flowpath c121.

Figure 22A:
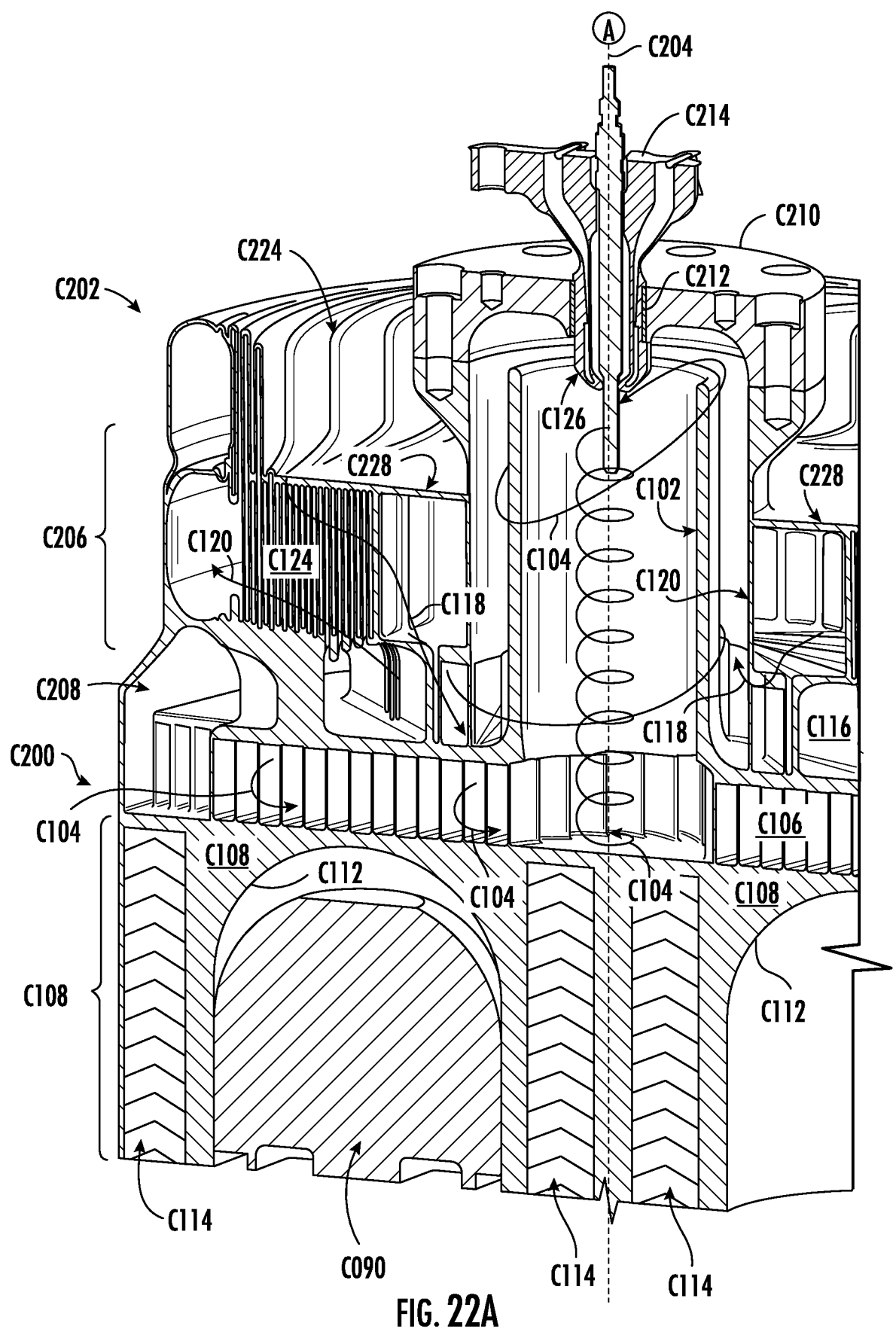
FIGS. 22A and 22B, 23A and 23B, and 24A and 24B schematically depict a cross-sectional perspective view of an exemplary heater body, which, for example, may be included in the closed-cycle engine shown in FIGS. 20A and 20B.
Figure 22B:
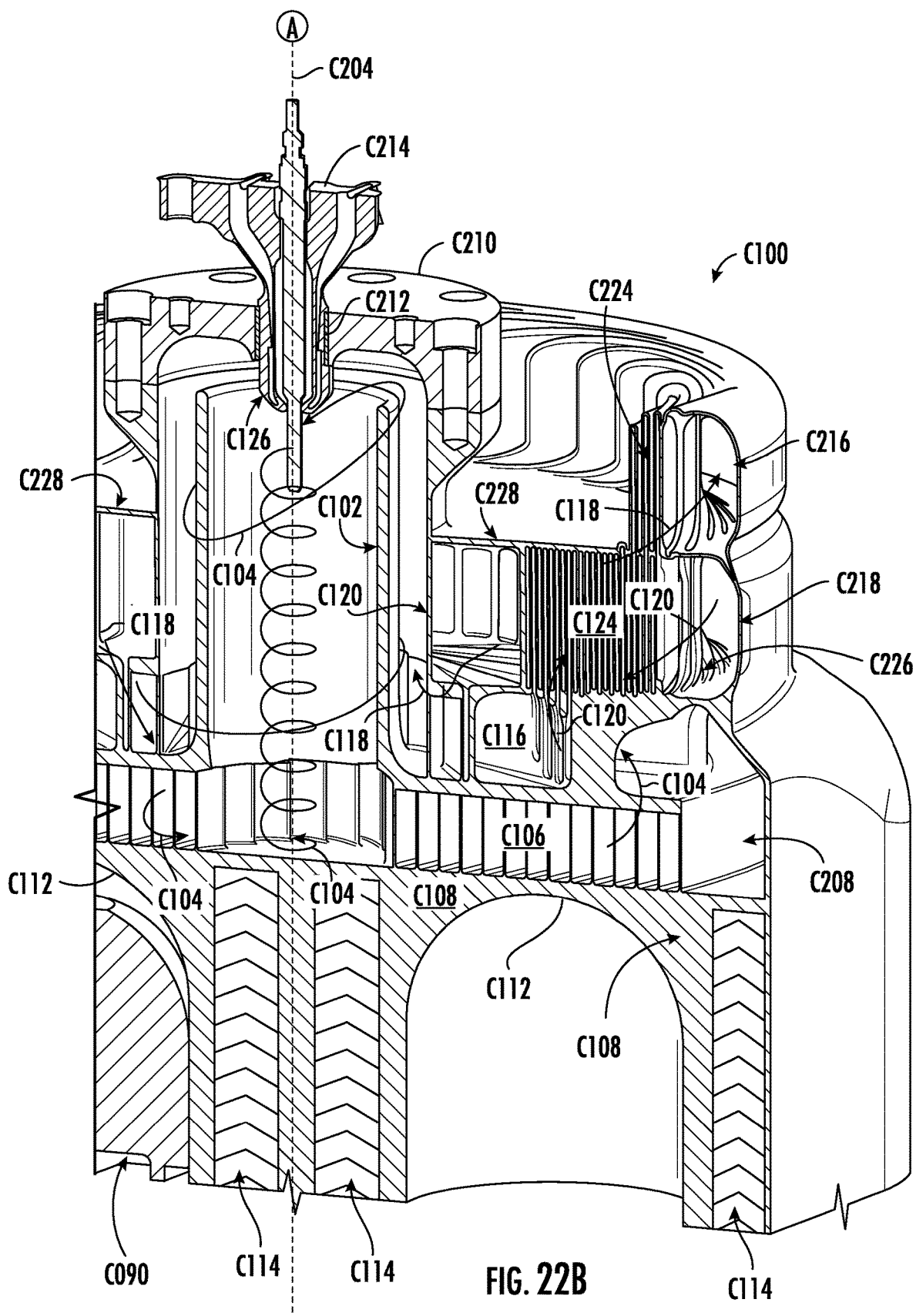
Figure 23A:
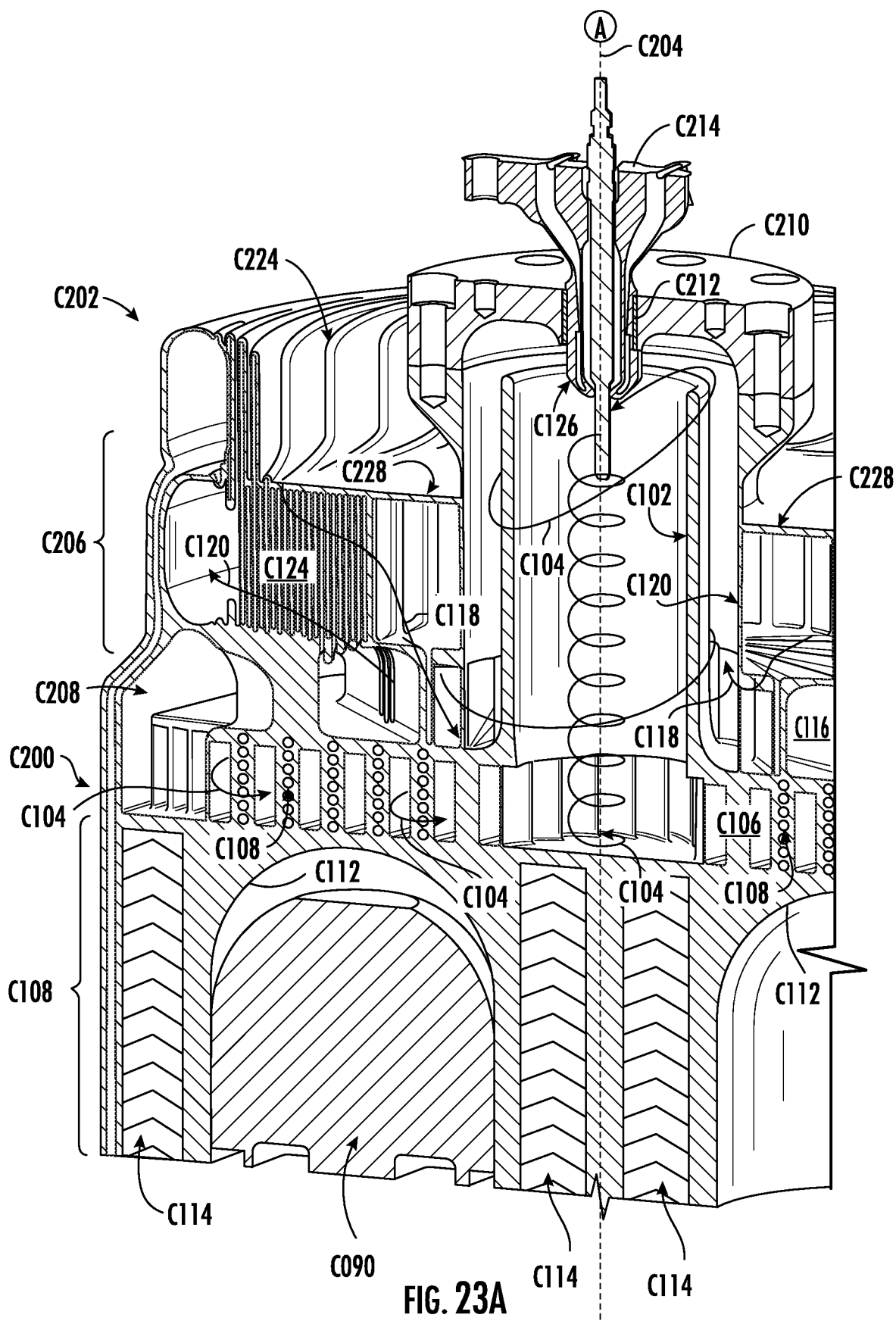
Figure 23B:
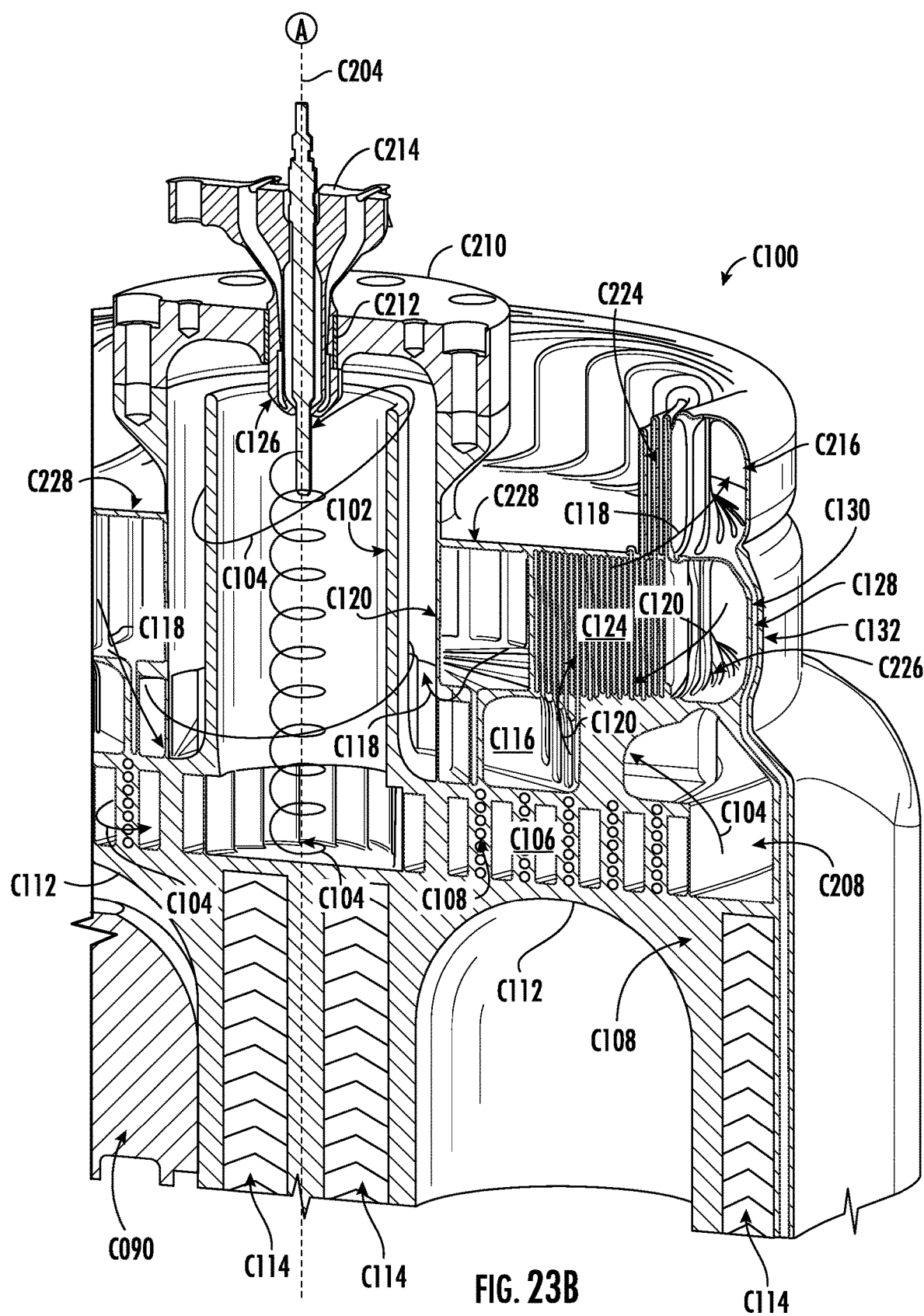
Figure 24A:
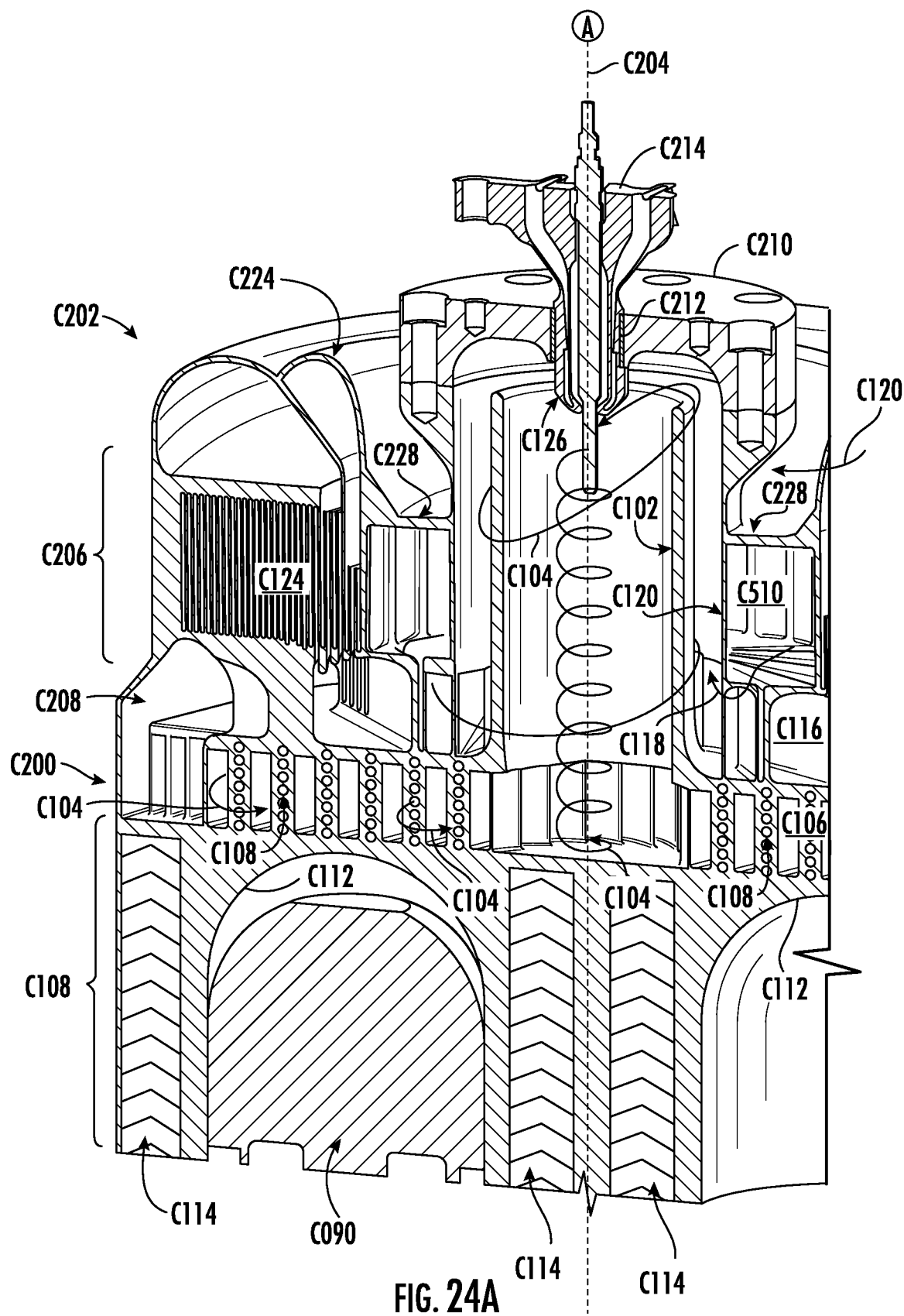
Figure 24B:
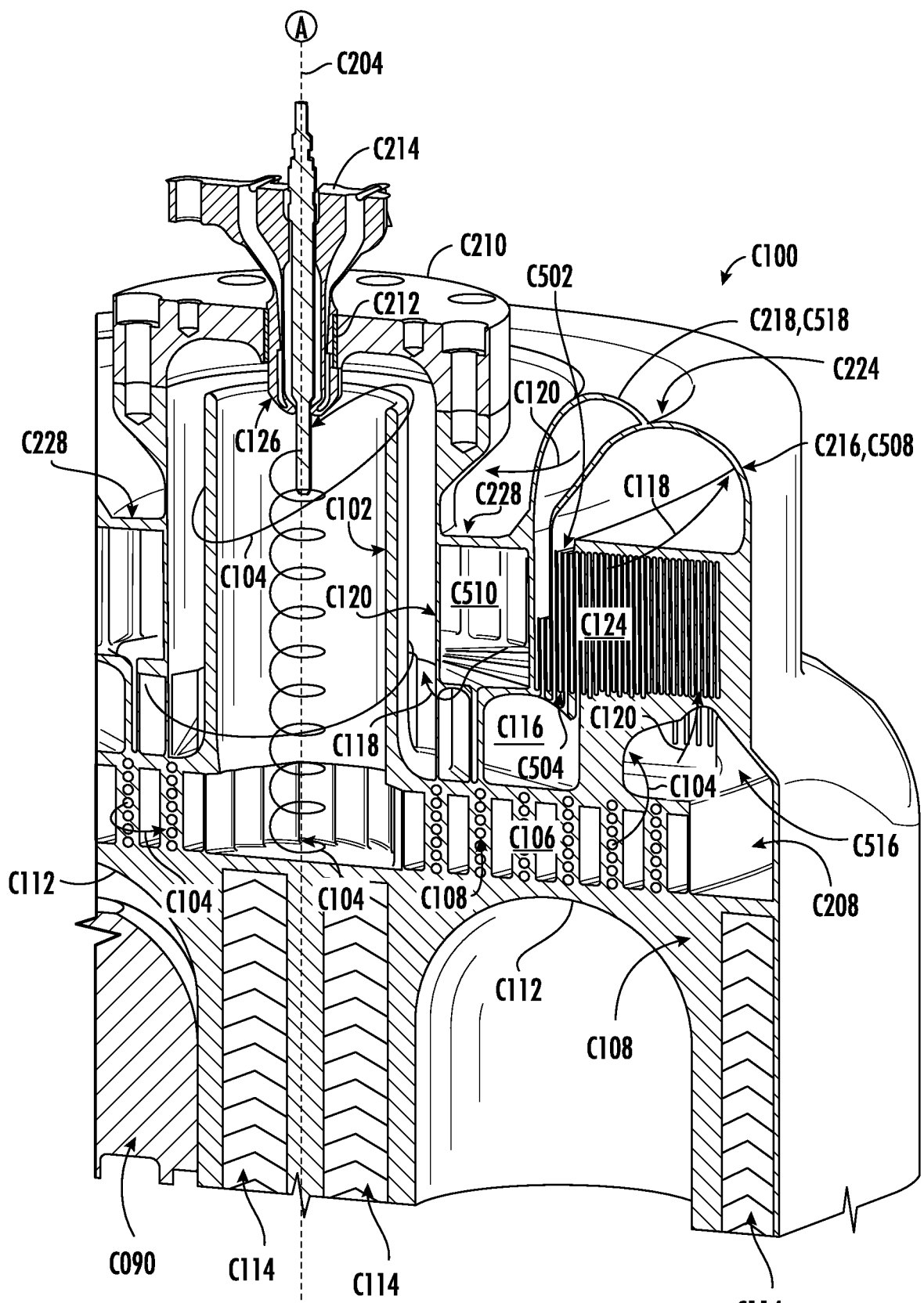
Figure 25:
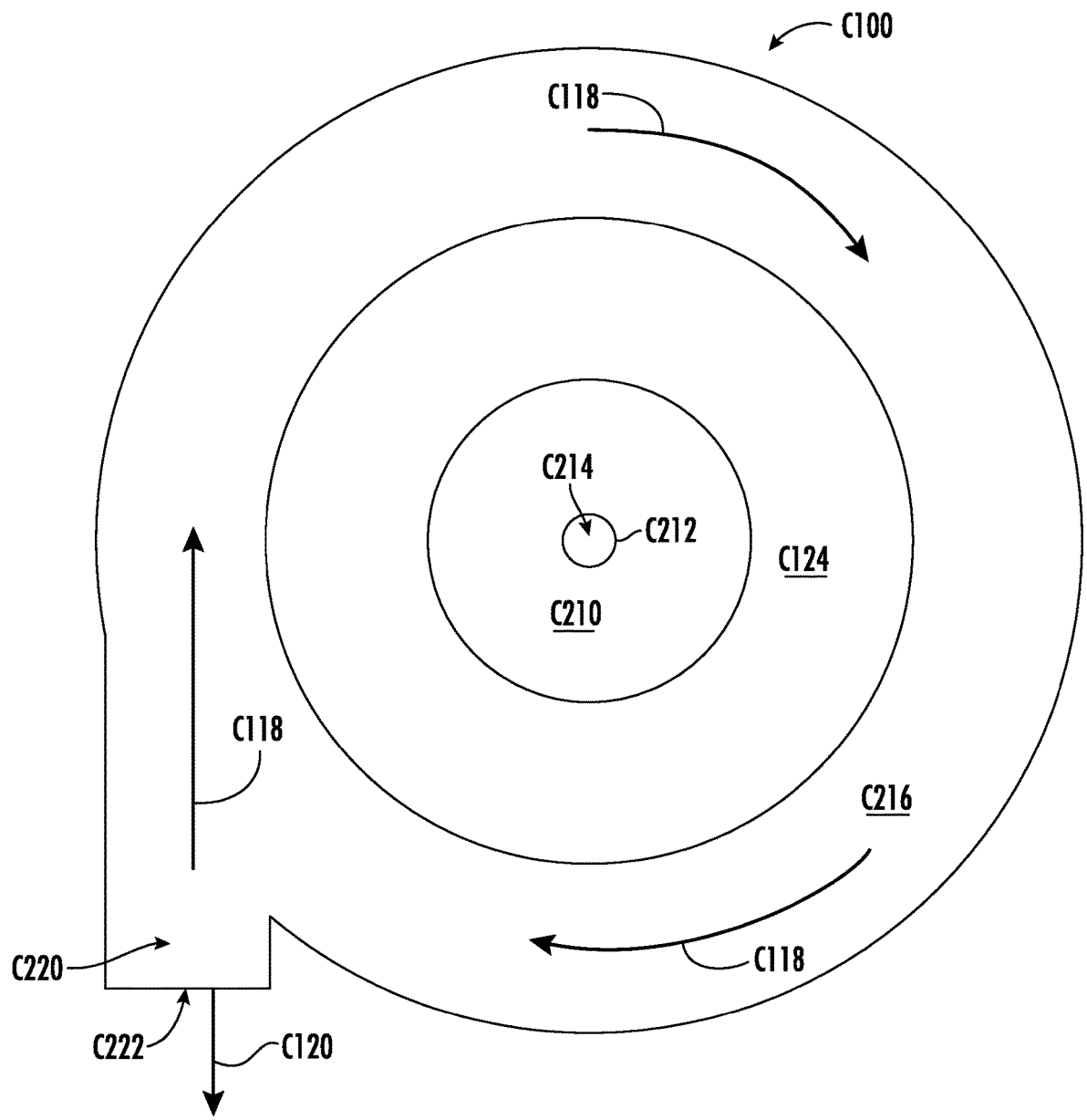
FIG. 25 schematically depicts a top view of an exemplary heater body, which, for example, may be included in the closed-cycle engine shown in FIGS. 20A and 20B.

FIGS. 22A and 22B, 23A and 23B, and FIGS. 24A and 24B schematically depict cross-sectional perspective views of an exemplary heater bodies c100, while FIG. 25 schematically depicts a top view of the exemplary heater body c100 shown in FIGS. 22A and 22B. As shown, an exemplary heater body c100 may have an annular configuration, however, other configurations are also contemplated. The heater body c100 may include a plurality of monolithic body portions that together may define a monolithic heater body c100. Alternatively, or in addition, the heater body c106 may include one or more monolithic body-segments operably coupled or operably couplable to a monolithic heater body c100. Further, a plurality of monolithic body-segments may be operably coupled or operably couplable to one another to define at least a portion of a heater body c100. In an exemplary embodiment, a heater body c100 may define a single monolithic body. In other embodiments, a plurality of monolithic body-segments may be operably coupled to one another, such as via welding, fusing, or the like, so as to provide an integrally formed heater body c100.

A heater body c100 and/or various featured thereof may include a proximal portion c200 and a distal portion c202 oriented relative to a longitudinal axis c204, with a medial portion c206 disposed between the proximal portion c200 and the distal portion c202. The proximal portion c200 of the heater body c100 or a feature thereof refers to a portion, relative to a longitudinal axis c204, adjacent or relatively proximate to a working-fluid body c108 such as one or more pistons of a closed-cycle engine c002. The distal portion c202 of the heater body c100 or a feature thereof refers to a portion, relative to the longitudinal axis c204, opposite from or relatively remote to the working-fluid body c108. A proximal, distal, or medial portion c200, c202, c206 need not refer to a finite point on the heater body c100 or a feature thereof; rather, it will be appreciated that the terms proximal, distal, and medial c200, c202, c206 may be used generally, such as to denote the location of a portion of the heater body c100 or a feature thereof relative to the working-fluid body c108 and/or to denote the location of various features of the heater body c100 relative to one another.

Referring still to FIGS. 22A and 22B, 23A and 23B, and FIGS. 24A and 24B, a heater body c100 may include a combustion chamber c102 and a hot-side heat exchanger c106 circumferentially surrounding at least a portion of the combustion chamber c102. In some embodiments, a recirculation pathway c104 may circumferentially surround at least a portion of the combustion chamber c102. A heater body c100 may additionally or alternatively include a conditioning conduit c122 circumferentially surrounding at least a portion of the combustion chamber c102. For example, as shown, the hot-side heat exchanger c106 may circumferentially surround a proximal portion c200 of the combustion chamber c102 and the conditioning conduit c122 may circumferentially surround a medial portion c206 and/or a distal portion c202 of the combustion chamber c102. In some embodiments, the hot-side heat exchanger c106 may additionally circumferentially surround at least some of a medial portion c206 of the combustion chamber c102. In some embodiments, it may be advantageous for the combustion chamber c102 to be aligned with the longitudinal axis c204 and/or for a plurality of combustion chambers c102 to be circumferentially spaced (e.g., evenly distributed) about the longitudinal axis c204. For example, such alignment and/or even distribution may encourage relatively even heat distribution within the heater body c100 and/or the hot-side heat exchanger c106. Such relatively even heat distribution may, in turn, encourage relatively even heat transfer from the hot-side heat exchanger c106 (e.g., from a heating fluid flowing therethrough) to the plurality of heat transfer regions.

The heater body c100 may further include a recirculation eductor c116 circumferentially surrounding the combustion chamber c102. When the heater body c100 includes a conditioning conduit c122, the recirculation eductor c116 may be disposed radially or concentrically outward from the conditioning conduit c122, for example, such that the recirculation eductor c116 circumferentially surrounds at least a portion of the conditioning conduit c122. For example, the recirculation eductor c116 may circumferentially surround a distal portion c202 and/or a medial portion (e.g., a distally-medial portion) of the combustion chamber c102. Additionally, when the heater body c100 includes a conditioning conduit c122, the recirculation eductor c116 may circumferentially surround a distal portion c202 and/or a medial portion (e.g., a distally-medial portion) of the conditioning conduit c122. The recirculation eductor c116 may be disposed axially adjacent to the hot-side heat exchanger c106, such as adjacent to a distal portion c202 of the hot-side heat exchanger c106 relative to the longitudinal axis c204.

In some embodiments, a heater body c100 may include a heat recuperator c124 circumferentially surrounding the combustion chamber c102. When the heater body c100 includes a conditioning conduit c122, the heat recuperator c124 may be disposed radially or concentrically outward from the conditioning conduit c122, for example, such that the heat recuperator c124 circumferentially surrounds at least a portion of the conditioning conduit c122. For example, the heat recuperator c124 may circumferentially surround a distal portion c202 and/or a medial portion (e.g., a distally-medial portion) of the combustion chamber c102. Additionally, when the heater body c100 includes a conditioning conduit c122, the heat recuperator c124 may circumferentially surround a distal portion c202 and/or a medial portion (e.g., a distally-medial portion) of the conditioning conduit c122. The heat recuperator c124 may be disposed axially adjacent to the recirculation eductor c116, such as adjacent to a distal portion c202 of the recirculation eductor c116 relative to the longitudinal axis c204.

In some embodiments, as shown for example in FIGS. 23A and 23B, a heater body c100 may include a heat shield c127. The heat shield c127 may be configured to insulate and/or shield one or more portions of the heater body c100 from a heat source within the heater body c100. For example, the heat source may include a combustion flame and/or combustion gas circulating through the recirculation pathway c104, and/or portions of the heater body c100 that become heated by the combustion flame and/or combustion gas. Additionally, or in the alternative, the heat shield c127 may provide a heat sink to absorb and/or dissipate heat, such as heat from a combustion flame and/or combustion gas circulating through the recirculation pathway c104. In some embodiments, the heat shield c127 may include a cooling jacket c128 defined by an inner wall c130 and an outer wall c132. The cooling jacket c128 may fluidly communicate with the intake air annulus c216, such that intake air may flow therethrough. Additionally, or in the alternative, the cooling jacket c128 may define a space with a vacuum or near vacuum. The cooling jacket c128 may define one or more pathways, such as an annular pathway or a plurality of semi-annular pathways. The cooling jacket may cool hot portions of the heater body c100, for example to maintain suitable operating temperatures and/or to shield users or surrounding equipment from hot portions of the heater body c100.

A heater body c100 may define a single monolithic body providing a recirculation pathway c104, an intake air pathway c118, and/or an exhaust pathway c120. For example, a plurality of monolithic body portions may together define a single monolithic body. Alternatively, a heater body c100 may include separate monolithic body-segments respectively defining a recirculation pathway c104, an intake air pathway c118, and/or an exhaust pathway c120. In some embodiments, a first monolithic body-segment may define a recirculation pathway c104, a second monolithic body-segment may define an intake air pathway c118, and a third monolithic body-segment may define an exhaust pathway c120. Such monolithic body-segments may be coupled to one another, such as via welding, fusing, or the like, so as to provide an integrally formed heater body c100.

A monolithic body defining a recirculation pathway c104 may include a combustion chamber c102 and a hot-side heat exchanger c106 fluidly communicating with a proximal portion c200 of the combustion chamber c102. Such a monolithic recirculation pathway c104 may additionally include a recirculation eductor c116 fluidly communicating with a radially or concentrically outward portion of the hot-side heat exchanger c106 and a conditioning conduit c122 having a proximal portion c200 fluidly communicating with a radially or concentrically inward portion of the recirculation eductor c116 and a distal portion c202 fluidly communicating with a distal portion c202 of the combustion chamber c102.

In some embodiments, a heater body c100 may include a recirculation annulus c208. The recirculation annulus c208 may be disposed radially or concentrically outward from at least a portion of the hot-side heat exchanger c106 and/or at least a portion of the recirculation eductor c116. Additionally, or in the alternative, the recirculation annulus c208 may circumferentially surround at least a portion of the hot-side heat exchanger c106 and/or at least a portion of the recirculation eductor c116. The recirculation annulus c208 may fluidly communicate with a radially or concentrically outward portion of the hot-side heat exchanger c106 and a radially or concentrically outward portion of the recirculation eductor c116 so as to define a pathway to direct at least a portion of the combustion gas discharging from the hot-side heat exchanger c106 into the recirculation annulus c208.

In some embodiments, a heater body c100 may include fuel injector body c401. The fuel injector body c401 may include a combustor cap c210 providing fluid communication between a distal portion c202 of the conditioning conduit c122 and a distal portion c202 of the combustion chamber c102. The fuel injector body c401 may additionally or alternatively include one or more fuel nozzles c214. The fuel injector body c401 and/or the combustor cap c210 and/or one or more fuel nozzles c214 may be a separate component operably coupled or operably couplable to the heater body c110, such as at a distal portion c202 of the conditioning conduit c122 as shown. Additionally, or in the alternative, the fuel injector body c401 and/or the combustor cap c210 and/or one or more fuel nozzles c214 may be a portion of a monolithic body defining at least a portion of the heater body c100.

In some embodiments, one or more fuel nozzles c214 may be operably coupled to the combustor cap c210. For example, the combustor cap c210 may include one or more nozzle ports c212 respectively configured to receive a fuel nozzle c214. One or more fuel nozzles c214 may be operably coupled to corresponding nozzle ports c212 such as by mating threads or the like. The one or more fuel nozzles c214 may include a glow plug c215 operable to ignite fuel and/or combustion gas in the combustion chamber c102. As shown, the fuel nozzle may be aligned with the longitudinal axis c204 of the heater body c100 and may be concentric with the combustion chamber c102. Additionally, or in the alternative, one or more fuel nozzles c214 may be circumferentially spaced about the distal portion c202 of the combustion chamber. In some embodiments, it may be advantageous for a fuel nozzle c214 to be aligned with the longitudinal axis c204 and/or for a plurality of fuel nozzles c214 to be circumferentially spaced (e.g., evenly distributed) about the longitudinal axis c204. For example, such alignment and/or even distribution may encourage flame stability within the combustion chamber c102 and/or relatively even heat distribution within the combustion chamber c102 and/or the hot-side heat exchanger c106.

A monolithic body defining an intake air pathway c118 may include an intake air body, such as an intake air annulus c216 and/or a monolithic body defining an exhaust pathway c120 may include an exhaust body, such as an exhaust annulus c218. The intake air annulus c216 and the exhaust annulus c218 may define portions of a single monolithic body or may be separate monolithic body-segments operably coupled or operably couplable to one another. The intake air annulus c216 and/or the exhaust annulus c218 may circumferentially surround at least a portion of the combustion chamber c102. As shown, the intake air annulus c216 may include one or more intake ports c220 and the exhaust annulus c218 may include one or more exhaust ports c222. As shown in FIGS. 22A and 22B and FIGS. 23A and 23B, the intake air annulus c216 and the exhaust annulus c218 may be disposed axially adjacent to one another. For example, the intake air annulus c216 may be adjacent to a distal portion c202 of the exhaust annulus c218 and/or the exhaust annulus c218 may be adjacent to a proximal portion of the intake air annulus c216 relative to the longitudinal axis c204. As shown in FIGS. 24A and 24B, the intake air annulus c216 and the exhaust annulus c218 may be disposed co-annularly relative to one another. For example, the intake air annulus c216 may be disposed radially or concentrically inward from the exhaust annulus c218, with the exhaust annulus c218 circumferentially surrounding the intake air annulus c216. Alternatively, the exhaust annulus c218 may be disposed radially or concentrically inward from the intake air annulus c216, with the intake air annulus c216 circumferentially surrounding the exhaust annulus c218.

The intake air annulus c216 may include a plurality of intake vanes c224 circumferentially spaced about the intake air annulus c216. The intake vanes c224 may define at least a portion of a pathway configured to direct intake air from the intake air annulus c216 to the recirculation pathway c104. The exhaust annulus c218 may include a plurality of exhaust vanes c226 circumferentially spaced about the exhaust annulus c218. The exhaust vanes c226 may define at least a portion of a pathway configured to direct exhaust gas into the exhaust pathway c218.

In some embodiments, the intake air annulus c216 and the exhaust annulus c218 may fluidly communicate with a heat recuperator c124. More particularly, a preheater portion of the heat recuperator c124 may define at least a portion of an intake air pathway c118 and a recuperator portion of the heat recuperator c124 may define at least a portion of an exhaust pathway c120. The heat recuperator c124 may be part of a monolithic body defining the intake air pathway c118 and/or the exhaust pathway c120. The exhaust annulus c218 and/or the intake air annulus c216 may circumferentially surround at least a portion of the heat recuperator c124. As shown in FIG. 21A, the exhaust annulus c218 may circumferentially surround the heat recuperator c124, and the intake air annulus c216 may be axially adjacent to the exhaust annulus c218, with the intake vanes c224 being axially adjacent to at least a portion of the heat recuperator c124. For example, the intake vanes c224 may be adjacent to a distal portion c202 of the heat recuperator c124.

The heat recuperator c124 may include a preheater portion and a recuperator body portion having a thermally conductive relationship with one another. The preheater portion may fluidly communicate with the intake air annulus c216 and the recirculation eductor c116 so as to define at least a portion of the intake air pathway c118. The recuperator body portion may fluidly communicate with the recirculation eductor c116 and the exhaust annulus c218 so as to define at least a portion of the exhaust pathway c120. In an exemplary embodiment, the exhaust pathway c120 from the recirculation eductor c116 may be upstream from the intake air pathway c118 to the recirculation eductor c116 so as to avoid intake air from the intake air pathway c118 flowing directly into the exhaust pathway c120 before combining with the recirculation pathway c104.

In some embodiments, a heater body c100 may include a motive annulus c228 providing fluid communication from the preheater portion of the recuperator c124 to the recirculation eductor c116. The heat recuperator c124 may circumferentially surround the motive annulus c228, and the motive annulus may circumferentially surround at least a portion of the combustion chamber c102. When the heater body c100 includes a conditioning conduit c122, the motive annulus c228 may be disposed radially or concentrically outward from the conditioning conduit c122, for example, such that the motive annulus c228 circumferentially surrounds at least a portion of the conditioning conduit c122. For example, the motive annulus c228 may circumferentially surround a medial portion of the combustion chamber c102 and/or a medial portion of the conditioning conduit c122. The motive annulus c228 may be disposed axially adjacent to the recirculation eductor c116, such as adjacent to a distal portion of the recirculation eductor c116 relative to the axial axis c204.

In exemplary embodiments, the recirculation pathway c104, the intake air pathway c118 and/or the exhaust pathway c120 may follow a generally spiral orientation. As shown in FIG. 21A, the recirculation pathway c104 and the intake air pathway c118 may spiral counterclockwise, and the exhaust pathway c120 may spiral clockwise. Alternative, the recirculation pathway c104 and the intake air pathway c118 may spiral clockwise, and the exhaust pathway c120 may spiral counterclockwise. Such flows through the heater body c100 may transition from counterclockwise flow to clockwise flow (or from clockwise flow to counterclockwise flow) at the exhaust pathway c120, where exhaust gas separates from combustion gas at the recirculation eductor c116. In this way, pressure loss from a change in flow direction may be minimized. Additionally, a pressure drop associated with a change in direction at the exhaust pathway c120 may at least partially favor recirculation of combustion gas through the recirculation eductor c116.

During operation, intake air is directed into the intake air annulus c216. In some embodiments, the intake air may be pressurized, such as via a compressor (not shown), to induce a flow of intake air into the intake air pathway c118. The intake air circulates counterclockwise through the intake air annulus c216, where a plurality of intake vanes c224 circumferentially spaced about the intake air annulus c216 direct the intake air in a radially or concentrically inward and axially proximal spiral having a counterclockwise orientation. The intake air flowing through the intake vanes c224 continues a radially or concentrically inward spiral flow through the heat recuperator c124 and into the motive annulus c228. The intake air in the motive annulus c228 enters the recirculation eductor c116 through a plurality of eductor slots configured to accelerate the intake air spirally into the conditioning conduit c122. The intake air passing through the eductor slots accelerates and entrains combustion gas flowing into the recirculation eductor c116 from the recirculation annulus c208. The intake air and the combustion gas mix to provide fresh combustion gas while flowing helically through the conditioning conduit c122 in an axially distal direction. The fresh combustion gas reaches the combustion cap c210, which directs the flow of fresh combustion gas into the combustion chamber while a fuel nozzle c214 introduces a flow of fuel, which may include a liquid, gaseous fuel.

In the combustion chamber c102, fuel combines with the fresh combustion gas and is ignited, for example, by a glow plug or a spark plug. The combustion chamber c102 provides a vortex combustion pattern with a counterclockwise flow. Centripetal force of the vortex combustion pattern draw the combustion flame radially or concentrically inward while propelling unburnt combustion gas radially or concentrically outward. The combustion gas continues with a spiral counterclockwise flow out of the combustion chamber c102 and into the hot-side heat exchanger c106. The combustion gas flows in a radially or concentrically outward counterclockwise spiral through the hot-side heat exchanger c106 and into the recirculation annulus c208.

The recirculation annulus c208 directs the combustion gas in an axially distal and radially or concentrically inward direction into the recirculation eductor c116, where a portion of the combustion gas is accelerated and entrained by intake air flowing through the eductor slots of the recirculation eductor c116. The remainder of the combustion gas flows in an axially distal direction through exhaust slots in the recirculation eductor c116. The exhaust slots in the recirculation eductor c116 reverse the direction of the exhaust gas flow, directing the exhaust gas in an axially distal and clockwise spiral direction into the recuperator body portion of the heat recuperator c124. The exhaust gas flow in a clockwise spiral into the exhaust annulus c218, where the exhaust gas discharges from the heater body c100 through one or more exhaust ports c222.

Referring still to e.g., FIGS. 21A and 21B, and FIGS. 22A and 22B through FIGS. 24A and 24B, an exemplary heater body c100 may include a combustion chamber c102 and a recirculation pathway c104 configured to recirculate combustion gas through the combustion chamber c102. The heater body c100 includes an intake air pathway c118 and an exhaust pathway c120 may fluidly communicate with the recirculation pathway c104. The recirculation pathway c104 may include a hot-side heat exchanger c106 and a recirculation eductor c116. However, in some embodiments, the recirculation eductor c116 may be omitted and the combustion chamber c102 may fluidly communicate with the intake air pathway c118 and the exhaust pathway c120 with combustion gas discharging from the heater body without recirculating. The exhaust pathway c120 may fluidly communicate with the recirculation pathway c104 upstream from the intake air pathway c118.

As shown in FIG. 21A and FIGS. 22A and 22B, the hot-side heat exchanger c106 may fluidly communicate with a proximal portion of the combustion chamber c102, and the recirculation eductor c116 may fluidly communicate with a downstream portion of the hot-side heat exchanger c106 and a distal portion c202 of the combustion chamber c102. The recirculation eductor c116 may be configured to entrain and/or accelerate combustion gas circulating through the recirculation pathway c104 using intake air, for example, from an intake air pathway c118 may fluidly communicate with the recirculation pathway c104.

In some embodiments, the recirculation eductor c116 may define at least a portion of the exhaust pathway c120. For example, the exhaust pathway c120 may fluidly communicate with the recirculation pathway c104 at the recirculation eductor c116, such that the exhaust pathway c120 discharges a portion of the combustion gas from the recirculation eductor c116 as exhaust gas. In another embodiment, as shown for example in FIG. 21B, the exhaust pathway c120 may discharge exhaust gas upstream from the recirculation eductor c116.

When the heater body c100 includes a recirculation pathway c104, the proportion of combustion gas may be recirculated may vary depending on the operating conditions of the heater body c100. The proportion of combustion gas may be recirculated to the proportion of fresh intake air may be utilized may be described by a recirculation ratio R, according to the following equation (1): $R=I/C$, where I is the flow rate if intake air flowing into the heater body c100 and T is C the flow rate of combustion gas flowing to the combustion chamber. The recirculation ratio may vary from 0% to 100% depending, for example, on the operating conditions of the heater body c100. For example, a greater proportion of intake air may be utilized during startup, with recirculation ratio increasing as the heater body c100 transitions from startup conditions to steady-state conditions. Additionally, the recirculation ratio may depend on desired combustion conditions, such as equivalence ratio. In some embodiments, the recirculation ratio may be from 0% to 90%, such as from 10% to 90%, such as from 0% to 60%, such as from about 30% to about 70%, such as from 40% to 60%. During startup conditions, the recirculation ratio may be from 0% to 50%, such as from 0% to 30% or from 0% to 10%. During steady-state conditions, the recirculation ratio may be from 10% to 90%, such as from 10% to 60%, or from 30% to 60%. The remainder of combustion gas may be discharged from the recirculation pathway c104 as exhaust gas.

In some embodiments, the exemplary heater body c100 may include a heat recuperator c124 defining at least a portion of an exhaust pathway c120 and at least a portion of an intake air pathway c118. The heat recuperator c124 may be located upstream from a recirculation eductor c116 as shown in FIG. 21A, or the heat recuperator c124 may be located upstream from a recirculation eductor c116 as shown in FIG. 21B. As shown in FIG. 21A, the heat recuperator c124 may utilize exhaust gas flowing through the exhaust pathway c120 to preheat intake air flowing through the intake air pathway c118, the exhaust pathway c120 having a thermally conductive relationship with the intake air pathway c118. The heat recuperator c124 may fluidly communicate with the recirculation pathway c104 indirectly, such as at the recirculation eductor c116 through the exhaust pathway c120 and the intake air pathway c118. Alternatively, the heat recuperator c124 may fluidly communicate with the recirculation pathway c104 directly, as shown in FIG. 21A, such that the heat recuperator c124 may heat the intake using combustion gas recirculating through the recirculation pathway c104 to air, or a combination of exhaust gas and combustion gas. Regardless of whether the heat recuperator c124 utilizes exhaust gas and/or recirculating combustion gas to heat the intake air, the exhaust pathway c120 may be located upstream from the intake air pathway c118, such that exhaust gas may be removed from the recirculation pathway c104 prior to intake air being introduced to the recirculation pathway c104.

Figure 26:
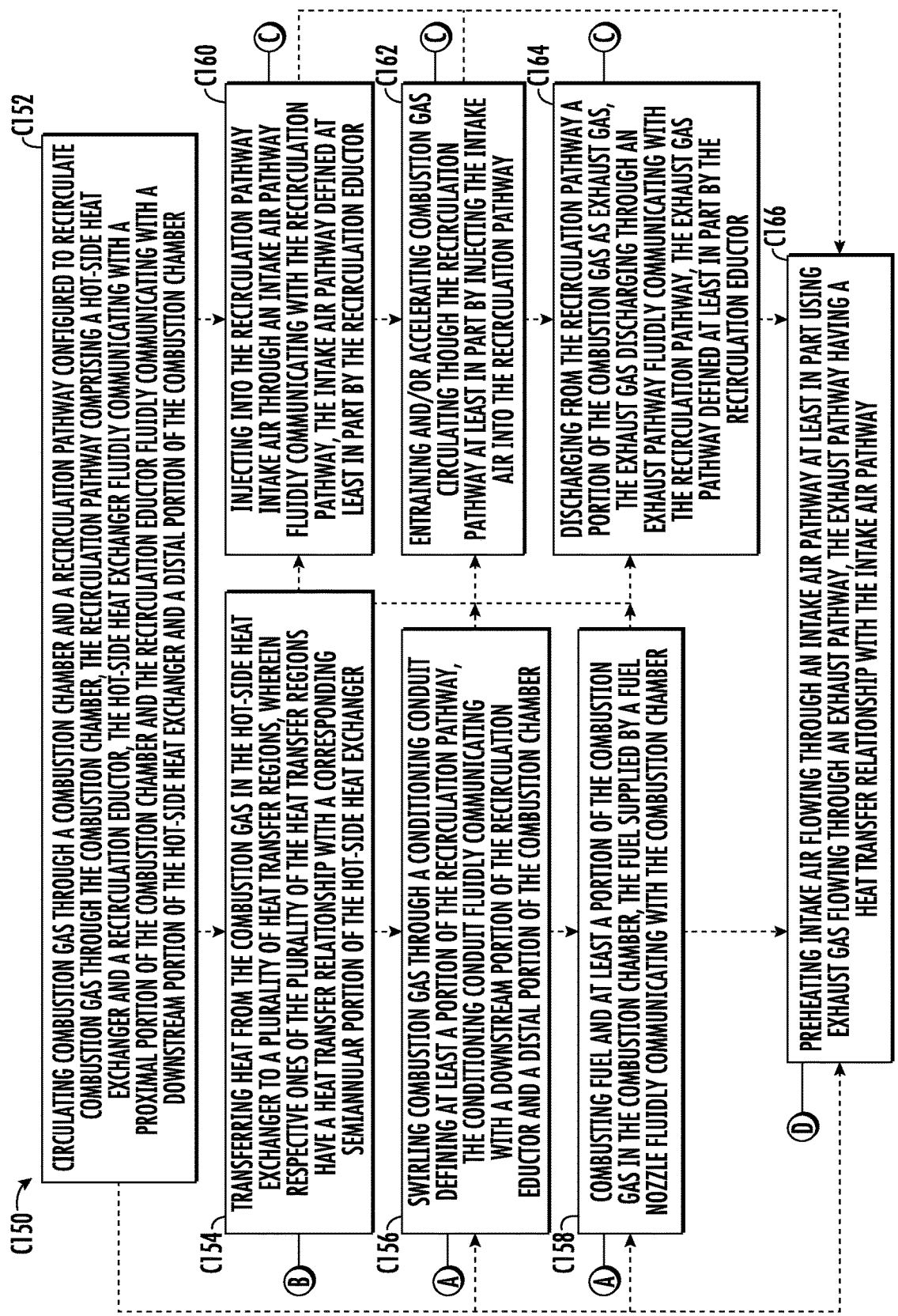
FIG. 26 shows a flowchart depicting an exemplary method of heating a closed-cycle engine, such as a regenerative heat engine.

Now referring to FIG. 26 exemplary methods of heating a heat exchanger body c600 will be described. The exemplary methods of heating a heat exchanger body c600 may include, for example, methods of heating a closed-cycle engine c002. For example, exemplary methods may be performed in connection with operation of a heater body c100 and/or a closed-cycle engine c002 as described herein. As shown in FIG. 26, an exemplary method c150 may include, at block c152, circulating combustion gas through a combustion chamber c102 and a recirculation pathway c104 configured to recirculate combustion gas through the combustion chamber c102. The recirculation pathway c104 may include a hot-side heat exchanger c106 and a recirculation eductor c116. The hot-side heat exchanger c106 may fluidly communicate with a proximal portion of the combustion chamber c102. The recirculation eductor c116 may fluidly communicate with a downstream portion of the hot-side heat exchanger c106 and a proximal portion of the conditioning conduit c122 and/or and a distal portion of the combustion chamber c102. At block c154, an exemplary method c150 may include transferring heat from the combustion gas in the hot-side heat exchanger c106 to a plurality of heat transfer regions that respectively have a heat transfer relationship with a corresponding semiannular portion of the hot-side heat exchanger c106. The exemplary method c150 may include, at block c156, swirling combustion gas through a conditioning conduit c122 defining at least a portion of the recirculation pathway c104. The conditioning conduit c122 may fluidly communicate with a downstream portion of the recirculation eductor c116 and a distal portion of the combustion chamber c102. The exemplary method c150 may additionally include, at block c158, combusting a fuel and/or at least a portion of the combustion gas. The fuel and/or combustion gas may be combusted in the combustion chamber c102. In some embodiments, at least a portion of the combustion may take place within the hot-side heat exchanger c106.

In some embodiments, an exemplary method c150 may include, at block c160, injecting intake air into the recirculation pathway c104. The intake air may be injected through an intake air pathway c118 fluidly communicating with the recirculation pathway c104. For example, a recirculation eductor c116 may include a motive pathway defining at least a portion of the intake air pathway c118. The exemplary method may additionally include, at block c162, entraining and/or accelerating combustion gas circulating through the recirculation pathway c104 at least in part by injecting the intake air into the recirculation pathway c104, for example, through the motive pathway of the recirculation eductor c116. The exemplary method may further include, at block c164, discharging a portion of the combustion gas from the recirculation pathway c104 as exhaust gas. The exhaust gas may discharge through an exhaust pathway c120, and the exhaust gas pathway c120 may fluidly communicate with the recirculation pathway c104. In some embodiments, the exhaust gas pathway c120 may be defined at least in part by the recirculation eductor c116. The exhaust gas may be preferentially discharged from the recirculation pathway c104 upstream from a location where the intake air pathway c118 fluidly communicates with the recirculation pathway c104.

The exemplary method may additionally include, at block c166, preheating intake air flowing through the intake air pathway c118. The intake air may be preheated at least in part using exhaust gas flowing through an exhaust pathway c120 by the exhaust pathway c120 having a thermally conductive relationship with the intake air pathway c118. For example, in some embodiments, the intake air may be preheated at least in part using a heat recuperator c124. The heat recuperator c124 may define at least a portion of the intake air pathway c118 and at least a portion of the exhaust pathway c120, thereby providing a thermally conductive relationship between the exhaust gas pathway c120 and the intake air pathway c118. Additionally, or in the alternative, the intake air may be preheated at least in part using combustion gas flowing through a recirculation pathway c104 by the recirculation pathway c104 having a thermally conductive relationship with the intake air pathway c118. With the heat recuperator c124 fluidly communicating with the recirculation eductor c116, the exemplary methodc150 may include flowing combustion gas from the recirculation pathway c104 into the heat recuperator c124 at the recirculation eductor c116 through the exhaust pathway c120, and flowing intake air from the intake air pathway c118 into the recirculation eductor c116 at the heat recuperator c124. The exhaust pathway c120 may preferably be located upstream from the intake air pathway c118.

In an exemplary embodiment, transferring heat from the combustion gas in the hot-side heat exchanger c106 at block c154 may include transferring heat to a working-fluid body c108. The working-fluid body c108 may include a solid body and/or fluid in a fluid pathway defined at least in part by the solid body. The heat transferring to the working-fluid body c108 may come from combustion gas flowing through a plurality of heating fluid pathways defined at least in part by the hot-side heat exchanger c106. The heat may be transferred to respective ones of a plurality of heat transfer regions that have a thermally conductive relationship with a corresponding portion of the plurality of heating fluid pathways. The working-fluid body c108 may include a plurality of working-fluid pathways, and the exemplary method c150 may include flowing fluid through the working-fluid pathways as heat transfers thereto from the hot-side heat exchanger c106. In some embodiments, the working-fluid pathways may fluidly communicate with a piston chamber and a regenerator of a closed-cycle engine c002, and the exemplary method may include flowing fluid through the working-fluid pathways alternatingly between the regenerator and the piston chamber.

In an exemplary embodiment, combusting a fuel and/or at least a portion of the combustion gas at block c158 may include combusting fuel and at least a portion of the combustion gas in the combustion chamber c102 and/or in the heating fluid pathways of the hot-side heat exchanger c106. The fuel may be supplied by a fuel nozzle fluidly communicating with the combustion chamber c102. The combustion gas circulating through the combustion chamber c102 and/or the recirculation pathway c104 at block c152 may be from 10% to 90% of the total combustion gas flowing into the combustion chamber c102, and the remainder of the combustion gas may be discharged from the recirculation pathway c104 as exhaust gas through the exhaust pathway c120. It will be appreciated that the proportion of combustion gas being recirculated may vary depending on operating conditions and/or configuration of the heater body c100. For example, the proportion of combustion gas being recirculated may vary as between startup and steady-state conditions. Also, in some embodiments, the heater body c100 may not have a recirculation pathway or the recirculation pathway may be closed so as to carry out combustion of the fuel utilizing 100% intake air.

Figure 27A:
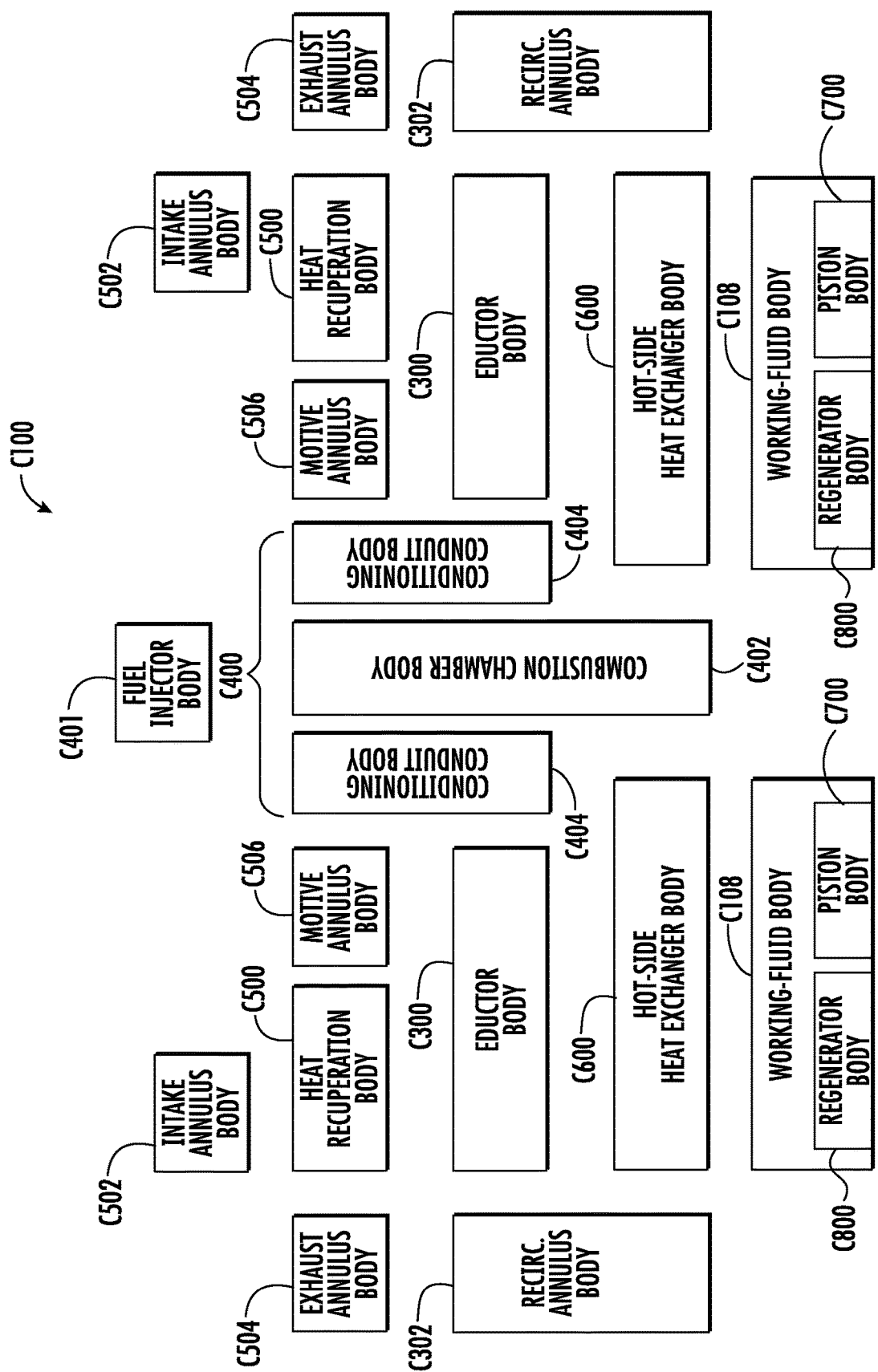
FIGS. 27A and 27B schematically depict exemplary monolithic bodies, which may include monolithic body portions and/or monolithic body-segments.
Figure 27B:
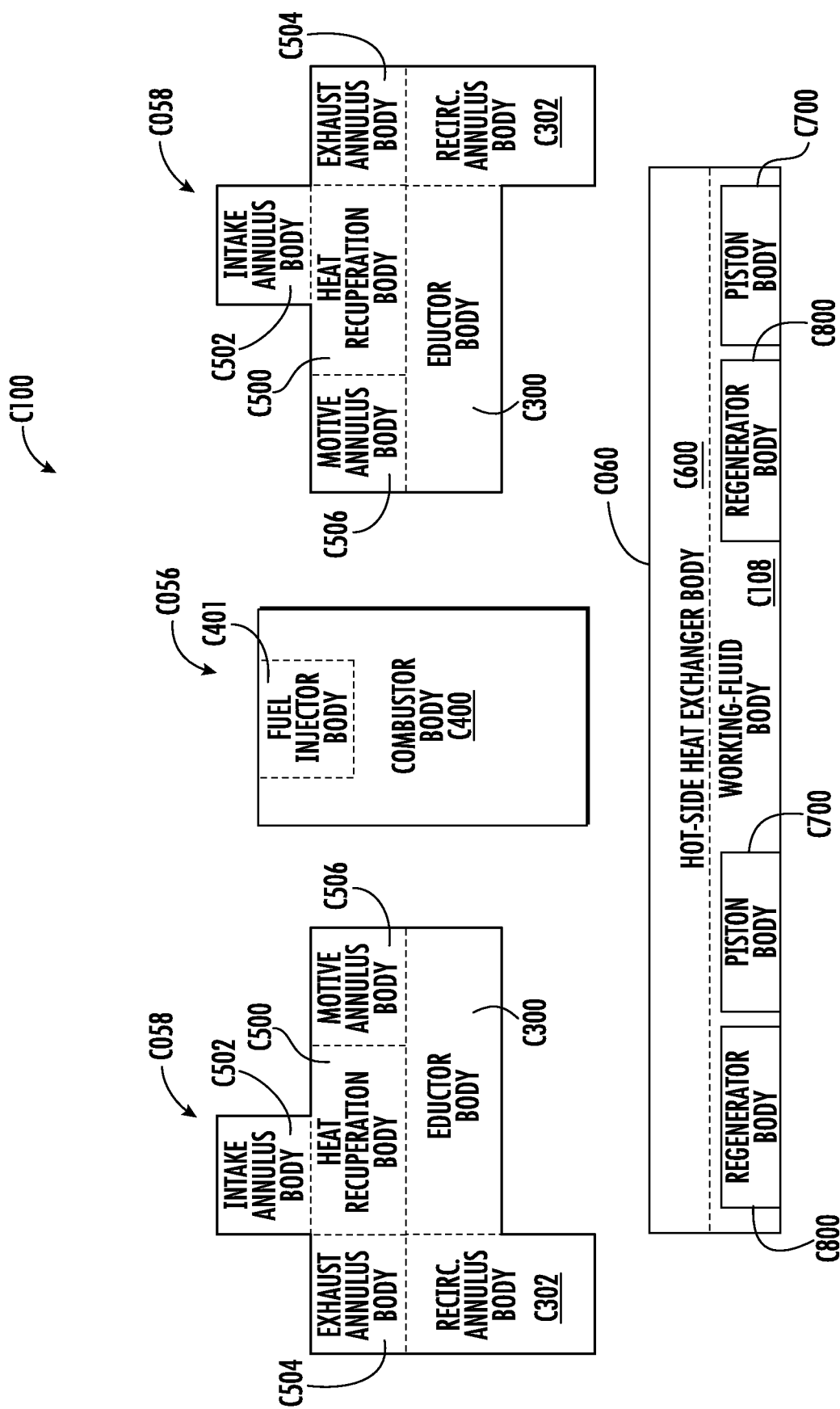

Now referring to FIGS. 27A and 27B exemplary monolithic bodies defining at least a portion of a heater body c100 will be described. Exemplary monolithic bodies may be formed as one single monolithic body. Various portions of a monolithic body are sometimes referred to as monolithic body portions. Additionally, or in the alternative, exemplary monolithic bodies may include a plurality of segments combinable to form a monolithic body. Such segments are sometimes referred to herein as monolithic body-segments. As shown in FIGS. 27A and 27B, an exemplary heater body c100 may include a combustor body c400, a fuel injector body c401, a hot-side heat exchanger body c600, an eductor body c300, a heat recuperator body c500, and/or a working-fluid body c108. The combustor body c400, the fuel injector body c401, the hot-side heat exchanger body c600, the eductor body c300, the heat recuperator body c500, and/or the working-fluid body c108 may respectively define monolithic body portions of the heater body c100 and/or monolithic body-segments of the heater body c100.

An exemplary heater body c100 may include a combustor body c400. The combustor body c400 may include a combustion chamber body c402 defining at least a portion of a combustion chamber c102. The combustion chamber body c402 and/or the combustion chamber c102 may be disposed annularly about an axis c204. The combustor body c400 may additionally include a conditioning conduit body c404 defining at least a portion of a conditioning conduit c122 circumferentially surrounding the combustion chamber c102. The combustion chamber body c402 and the conditioning conduit body c404 may be monolithically integrated with the heater body c100 at a distal portion of the heater body c100 such that the conditioning conduit may fluidly communicate with the combustion chamber c102 at a distal portion of the combustion chamber c102. For example, the conditioning conduit body c404 may be monolithically integrated with the combustion chamber body c402. Alternatively, the combustion chamber body c402 and the conditioning conduit body c404 may define monolithic body-segments operably couplable to one another and/or to the heater body c100 or another monolithic body-segment thereof so as to provide an integrally formed combustor body c400.

An exemplary heater body c100 may additionally or alternatively include a fuel injector body c401. The fuel injector body c401 may be monolithically integrated with the heater body c100 at a distal portion c202 of the heater body c100, such as at a distal portion c202 of the combustion chamber c102. For example, the fuel injector body c401 may be monolithically integrated with the combustor body c400 (e.g., with the combustion chamber body c402 and/or the conditioning conduit body c404). Alternatively, the fuel injector body c401 and the combustor body c400 (e.g., the combustion chamber body c402 and/or the conditioning conduit body c404) may define monolithic body-segments operably couplable to one another and/or to the heater body c100 or another monolithic body-segment thereof.

An exemplary heater body c100 may additionally or alternatively include a hot-side heat exchanger body c600. The hot-side heat exchanger body c600 may include a plurality of heating fluid pathways and a plurality of heat transfer regions. The plurality of heating fluid pathways may be circumferentially spaced about an inlet plenum fluidly communicating with the plurality of heating fluid pathways. In some embodiments, respective ones of the plurality of heating fluid pathways may define a spiral pathway. Respective ones of the plurality of heat transfer regions may have a heat transfer relationship with a corresponding semiannular portion of the plurality of heating fluid pathways.

The hot-side heat exchanger body c600 may be monolithically integrated with the heater body c100 at a proximal portion c200 of the heater body c100 such that the combustion chamber c102 may fluidly communicate with the plurality of heating fluid pathways at a proximal portion c200 of the combustion chamber c102. For example, the hot-side heat exchanger body c600 may be monolithically integrated with the combustor body c400 (e.g., with the combustion chamber body c402 and/or the conditioning conduit body c404). Alternatively, the hot-side heat exchanger body c600 and the combustor body c400 (e.g., the combustion chamber body c402 and/or the conditioning conduit body c404) may define monolithic body-segments operably couplable to one another and/or to the heater body c100 or another monolithic body-segment thereof.

An exemplary heater body c100 may additionally or alternatively include an eductor body c300. The eductor body c300 may be monolithically integrated with the hot-side heat exchanger body c600 and/or the combustor body c400 (e.g., the conditioning conduit body c404) such that the plurality of heating fluid pathways may fluidly communicate with a radially or concentrically outward portion of the an eduction pathway defined by the eductor body c300. In some embodiments, the exemplary heater body c100 may include a recirculation annulus body c302 configured to provide fluid communication between the plurality of heating fluid pathways of the hot-side heat exchanger body c600 and the combustor body c400 (e.g., the conditioning conduit body c404).

An exemplary heater body c100 may additionally or alternatively include a heat recuperator body c500. The heat recuperator body c500 may be monolithically integrated with the eductor body c300. In some embodiments, the exemplary heater body c100 may include an intake annulus body c502, an exhaust annulus body c504, and/or a motive annulus body c506. The intake annulus body c502 may be monolithically integrated with the heat recuperator body c500 such that the intake annulus body c502 and the heat recuperator body c500 define at least a portion of an intake air pathway c118. The exhaust annulus body c504 may be monolithically integrated the heat recuperator body c500 such that the exhaust annulus body c504 and the heat recuperator body c500 define at least a portion of the exhaust pathway c120. The motive annulus body c502 may be monolithically integrated with the heat recuperator body c500 and the eductor body c300 such that the motive annulus body defines at least a portion of the intake air pathway c118 between the heat recuperator body c500 and the eductor body c300.

An exemplary heater body c100 may additionally or alternatively include a working-fluid body c108. A working-fluid body c108 may include any one or more bodies that receive a heat input from the hot-side heat exchanger body c600. An exemplary working-fluid body c108 may include one or more piston bodies c700 and/or one or more regenerator bodies c800. An exemplary working-fluid body c108 may additionally or alternatively include one or more working-fluid pathways c110, such as one or more working-fluid pathways c110 fluidly communicating with at least one piston body c700 and/or at least one regenerator body c800. A working-fluid body c108 may be monolithically integrated with the hot-side heat exchanger body c600. In some embodiments, the working-fluid body c108 may define at least a portion of a plurality of working-fluid pathways. Additionally, or in the alternative, in some embodiments the hot-side heat exchanger body c600 may define at least a portion of the plurality of working-fluid pathways.

As shown in FIG. 27B, an exemplary monolithic body may include a plurality of monolithic body-segments. A heater body c100 may include any one or more of the elements described with reference to FIG. 27A provided as a monolithic body portion or as a monolithic body-segment. An exemplary heater body c100 may include an arrangement of monolithic body-segments as shown in FIG. 27B; however, other combinations and arrangements are contemplated and any combination or arrangement of monolithic body-segments is within the scope of the present disclosure. As shown in FIG. 27B, a heater body c100 may include a first monolithic body-segment c056, a second monolithic body-segment c058, and a third monolithic body-segment c060.

The first monolithic body-segment c056 may include a combustor body c400. Additionally, or in the alternative, the first monolithic body-segment c056 may include a fuel injector body c401. The second monolithic body-segment c058 may include an eductor body c300 defining a first monolithic body portion of the second monolithic body-segment c058, a heat recuperator body c500 defining a second monolithic body portion of the second monolithic body-segment c058, a recirculation annulus body c302 defining a third monolithic body portion of the second monolithic body-segment c058, an intake annulus body c502 defining a fourth monolithic body portion of the second monolithic body-segment c058, an exhaust annulus body c506 defining a fifth monolithic body portion of the second monolithic body-segment c058, and/or a motive annulus body c506 defining a sixth monolithic body portion of the second monolithic body-segment c058, as well as subcombinations of these.

The third monolithic body-segment c060 may include a hot-side heat exchanger body c600 defining a second monolithic body portion of the third monolithic body-segment c060, and a working-fluid body c108 defining a second monolithic body portion of the third monolithic body-segment c060. In other embodiments, the first monolithic body-segment c056, the second monolithic body-segment c058, and/or the third monolithic body-segment c058 may respectively include any subcombination of the foregoing monolithic body portions, respectively provided as monolithic body portions of a respective monolithic body-segment or as separate monolithic body-segments.

This written description uses examples to describe the presently disclosed subject matter, including the best mode, and also to provide any person skilled in the art to practice the subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine assembly, comprising:
   a first heater body comprising a first hot-side heat exchanger, the first heater body and the first hot-side heat exchanger together defining at least a portion of a first monolithic body-segment; and
   a first engine body, the first engine body defining at least a portion of a second monolithic body-segment directly coupled or directly couplable to the first monolithic body-segment;
   wherein the first monolithic body-segment defines a first portion of respective ones of a first plurality of piston chambers, and wherein the second monolithic body-segment defines a second portion of the respective ones of the first plurality of piston chambers.

2. The engine assembly of claim 1, wherein the first engine body comprises:
   a first piston body, the first piston body defining at least a portion of the second monolithic body-segment; and/or
   a first machine body, the first machine body defining at least a portion of the second monolithic body-segment, or the first machine body defining a third monolithic body-segment operably coupled or operably couplable to the second monolithic body-segment.

3. The engine assembly of claim 1, wherein the first heater body and/or the first engine body comprises a first regenerator body, the first regenerator body defining at least a portion of the second monolithic body-segment.

4. The engine assembly of claim 1, wherein the first engine body comprises a first chiller body, the first chiller body defining at least a portion of the second monolithic body-segment.

5. The engine assembly of claim 1, comprising:
   a second heater body comprising a second hot-side heat exchanger, the second heater body and the second hot-side heat exchanger together defining at least a portion of a fourth monolithic body-segment operably coupled or operably couplable to the second monolithic body-segment.

6. The engine assembly of claim 1, comprising:
   a second heater body comprising a second hot-side heat exchanger, the second heater body and the second hot-side heat exchanger together defining at least a portion of a fourth monolithic body-segment; and
   a second engine body, the second engine body defining at least a portion of a fifth monolithic body-segment operably coupled or operably couplable to the second heater body and/or to the first engine body.

7. The engine assembly of claim 6, wherein the second engine body comprises:
   a second piston body, the second piston body defining at least a portion of the fifth monolithic body-segment, or the second piston body defining at least a portion of a sixth monolithic body-segment operably coupled or operably couplable to the fifth monolithic body-segment; and/or
   a second machine body, the second machine body defining at least a portion of the fifth monolithic body-segment, or the second machine body defining at least a portion of a seventh monolithic body-segment operably coupled or operably couplable to the fifth monolithic body-segment.

8. The engine assembly of claim 6, wherein the second heater body and/or the second engine body comprises a second regenerator body, the second regenerator body defining at least a portion of the fifth monolithic body-segment.

9. The engine assembly of claim 6, wherein the second heater body and/or the second engine body comprises a second chiller body, the second chiller body defining at least a portion of the fifth monolithic body-segment.

10. The engine assembly of claim 1, comprising:
    a second heater body comprising a second hot-side heat exchanger, the second heater body and the second hot-side heat exchanger together defining at least a portion of a fourth monolithic body-segment;
    a second engine body, the second engine body defining at least a portion of a fifth monolithic body-segment; and
    a third engine body, the third engine body defining at least a portion of an eighth monolithic body-segment operably coupled or operably couplable to the first engine body.

11. The engine assembly of claim 10, wherein the third engine body comprises:
    a third machine body, the third machine body defining a first portion of the eighth monolithic body-segment, or the third machine body defining at least a portion of a ninth monolithic body-segment operably coupled or operably couplable to the eighth monolithic body-segment; and
    a third piston body, the third piston body defining a second portion of the eighth monolithic body-segment, or the third piston body defining at least a portion of a tenth monolithic body-segment operably coupled or operably couplable to the eighth monolithic body-segment.

12. The engine assembly of claim 11, wherein the third piston body comprises a third chiller body, the third chiller body defining a third portion of the eighth monolithic body-segment, or the third chiller body defining at least a portion of an eleventh monolithic body-segment operably coupled or operably couplable to the third piston body.

13. The engine assembly of claim 10, comprising:
a fourth engine body, the fourth engine body defining at least a portion of a twelfth monolithic body-segment operably coupled or operably couplable to the third engine body and/or to the second engine body.

14. The engine assembly of claim 13, wherein the fourth engine body comprises:
a fourth machine body, the fourth machine body defining a first portion of the twelfth monolithic body-segment; and/or
a fourth piston body, the fourth piston body defining a second portion of the twelfth monolithic body-segment.

15. The engine assembly of claim 14, wherein the fourth piston body comprises a fourth chiller body, the fourth chiller body defining a third portion of the twelfth monolithic body-segment, or the fourth chiller body defining at least a portion of a thirteenth monolithic body-segment operably coupled or operably couplable to the fourth piston body.

16. The engine assembly of claim 1, comprising:
a second engine body, the second engine body defining a at least a portion of a fifth monolithic body-segment operably coupled or operably couplable to the first engine body and/or to a second heater body.

17. The engine assembly of claim 16, wherein the second engine body comprises:
a second piston body, the second piston body defining at least a portion of the fifth monolithic body-segment, or the second piston body defining at least a portion of a sixth monolithic body-segment operably coupled or operably couplable to the fifth monolithic body-segment; and/or
a second machine body, the second machine body defining at least a portion of the fifth monolithic body-segment, or the second engine body defining at least a portion of a seventh monolithic body-segment operably coupled or operably couplable to the fifth monolithic body-segment.

18. The engine assembly of claim 1, comprising:
a first fuel injector body directly coupled or directly couplable to the first heater body, the first fuel injector body comprising a first combust or cap and/or a first fuel nozzle.

19. The engine assembly of claim 1, comprising:
a piston assembly operably inserted or operably insertable into a first piston chamber, the first piston chamber defined at least in part by the first engine body.

20. The engine assembly of claim 1, comprising:
a load device operably inserted or operably insertable into a first generator housing, the first generator housing defined at least in part by the first engine body.

21. The engine assembly of claim 1, wherein the first hot-side heat exchanger defines a plurality of first heating fluid pathways configured to receive a heating fluid.

22. The engine assembly of claim 21, wherein the first hot-side heat exchanger defines a plurality of working fluid pathways configured to transfer a working fluid between a piston chamber and a regenerator conduit.

23. The engine assembly of claim 1, wherein the first hot-side heat exchanger defines a first single thermal energy output source to a plurality of piston chambers.

24. An engine assembly, comprising:
a first heater body comprising a first hot-side heat exchanger, the first heater body and the first hot-side heat exchanger together defining at least a portion of a first monolithic body-segment; and
a first engine body, the first engine body defining at least a portion of a second monolithic body-segment directly coupled or directly couplable to the first monolithic body-segment;
wherein the first hot-side heat exchanger defines a first single thermal energy output source to a plurality of piston chambers.

25. The engine assembly of claim 24, wherein the first engine body comprises:
a first piston body, the first piston body defining at least a portion of the second monolithic body-segment; and/or
a first machine body, the first machine body defining at least a portion of the second monolithic body-segment, or the first machine body defining a third monolithic body-segment operably coupled or operably couplable to the second monolithic body-segment.

26. The engine assembly of claim 24, wherein the first heater body and/or the first engine body comprises a first regenerator body, the first regenerator body defining at least a portion of the second monolithic body-segment.

27. The engine assembly of claim 24, wherein the first engine body comprises a first chiller body, the first chiller body defining at least a portion of the second monolithic body-segment.

28. The engine assembly of claim 24, comprising:
a second heater body comprising a second hot-side heat exchanger, the second heater body and the second hot-side heat exchanger together defining at least a portion of a fourth monolithic body-segment operably coupled or operably couplable to the second monolithic body-segment.

29. The engine assembly of claim 24, comprising:
a first fuel injector body directly coupled or directly couplable to the first heater body, the first fuel injector body comprising a first combust or cap and/or a first fuel nozzle.

30. The engine assembly of claim 24, comprising:
a piston assembly operably inserted or operably insertable into a first piston chamber, the first piston chamber defined at least in part by the first engine body.

31. The engine assembly of claim 24, comprising:
a load device operably inserted or operably insertable into a first generator housing, the first generator housing defined at least in part by the first engine body.

32. The engine assembly of claim 24, wherein the first hot-side heat exchanger defines a plurality of first heating fluid pathways configured to receive a heating fluid.

33. The engine assembly of claim 32, wherein the first hot-side heat exchanger defines a plurality of working fluid pathways configured to transfer a working fluid between a piston chamber and a regenerator conduit.

34. The engine assembly of claim 24, wherein the first hot-side heat exchanger defines a first single thermal energy output source to a plurality of piston chambers.

35. The engine assembly of claim 24, wherein the first monolithic body-segment defines a first portion of respective ones of a first plurality of piston chambers, and wherein the second monolithic body-segment defines a second portion of the respective ones of the first plurality of piston chambers.

36. An engine assembly, comprising:
a first heater body comprising a first hot-side heat exchanger, the first heater body and the first hot-side heat exchanger together defining at least a portion of a first monolithic body-segment; and
a first engine body, the first engine body defining at least a portion of a second monolithic body-segment directly coupled or directly couplable to the first monolithic body-segment;
wherein the first engine body comprises a first chiller body, the first chiller body defining at least a portion of the second monolithic body-segment.

37. The engine assembly of claim 36, comprising:
a second heater body comprising a second hot-side heat exchanger, the second heater body and the second hot-side heat exchanger together defining at least a portion of a fourth monolithic body-segment; and
a second engine body, the second engine body defining at least a portion of a fifth monolithic body-segment operably coupled or operably couplable to the second heater body and/or to the first engine body.

38. The engine assembly of claim 37, wherein the second engine body comprises:
a second piston body, the second piston body defining at least a portion of the fifth monolithic body-segment, or the second piston body defining at least a portion of a sixth monolithic body-segment operably coupled or operably couplable to the fifth monolithic body-segment; and/or
a second machine body, the second machine body defining at least a portion of the fifth monolithic body-segment, or the second machine body defining at least a portion of a seventh monolithic body-segment operably coupled or operably couplable to the fifth monolithic body-segment.

39. The engine assembly of claim 37, wherein the second heater body and/or the second engine body comprises a second regenerator body, the second regenerator body defining at least a portion of the fifth monolithic body-segment.

40. The engine assembly of claim 37, wherein the second heater body and/or the second engine body comprises a second chiller body, the second chiller body defining at least a portion of the fifth monolithic body-segment.

41. The engine assembly of claim 36, comprising:
a second heater body comprising a second hot-side heat exchanger, the second heater body and the second hot-side heat exchanger together defining at least a portion of a fourth monolithic body-segment;
a second engine body, the second engine body defining at least a portion of a fifth monolithic body-segment; and
a third engine body, the third engine body defining at least a portion of an eighth monolithic body-segment operably coupled or operably couplable to the first engine body.

42. The engine assembly of claim 41, wherein the third engine body comprises:
a third machine body, the third machine body defining a first portion of the eighth monolithic body-segment, or the third machine body defining at least a portion of a ninth monolithic body-segment operably coupled or operably couplable to the eighth monolithic body-segment; and
a third piston body, the third piston body defining a second portion of the eighth monolithic body-segment, or the third piston body defining at least a portion of a tenth monolithic body-segment operably coupled or operably couplable to the eighth monolithic body-segment.

43. The engine assembly of claim 42, wherein the third piston body comprises a third chiller body, the third chiller body defining a third portion of the eighth monolithic body-segment, or the third chiller body defining at least a portion of an eleventh monolithic body-segment operably coupled or operably couplable to the third piston body.

44. The engine assembly of claim 41, comprising:
a fourth engine body, the fourth engine body defining at least a portion of a twelfth monolithic body-segment operably coupled or operably couplable to the third engine body and/or to the second engine body.

45. The engine assembly of claim 44, wherein the fourth engine body comprises:
a fourth machine body, the fourth machine body defining a first portion of the twelfth monolithic body-segment; and/or
a fourth piston body, the fourth piston body defining a second portion of the twelfth monolithic body-segment.

46. The engine assembly of claim 45, wherein the fourth piston body comprises a fourth chiller body, the fourth chiller body defining a third portion of the twelfth monolithic body-segment, or the fourth chiller body defining at least a portion of a thirteenth monolithic body-segment operably coupled or operably couplable to the fourth piston body.

47. The engine assembly of claim 36, comprising:
a second engine body, the second engine body defining a at least a portion of a fifth monolithic body-segment operably coupled or operably couplable to the first engine body and/or to a second heater body.

48. The engine assembly of claim 47, wherein the second engine body comprises:
a second piston body, the second piston body defining at least a portion of the fifth monolithic body-segment, or the second piston body defining at least a portion of a sixth monolithic body-segment operably coupled or operably couplable to the fifth monolithic body-segment; and/or
a second machine body, the second machine body defining at least a portion of the fifth monolithic body-segment, or the second engine body defining at least a portion of a seventh monolithic body-segment operably coupled or operably couplable to the fifth monolithic body-segment.

* * * * *